US012779879B2

(12) United States Patent
O et al.

(10) Patent No.: US 12,779,879 B2
(45) Date of Patent: Nov. 3, 2026

(54) ULTRAVIOLET IRRADIATION DEVICE AND PRINTING DEVICE

(71) Applicant: MIMAKI ENGINEERING CO., LTD., Nagano (JP)

(72) Inventors: Tatenori O, Nagano (JP); Soichiro Takehana, Nagano (JP); Yuichi Narishima, Nagano (JP); Noriyuki Miyagoshi, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 225 days.

(21) Appl. No.: 18/718,790

(22) PCT Filed: Dec. 2, 2022

(86) PCT No.: PCT/JP2022/044576
§ 371 (c)(1),
(2) Date: Jun. 11, 2024

(87) PCT Pub. No.: WO2023/112726
PCT Pub. Date: Jun. 22, 2023

(65) Prior Publication Data

US 2025/0033378 A1 Jan. 30, 2025

(30) Foreign Application Priority Data

Dec. 15, 2021 (JP) ................................ 2021-203526
Sep. 2, 2022 (JP) ................................ 2022-140271

(51) Int. Cl.
*B41J 3/407* (2006.01)
*B41J 11/00* (2006.01)
*B41J 29/13* (2006.01)

(52) U.S. Cl.
CPC .... *B41J 11/00214* (2021.01); *B41J 11/00218* (2021.01); *B41J 29/13* (2013.01)

(58) Field of Classification Search
None
See application file for complete search history.

(56) References Cited

U.S. PATENT DOCUMENTS 6,962,110 B2 * 11/2005 Hellmeier ........... B41F 15/0872 101/35
2012/0274695 A1 * 11/2012 LaCaze ................ B41J 11/0021 347/16
2023/0331002 A1 * 10/2023 Ojima ................ B41J 11/00218

FOREIGN PATENT DOCUMENTS

CN 103786438 5/2014
CN 203713250 U * 7/2014 ........ B41J 11/00214
(Continued)

OTHER PUBLICATIONS

English translation of DE 10 2016 223 415 A1 to Matern et al., publication date Jun. 22, 2017. (Year: 2017).*
(Continued)

*Primary Examiner* — Leslie J Thompson
(74) *Attorney, Agent, or Firm* — JCIPRNET

(57) ABSTRACT

The ink landed on a print object is quickly irradiated with an ultraviolet ray. An ultraviolet irradiation device includes a rotating mechanism that holds a print object and rotates the print object about an axis of the print object, and an ultraviolet irradiator that irradiates an outer peripheral surface of the print object to which an ultraviolet-curable ink is attached with an ultraviolet ray. The ink ejected from above the print object lands on the outer peripheral surface of the print object. The ultraviolet irradiator is disposed on the side of the print object, and irradiates the outer peripheral surface of the print object with an ultraviolet ray from the side of the print object.

19 Claims, 32 Drawing Sheets

(56) References Cited

FOREIGN PATENT DOCUMENTS

| | | | | |
|---|---|---|---|---|
| CN | 209794894 U | * | 12/2019 | .......... B41J 3/40731 |
| DE | 102016223415 A1 | * | 6/2017 | ........ B41J 11/00214 |
| JP | 2010143200 | | 7/2010 | |
| JP | 2013237249 | | 11/2013 | |
| JP | 2014512990 | | 5/2014 | |
| JP | 2015196325 | | 11/2015 | |
| JP | 2021030592 | | 3/2021 | |

OTHER PUBLICATIONS

English translation of CN 203713250 U to Zhang, publication date Jul. 16, 2014. (Year: 2014).*
English translation of CN 209794894 U to Xu et al., publication date Dec. 17, 2019. (Year: 2019).*
"International Search Report (Form PCT/ISA/210) of PCT/JP2022/044576", mailed on Feb. 14, 2023, with English translation thereof, pp. 1-4.
"Notice of Reasons for Refusal of Japan Counterpart Application", issued on Nov. 10, 2025, with English translation thereof, p. 1-p. 9.
"The First Office Action of China Counterpart Application", issued on Mar. 10, 2026, pp. 1-12.

* cited by examiner

ULTRAVIOLET IRRADIATION DEVICE AND PRINTING DEVICE

CROSS-REFERENCE TO RELATED APPLICATION

This application is a 371 application of the international PCT application serial no. PCT/JP2022/044576, filed on Dec. 2, 2022, which claims the priority benefits of Japan application no. 2021-203526, filed on Dec. 15, 2021, and Japan application no. 2022-140271, filed on Sep. 2, 2022. The entirety of each of the above-mentioned patent applications is hereby incorporated by reference herein and made a part of this specification.

TECHNICAL FIELD

This invention relates to an ultraviolet irradiation device used in a printing device for performing printing using an ultraviolet-curable ink on an outer peripheral surface of a print object that is a three-dimensional object. This invention also relates to a printing device including such an ultraviolet irradiation device.

BACKGROUND ART

Conventionally, a printing device for performing printing using an inkjet method on an outer peripheral surface of a three-dimensional object that does not absorb ink, for example, a tubular object is known (see, for example, Patent Literature 1). The printing device described in Patent Literature 1 includes a columnar mandrel to which a tubular object that is a tube made of resin is attached, a motor that rotates the mandrel about an axis of the mandrel, an inkjet head that ejects an ultraviolet-curable ink toward an outer peripheral surface of the tubular object, and an ultraviolet irradiation device that irradiates the outer peripheral surface of the tubular object to which the ink is attached with an ultraviolet ray. The inkjet head is disposed above the tubular object, and the ink ejected from above the tubular object lands on the outer peripheral surface of the tubular object. The ultraviolet irradiation device is disposed below the tubular object.

CITATION LIST

Patent Literature

Patent Literature 1: Japanese Unexamined Patent Publication No. 2010-143200

SUMMARY OF INVENTION

Technical Problems

As in the printing device described in Patent Literature 1, in the printing device for performing printing on the outer peripheral surface of the tubular object using the ultraviolet-curable ink, it is preferable to quickly irradiate the ultraviolet ray with the ink landed on the outer peripheral surface of the tubular object in order to suppress blurring of the ink landed on the outer peripheral surface of the tubular object.

Therefore, an object of this invention is to provide an ultraviolet irradiation device used in a printing device for performing printing using an ultraviolet-curable ink on an outer peripheral surface of a print object that is a three-dimensional object, the ultraviolet irradiation device capable of quickly irradiating the ultraviolet ray with the ink landed on the outer peripheral surface of the print object. Another object of this invention is to provide a printing device including such an ultraviolet irradiation device.

Solutions to Problems

In order to solve the above problems, an ultraviolet irradiation device of this invention is an ultraviolet irradiation device used in a printing device for performing printing using an ultraviolet-curable ink on an outer peripheral surface of a print object that is a three-dimensional object, the ultraviolet irradiation device including: a rotating mechanism that holds the print object and rotates the print object about an axis of the print object; and an ultraviolet irradiator that irradiates an outer peripheral surface of the print object to which the ink is attached with an ultraviolet ray, wherein the ink ejected from above the print object lands on the outer peripheral surface of the print object, and the ultraviolet irradiator is disposed on a side of the print object, and irradiates the outer peripheral surface of the print object with an ultraviolet ray from the side of the print object.

In the ultraviolet irradiation device, the ultraviolet irradiator is disposed on the side of the print object, and irradiates the outer peripheral surface of the print object to which the ink ejected and landed from above the print object is attached with the ultraviolet ray from the side of the print object. Due to this, in this invention, compared to the case where the ultraviolet irradiator is arranged below the print object as in the printing device described in Patent Literature 1, the ultraviolet ray can be irradiated more quickly to the ink landed on the outer peripheral surface of the print object.

In this invention, preferably, the ultraviolet irradiation device includes a cover having an opening in which an upper end portion of the print object is disposed and a cover portion that covers the ultraviolet irradiator from above. With this configuration, for example, when the inkjet head arranged above the print object ejects the ink toward the outer peripheral surface of the print object, even if the ultraviolet irradiator arranged on the side of the print object irradiates the ultraviolet ray from the side of the print object, the cover portion can prevent the nozzle surface that constitutes the lower surface of the inkjet head from being irradiated with the ultraviolet ray. Therefore, even if the ultraviolet irradiator is disposed on the side of the print object, clogging of the nozzles of the inkjet head can be suppressed.

In this invention, preferably, the position of the cover in the vertical direction is adjustable. With this configuration, even when the outer diameter of the print object printed by the printing device changes, the position of the cover in the vertical direction can be adjusted according to the outer diameter of the print object. Further, by adjusting the position of the cover in the vertical direction according to the outer diameter of the print object, the gap between the edge of the opening of the cover portion and the print object can be minimized. Therefore, even when the ultraviolet irradiator is arranged on the side of the print object and the outer diameter of the print object changes, the cover portion can prevent the nozzle surface of the inkjet head from being irradiated with an ultraviolet ray.

In this invention, preferably, a direction orthogonal to an axis of the print object when viewed from a vertical direction is set as a left-right direction, the ultraviolet irradiation device includes two second covers for closing a part of the opening, and positions of the two second covers in the left-right direction are adjustable, one of the two second covers is capable of closing a part of the opening from one side in the left-right direction, and the other second cover is capable of closing a part of the opening from the other side in the left-right direction.

With this configuration, even when the outer diameter of the print object printed by the printing device changes, the position of the second cover in the left-right direction can be adjusted according to the outer diameter of the print object. Further, by adjusting the position of the second cover in the left-right direction according to the outer diameter of the print object, the gap between the end face of the second cover and the print object can be minimized. Therefore, even when the ultraviolet irradiator is disposed on the side of the print object and the outer diameter of the print object changes, the second cover can prevent the nozzle surface of the inkjet head from being irradiated with an ultraviolet ray.

In this invention, for example, the ultraviolet irradiation device includes a cover position adjustment mechanism configured to adjust a position of each of the two second covers in a left-right direction, the second cover is held by the cover so as to be slidable in the left-right direction, the cover position adjustment mechanism includes a pressing member that is held by the cover so as to be slidable in the left-right direction, is in contact with the second cover from an outer side in the left-right direction, and presses the second cover inward in the left-right direction, a biasing member that biases the second cover outward in the left-right direction, and an adjustment screw that is rotatably held by the cover and engages with the pressing member, and when the adjustment screw is rotated, the second cover slides in the left-right direction. In this case, the position of the second cover in the left-right direction can be adjusted by a simple operation such as rotating the adjustment screw.

In this invention, preferably, the cover includes a cover upper portion including the cover portion and a cover lower portion to which the cover upper portion is attached on an upper end side, the cover upper portion holds the second cover and the cover position adjustment mechanism, any one of the cover upper portion and the cover lower portion includes an adsorbing member made of a permanent magnet, the other of the cover upper portion and the cover lower portion includes an adsorbing target member that is made of a permanent magnet or a magnetic member and is adsorbed by the adsorbing member, and the cover upper portion is attached to the cover lower portion by a magnetic adsorption force generated between the adsorbing member and the adsorbing target member.

With this configuration, since the cover upper portion is attached to the cover lower portion by the magnetic adsorption force, the cover upper portion including the cover portion can be easily removed from the cover lower portion. Therefore, when the print object after printing is removed from the rotating mechanism and the print object before printing is attached to the rotating mechanism (that is, when replacing the print object), the cover upper portion can be easily attached and detached, and as a result, replacement work of the print object can be easily performed.

With this configuration, since the cover upper portion holds the second cover and the cover position adjustment mechanism, it is possible to maintain the arrangement relationship between the cover portion and the second cover after the cover upper portion once detached is attached to the cover lower portion. Therefore, even if the cover upper portion is attached and detached, it is possible to suppress the variation in the relative position between the print object and the second cover, the position of which is adjusted in the left-right direction according to the outer diameter of the print object. As a result, when printing of the print object having the same outer diameter is continuously performed, it is possible to save time and effort to readjust the position of the second cover in the left-right direction after attaching and detaching the cover upper portion.

In this invention, preferably, the position of the cover lower portion in the vertical direction is adjustable. With this configuration, even when the outer diameter of the print object printed by the printing device changes, the position of the cover in the vertical direction can be adjusted according to the outer diameter of the print object. Further, by adjusting the position of the cover in the vertical direction according to the outer diameter of the print object, the gap between the edge of the opening of the cover portion and the print object can be minimized. Therefore, even when the ultraviolet irradiator is arranged on the side of the print object and the outer diameter of the print object changes, the cover portion can prevent the nozzle surface of the inkjet head from being irradiated with an ultraviolet ray.

In this invention, preferably, a direction of an axis of the print object when viewed from a vertical direction is set as a front-rear direction, the ultraviolet irradiation device includes a third cover that closes a part of the opening in the front-rear direction, and the third cover is mounted on the cover portion. With this configuration, a part of the opening in the front-rear direction can be closed according to the length of the print object (length in the axial direction of the print object). Therefore, even when the length of the print object printed by the printing device changes, the nozzle surface of the inkjet head can be prevented from being irradiated with the ultraviolet ray having passed through the opening.

In this invention, preferably, the position of the ultraviolet irradiator in the vertical direction is adjustable. With this configuration, even when the outer shape of the print object printed by the printing device changes, the ultraviolet irradiator can be arranged at a more appropriate position for curing the ink attached to the print object.

In this invention, preferably, a direction orthogonal to an axis of the print object when viewed from a vertical direction is set as a left-right direction, an inclination of the rotating mechanism with respect to a horizontal direction when viewed from a left-right direction is adjustable. With this configuration, for example, when the inkjet head arranged above the print object ejects the ink toward the outer peripheral surface of the print object, even if the outer shape of the print object is truncated conical or conical, the distance (gap) between the outer peripheral surface of the print object and the nozzle surface of the inkjet head can be made constant in the entire region in the axial direction of the print object by adjusting the inclination of the rotating mechanism. Therefore, appropriate printing can be performed on the print object.

In this invention, a direction of an axis of the print object when viewed from a vertical direction is set as a front-rear direction, the ultraviolet irradiation device includes a base frame in which the rotating mechanism is connected to one end portion in the front-rear direction so that the rotating mechanism is pivotable in the left-right direction, a support frame having a step portion having a stepped shape in which a plurality of stepped surfaces arranged in the vertical direction is formed and fixed to the other end portion in the front-rear direction of the base frame, an engaging member having a mounting portion mounted on the stepped surface and held by the rotating mechanism so as to be pivotable in the left-right direction, and a second biasing member that biases the engaging member to one side in a pivoting direction of the engaging member with respect to the rotating mechanism, the rotating mechanism includes a first rotator that holds one end of the print object and rotates together with the print object, a second rotator that holds the other end of the print object and rotates together with the print object, and a pivotable frame to which the first rotator and the second rotator are rotatably attached, one end portion in the front-rear direction of the pivotable frame is pivotably connected to one end portion in the front-rear direction of the base frame, the engaging member is pivotably held at the other end portion of the pivotable frame in the front-rear direction, the second biasing member biases the engaging member in a direction in which the mounting portion moves toward the step portion, the mounting portion is mounted on the stepped surface by its own weight of the rotating mechanism, and when the engaging member is pivoted against the biasing force of the second biasing member, the mounting portion is detached from the stepped surface.

In this invention, preferably, the ultraviolet irradiation device includes a pivot shaft pivotably held by the pivotable frame and serving as a pivot center of the engaging member with respect to the pivotable frame; and an eccentric cam fixed to the pivot shaft, the pivot shaft is pivotable with respect to the engaging member, a cam arrangement hole in which the eccentric cam is arranged is formed in the pivotable frame, and when the eccentric cam is pivoted with respect to the pivotable frame, the other end portion in the front-rear direction of the pivotable frame moves up and down with respect to the engaging member. With this configuration, it is possible to finely adjust the inclination of the rotating mechanism with respect to the horizontal direction when viewed from the left-right direction using the eccentric cam.

In this invention, preferably, the eccentric cam is an eccentric disc cam formed in a disc shape, and an amount of eccentricity, which is a distance between a center of the eccentric cam and an axis of the pivot shaft, is equal to a half of a step between the stepped surfaces adjacent in the vertical direction. With this configuration, even when the inclination of the rotating mechanism with respect to the horizontal direction when viewed from the left-right direction is adjusted using the step portion of the support frame and the engaging member, the inclination of the rotating mechanism with respect to the horizontal direction when viewed from the left-right direction can be continuously adjusted.

In this invention, preferably, an inclination of the ultraviolet irradiator with respect to an axis of the print object when viewed in a vertical direction is adjustable. With this configuration, even if the outer shape of the print object is truncated conical or conical, the distance between the outer peripheral surface of the print object and the ultraviolet irradiator can be made constant in the entire region in the axial direction of the print object by adjusting the inclination of the ultraviolet irradiator. Therefore, the ink attached to the outer peripheral surface of the print object can be appropriately cured.

In this invention, preferably, the ultraviolet irradiation device includes a first detection mechanism configured to detect that the print object is held by the rotating mechanism, and irradiation of the ultraviolet ray by the ultraviolet irradiator is enabled when the first detection mechanism detects that the print object is held by the rotating mechanism. With this configuration, when the print object is not held by the rotating mechanism, the ultraviolet irradiator does not irradiate the ultraviolet ray, so the irradiation of the ultraviolet ray by the ultraviolet irradiator can be prevented in a state in which the operator of the printing device is in contact with the ultraviolet irradiator. Therefore, the safety of the ultraviolet irradiation device can be enhanced.

In this invention, preferably, a direction orthogonal to an axis of the print object when viewed from a vertical direction is set as a left-right direction, the rotating mechanism includes a first rotator that holds one end of the print object, a first holding portion that rotatably holds the first rotator, a motor that rotates the first rotator, a power transmission mechanism that connects the first rotator and the motor, a second rotator that holds the other end of the print object, a second holding portion that rotatably holds the second rotator, a third holding portion that pivotably holds the second holding portion so that the second holding portion is pivotable in the left-right direction, and a third biasing member that biases the second holding portion with respect to the third holding portion in a direction in which the second holding portion tilts toward the first holding portion, the first detection mechanism is attached to the third holding portion, and when the print object is attached to the rotating mechanism, the second holding portion is pivoted with respect to the third holding portion against the biasing force of the third biasing member to a position detected by the first detection mechanism.

In this invention, preferably, a direction of an axis of the print object when viewed from a vertical direction is set as a front-rear direction, the ultraviolet irradiation device includes a cover having an opening in which an upper end portion of the print object is disposed and having a cover portion that covers the ultraviolet irradiator from above, a third cover mounted on the cover portion and closing a part of the opening in the front-rear direction, and a second detection mechanism configured to detect that the third cover is mounted on the cover portion, and when the second detection mechanism detects that the third cover is mounted on the cover portion, irradiation of the ultraviolet ray by the ultraviolet irradiator is enabled. With this configuration, when the cover and the third cover are not attached, the ultraviolet irradiator does not irradiate the ultraviolet ray, so the irradiation of the ultraviolet ray by the ultraviolet irradiator can be prevented in a state in which the operator of the printing device is in contact with the ultraviolet irradiator. Therefore, the safety of the ultraviolet irradiation device can be further enhanced.

In this invention, a direction orthogonal to an axis of the print object when viewed from a vertical direction is set as a left-right direction, for example, the rotating mechanism includes a first rotator that holds one end of the print object, a first holding portion that rotatably holds the first rotator, a motor that rotates the first rotator, a power transmission mechanism that connects the first rotator and the motor, a second rotator that holds the other end of the print object, a second holding portion that rotatably holds the second rotator, a third holding portion that pivotably holds the second holding portion so that the second holding portion is pivotable in the left-right direction, and a third biasing member that biases the second holding portion with respect to the third holding portion in a direction in which the second holding portion tilts toward the first holding portion, a position of the third holding portion in a direction of an axis of the print object is adjustable, a detection target member having a detection target portion detected by the second detection mechanism is attached to the third cover, the second detection mechanism is attached to the second holding portion, and the detection target portion is detected by the second detection mechanism when the third cover is mounted at a predetermined position of the cover portion while the print object is held by the rotating mechanism.

In this case, since the position of the third holding portion in the axial direction of the print object is adjusted according to the length of the print object, the second detection mechanism attached to the second holding portion can be moved according to the length of the print object to be arranged at a predetermined position. Therefore, even when the third cover is moved according to the length of the print object or the third cover is replaced according to the length of the print object, the second detection mechanism can detect that the third cover is mounted at an appropriate position of the cover portion.

The ultraviolet irradiation device of this invention can be used in a printing device including a table on which the ultraviolet irradiation device is mounted and an inkjet head that is disposed above the print object and ejects the ink toward an outer peripheral surface of the print object. In this printing device, an ultraviolet ray can be more quickly irradiated on the ink landed on the outer peripheral surface of the print object.

Effect of the Invention

As described above, in this invention, the ultraviolet irradiation device can quickly irradiate the outer peripheral surface of the print object with the ultraviolet ray with the ink landed on the outer peripheral surface. Furthermore, the printing device of this invention can quickly irradiate the outer peripheral surface of the print object with the ultraviolet ray with the ink landed on the outer peripheral surface.

DESCRIPTION OF EMBODIMENTS

Hereinafter, embodiments of this invention will be described with reference to the drawings.

(Schematic Configuration of Printing Device)

Figure 1:
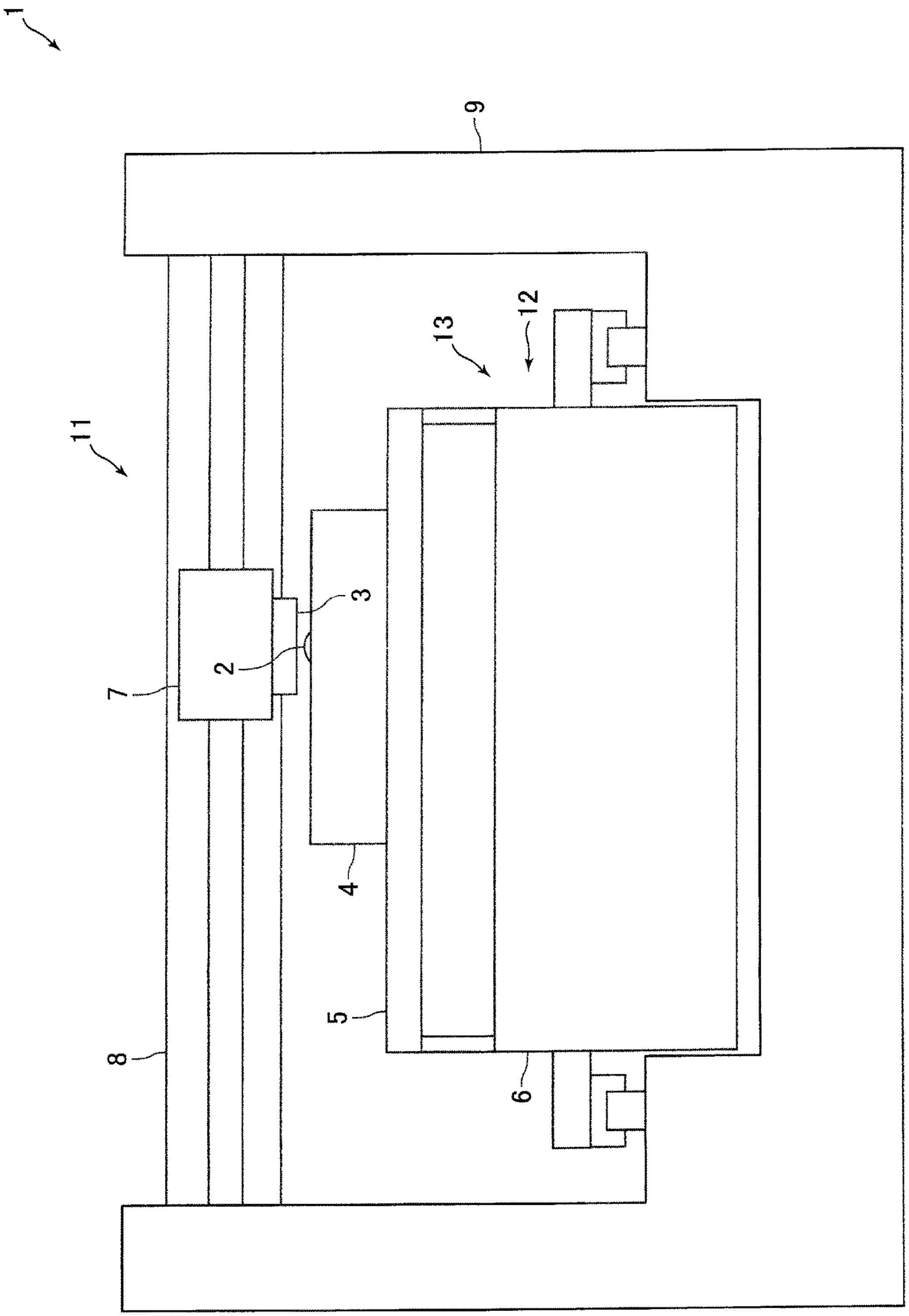
FIG. 1 is a front view showing a schematic configuration of a printing device according to an embodiment of this invention.

FIG. 1 is a front view showing a schematic configuration of a printing device 1 according to an embodiment of this invention.

The printing device 1 according to the present embodiment is an apparatus for performing printing on the outer peripheral surface of the print object 2 using ultraviolet-curable ink. The printing device 1 is, for example, a business inkjet printer. The print object 2 is a three-dimensional object, and has, for example, a columnar, truncated conical, or conical outer shape. The print object 2 is formed in a tubular shape, for example. That is, the print object 2 is formed in a cylindrical shape, a truncated conical shape, or a conical shape. The print object 2 is made of resin, for example. In the printing device 1, a plurality of types of print objects 2 having different outer diameters and lengths can be printed. For example, the outer diameter of the print object 2 that can be printed by the printing device 1 is 40 to 110 (mm).

The printing device 1 includes an inkjet head 3, an ultraviolet irradiation device 4, a stage 6, a carriage 7, a Y bar 8, and a body frame 9. The inkjet head 3 ejects the ultraviolet-curable ink toward the outer peripheral surface of the print object 2. The ultraviolet irradiation devices 4 cure the inks ejected on the outer peripheral surface of the print object 2. The stage 6 has a table 5 on which the ultraviolet irradiation device 4 is mounted. The inkjet head 3 is mounted on the carriage 7. The Y bar 8 holds the carriage 7 so as to be movable in the main scanning direction. The body frame 9 holds the stage 6 so as to be movable in a sub-scanning direction orthogonal to the vertical direction (vertical direction) and the main scanning direction.

The printing device 1 further includes a carriage drive mechanism 11 that moves the carriage 7 in the main scanning direction with respect to the Y bar 8, a stage drive mechanism 12 that moves the stage 6 in the sub-scanning direction with respect to the body frame 9, and a table lift mechanism 13 that lifts and lowers the table 5. The carriage drive mechanism 11 includes, for example, a motor and a power transmission mechanism such as a belt and a pulley that transmits power of the motor to the carriage 7. The stage drive mechanism 12 includes, for example, a motor and a power transmission mechanism such as a belt and a pulley that transmits power of the motor to the stage 6. The table lift mechanism 13 includes, for example, a motor and a power transmission mechanism such as a ball screw that transmits power of the motor to the table 5.

Figure 3:
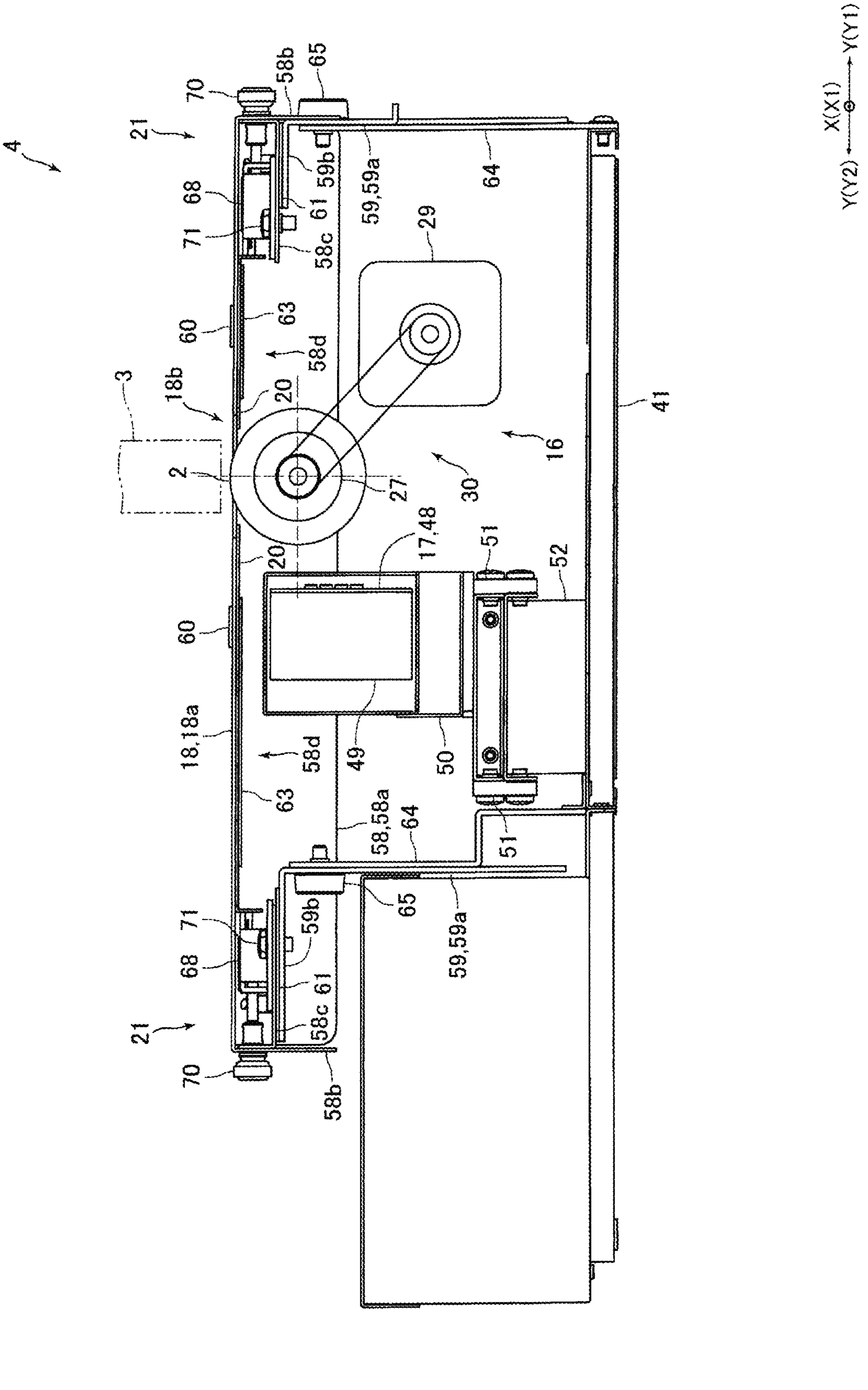
FIG. 3 is a front view for explaining a configuration of the ultraviolet irradiation device shown in FIG. 2.

The upper surface of the table 5 is a plane orthogonal to the vertical direction. The ultraviolet irradiation device 4 mounted on the table 5 is disposed below the inkjet head 3. The print object 2 is held by the ultraviolet irradiation device 4 and disposed below the inkjet head 3. That is, the inkjet head 3 is disposed above the print object 2. The inkjet head 3 ejects ink downward. In FIG. 3, a vertical line passing through the axis of the print object 2 is indicated by an alternate long and short dash line. The inkjet head 3 is disposed above the print object 2 on the vertical line, that is, above the print object 2.

The ink ejected from the inkjet head 3 lands on the outer peripheral surface of the print object 2 at the upper end portion of the print object 2. That is, the ink ejected from above the print object 2 lands on the outer peripheral surface of the print object 2. The lower surface of the inkjet head 3 is a nozzle surface on which a plurality of nozzles for ejecting ink is arranged. The distance (gap) between the nozzle surface of the inkjet head 3 and the upper end of the print object 2 is, for example, 2 (mm).

(Overall Configuration of Ultraviolet Irradiation Device)

Figure 2:
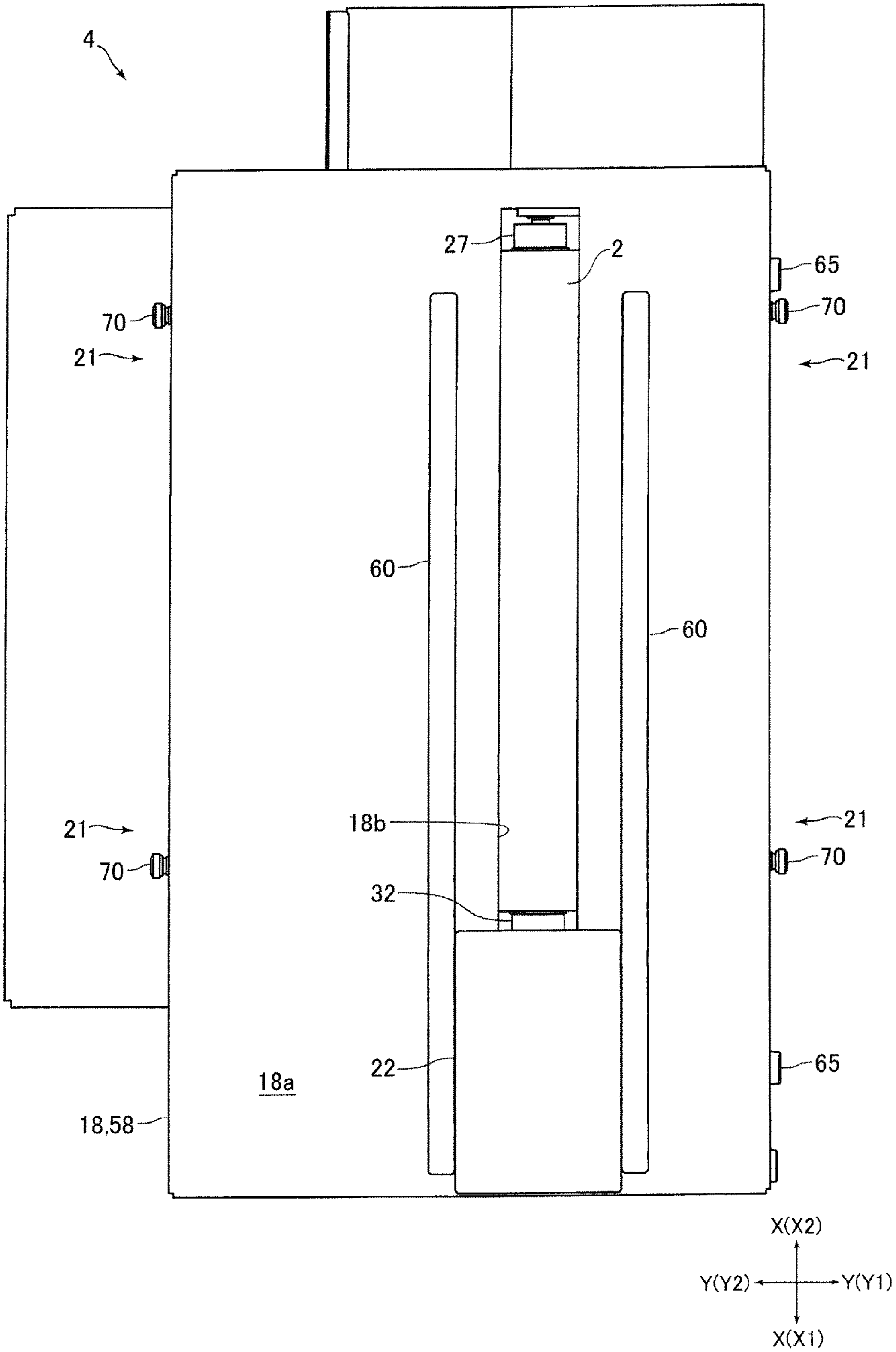
FIG. 2 is a plan view of the ultraviolet irradiation device shown in FIG. 1.

FIG. 2 is a plan view of the ultraviolet irradiation device 4 shown in FIG. 1. FIG. 3 is a front view for explaining the configuration of the ultraviolet irradiation device 4 shown in FIG. 2.

The ultraviolet irradiation device 4 includes a rotating mechanism 16 that holds the print object 2 and rotates the print object 2 about the axis of the print object 2. In the present embodiment, when printing is performed on the print object 2 having a columnar outer shape, the axial direction of the print object 2 is parallel to the horizontal direction. On the other hand, when printing is performed on the print object 2 having a truncated conical or conical outer shape, the axial direction of the print object 2 is inclined with respect to the horizontal direction. At this time, the inclination angle in the axial direction of the print object 2 with respect to the horizontal direction is not so large, and is, for example, about 15° at the maximum.

In the following description, a direction of an axis of the print object 2 when viewed from the vertical direction (X direction in FIG. 2 and the like) is defined as a front-rear direction, and a direction orthogonal to the axis of the print object 2 when viewed from the vertical direction (Y direction in FIG. 2 and the like) is defined as a left-right direction. That is, a horizontal direction, that is, the axial direction of the print object 2 when viewed from the vertical direction is defined as the front-rear direction, and a horizontal direction, that is, the direction orthogonal to the axis of the print object 2 when viewed from the vertical direction is defined as the left-right direction. In the following description, the X1 direction side in FIG. 2 and the like, which is one side in the front-rear direction, is referred to as a "front" side, the X2 direction side in FIG. 2 and the like, which is the opposite side, is referred to as a "rear" side, the Y1 direction side in FIG. 2 and the like, which is one side in the left-right direction, is referred to as a "right" side, and the Y2 direction side in FIG. 2 and the like, which is the opposite side, is referred to as a "left" side.

In the present embodiment, the ultraviolet irradiation device 4 is mounted on the table 5 so that the left-right direction and the main scanning direction coincide with each other (that is, so that the front-rear direction and the sub-scanning direction coincide with each other). In the present embodiment, the printing is carried out on the print object 2 while the print object 2 is rotated by the rotating mechanism 16 with the inkjet head 3 stopped at a certain position. Furthermore, in the present embodiment, the length (length in the direction of the axis) of the print object 2 is longer than the width in the front-rear direction of the inkjet head 3. Thus, when performing the printing of the print object 2, the table 5 is moved in the front-rear direction (sub-scanning direction) in stages.

The ultraviolet irradiation device 4 includes an ultraviolet irradiator 17 that irradiates the outer peripheral surface of the print object 2 to which the ink is attached with an ultraviolet ray, and a cover 18 having a cover portion 18*a* that covers the ultraviolet irradiator 17 from above. The cover portion 18*a* has an opening 18*b* through which the upper end portion of the print object 2 is disposed. The ultraviolet irradiator 17 is disposed on the side of the print object 2.

In FIG. 3, a horizontal line passing through the axis of the print object 2 and orthogonal to the vertical line of the alternate long and short dash line is indicated by a broken line. In other words, the horizontal line (broken line) is a line segment obtained by rotating the vertical line (one-dot chain line) by 90° about the axis of the print object 2. The ultraviolet irradiator 17 is disposed on one side of the print object 2 on the horizontal line, that is, on the lateral side. In other words, the ultraviolet irradiator 17 extends from the inkjet head 3 to a region including a position rotated by 90° about the axis of the print object 2.

As an example, the ultraviolet irradiator 17 is disposed on the left side of the print object 2. The ultraviolet irradiator 17 irradiates the print object 2 with an ultraviolet ray from the side of the print object 2. In other words, the ultraviolet irradiator 17 irradiates the print object 2 with an ultraviolet ray from the left side of the print object 2.

In the present embodiment, when performing printing on the print object 2, the rotating mechanism 16 rotates the print object 2 in a counterclockwise direction when viewed from the front side. As described above, the ultraviolet irradiator 17 is disposed on the left side of the print object 2. In other words, the ultraviolet irradiator 17 is disposed on the side of the print object 2, and is disposed on the downstream side of the landing point of the ink on the outer peripheral surface of the print object 2 in the rotation direction of the print object 2 by the rotating mechanism 16. The ultraviolet irradiator 17 irradiates the print object 2 with an ultraviolet ray from the left side of the print object 2. In other words, the ink landed on the surface of the print object 2 in the inkjet head 3 is irradiated with an ultraviolet ray in a region including a position rotated 90° about the axis of the print object 2. Thus, after the ink landed on the print object 2 at the upper end portion of the print object 2, the portion where the ink landed on the outer peripheral surface of the print object 2 is irradiated with an ultraviolet ray before the print object 2 rotates by 180°.

When the print object 2 is rotated in the clockwise direction, the ultraviolet irradiator 17 may be disposed on the right side of the print object 2.

The ultraviolet irradiation device 4 includes two second covers 20 for closing a part of the opening 18*b* from the outer side in the left-right direction, and a cover position adjustment mechanism 21 for adjusting the position in the left-right direction of each of the two second covers 20. That is, the position of each of the two second covers 20 in the left-right direction is adjustable. The ultraviolet irradiation device 4 of the present embodiment includes four cover position adjustment mechanisms 21. The ultraviolet irradiation device 4 further includes a third cover 22 that closes a part of the opening 18*b* in the front-rear direction. The third cover 22 is mounted on the cover portion 18*a*. The ultraviolet irradiation device 4 further includes a first detection mechanism 23 (see FIGS. 6A to 6C) for detecting that the print object 2 is held by the rotating mechanism 16, and a second detection mechanism 24 (see FIG. 15) for detecting that the third cover 22 is mounted on the cover portion 18*a*. In FIG. 3, the illustration of the third cover 22 is omitted.

(Configuration of Rotating Mechanism and Peripheral Portion of Rotating Mechanism)

Figure 4:
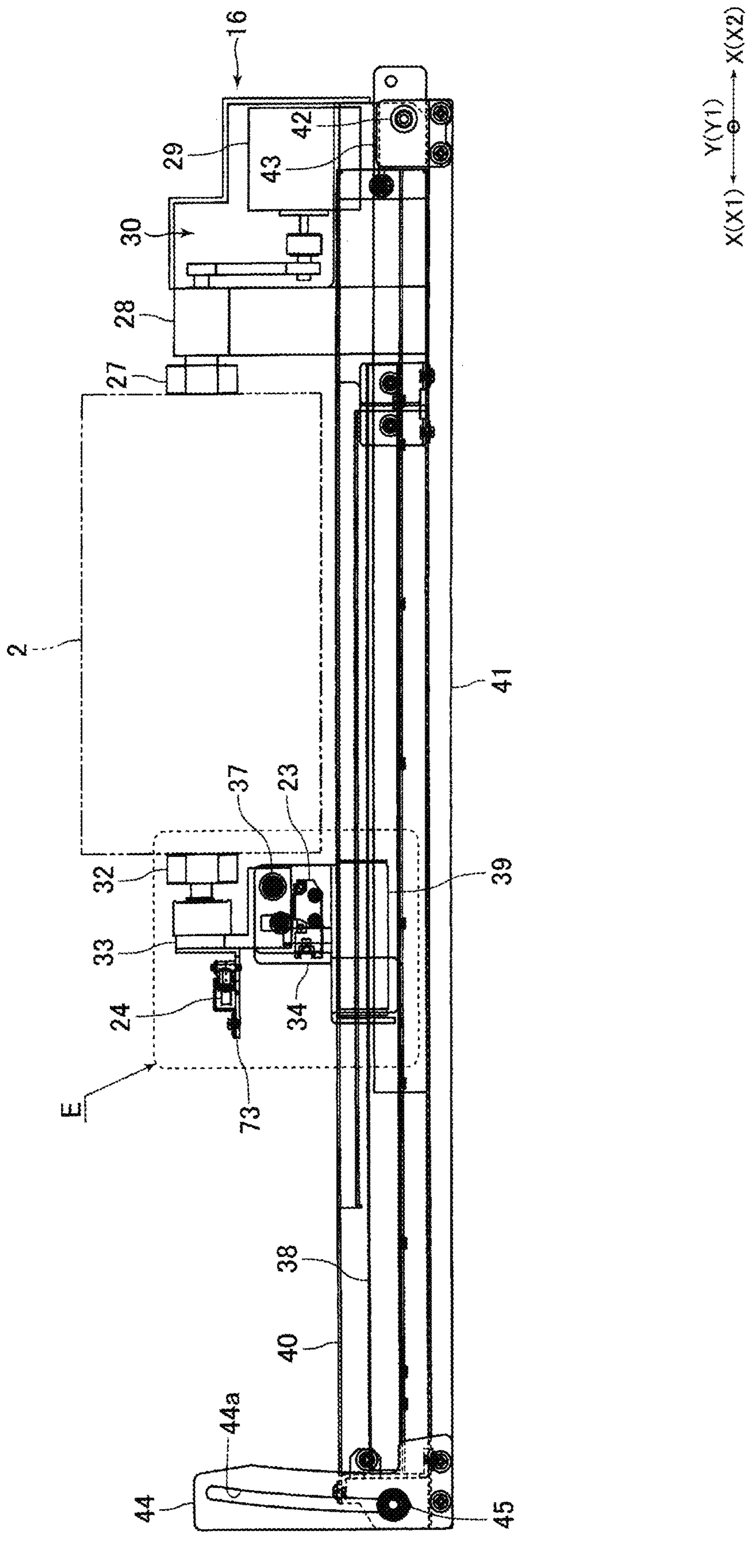
FIG. 4 is a side view for explaining the configuration of the rotating mechanism and its peripheral portion shown in FIG. 3.
Figure 5:
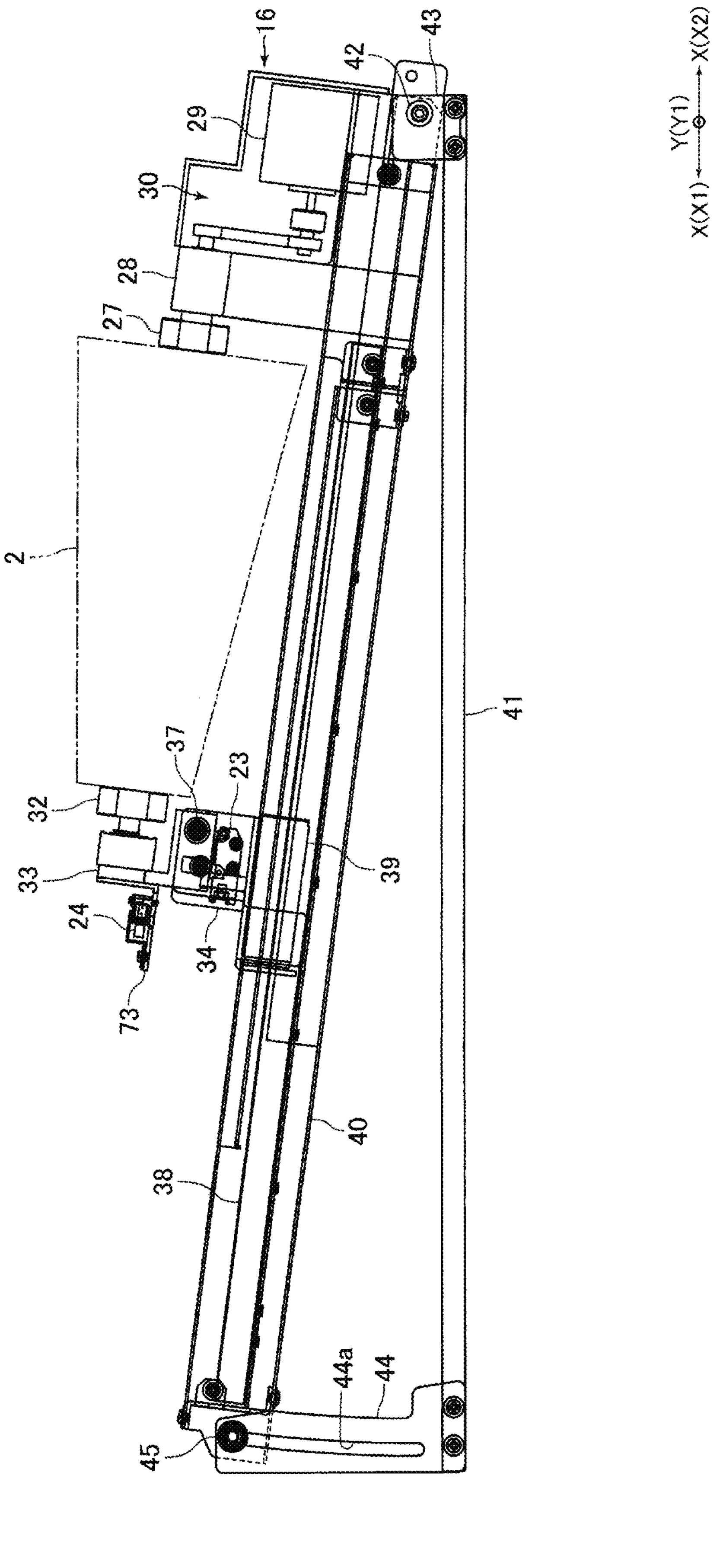
FIG. 5 is a side view for explaining the configuration of the rotating mechanism and its peripheral portion shown in FIG. 3.
Figure 6A:
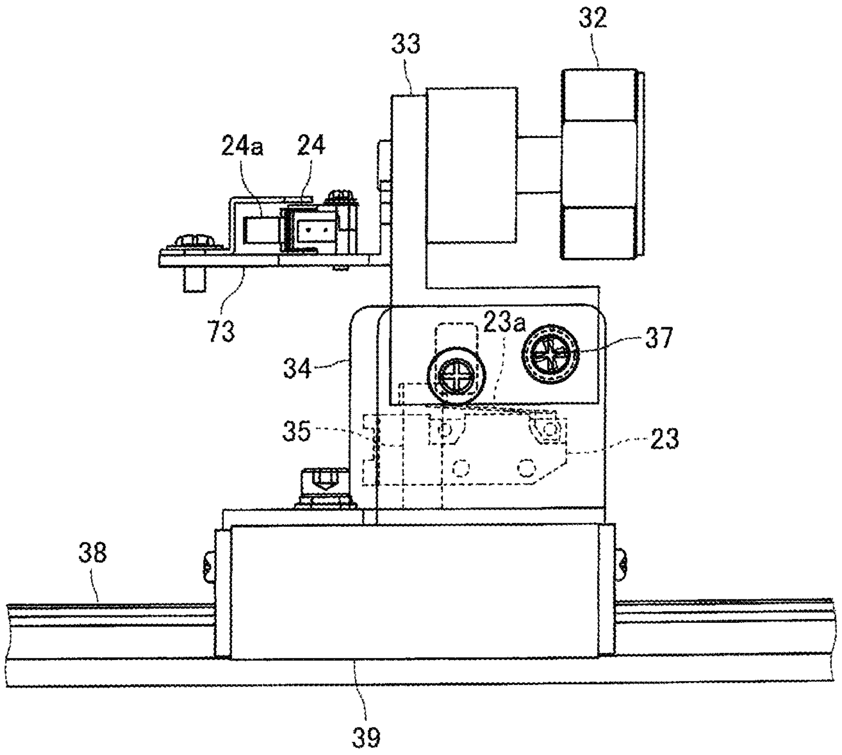
FIG. 6A, FIG. 6B and FIG. 6C are enlarged views for explaining a configuration of portion E in FIG. 4.
Figure 6B:
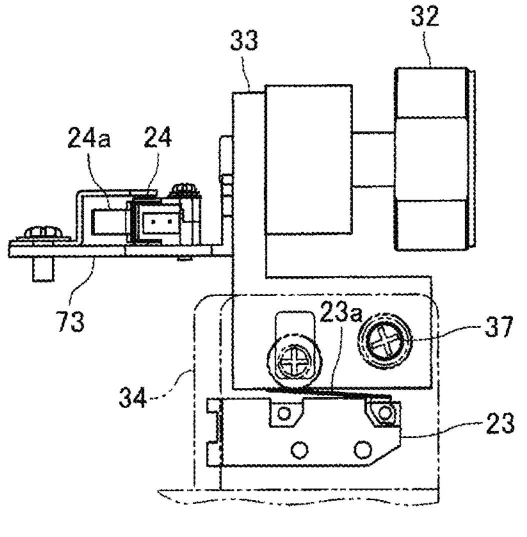
Figure 6C:
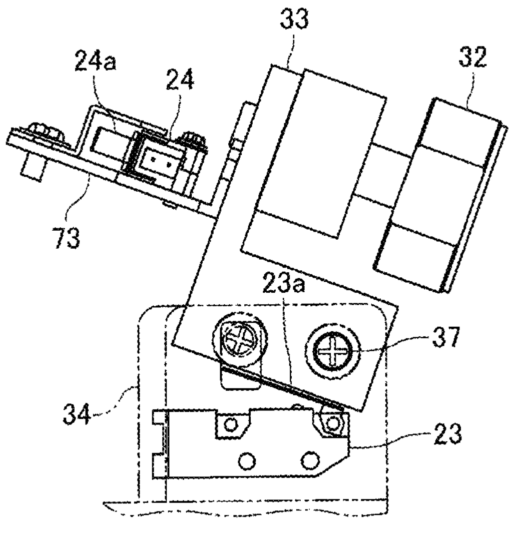

FIGS. 4 and 5 are side views for explaining the configuration of the rotating mechanism 16 and its peripheral portion illustrated in FIG. 3. FIG. 6A, FIG. 6B and FIG. 6C are enlarged views for explaining a configuration of portion E in FIG. 4.

The rotating mechanism 16 includes a first rotator 27, a first holding portion 28, a motor 29, a power transmission mechanism 30, a second rotator 32, a second holding portion 33, a third holding portion 34, and a compression coil spring 35 (see FIG. 6A). The first rotator 27 holds one end of the print object 2. The first holding portion 28 rotatably holds the first rotator 27. The motor 29 rotates the first rotator 27. The power transmission mechanism 30 connects the first rotator 27 and the motor 29. The second rotator 32 holds the other end of the print object 2. The second holding portion 33 rotatably holds the second rotator 32. The third holding portion 34 pivotably holds the second holding portion 33 so that the second holding portion 33 can pivot in the left-right direction. The compression coil spring 35 as a third biasing member biases the second holding portion 33 with respect to the third holding portion 34. The compression coil spring 35 biases the second holding portion 33 in a direction in which the second holding portion is inclined toward the first holding portion 28.

The first rotator 27 and the second rotator 32 rotate together with the print object 2. The first rotator 27 holds the rear end of the print object 2, and the second rotator 32 holds the front end of the print object 2. The first rotator 27, the first holding portion 28, the motor 29, and the power transmission mechanism 30 are disposed behind the print object 2. The second rotator 32, the second holding portion 33, the third holding portion 34, and the compression coil spring 35 are disposed on the front side of the print object 2. The power transmission mechanism 30 includes a belt and a pulley. Note that the power transmission mechanism 30 may be configured by a gear train.

The second holding portion 33 is pivotably connected to an upper end portion of the third holding portion 34. The second holding portion 33 is pivotable with respect to the third holding portion 34 about a pivot center shaft 37 disposed on the rear end side of the upper end portion of the third holding portion 34. The compression coil spring 35 is disposed on the front side of the pivot center shaft 37. The compression coil spring 35 is in contact with the second holding portion 33 from below, and biases the second holding portion 33 upward. That is, the second holding portion 33 is biased by the compression coil spring 35 in the clockwise direction in FIG. 6 FIGS. 6A to 6C about the pivot center shaft 37.

When the print object 2 is not attached to the rotating mechanism 16, the second holding portion 33 is inclined toward the first holding portion 28 by the biasing force of the compression coil spring 35 (see FIG. 6C). When the print object 2 is not attached to the rotating mechanism 16, the axis of the second rotator 32 is inclined relative to the axis of the first rotator 27. When the print object 2 is attached to the rotating mechanism 16, the second holding portion 33 is pivoted against the biasing force of the compression coil spring 35 to a position where the axis of the second rotator 32 and the axis of the print object 2 coincide with each other.

The third holding portion 34 is movable in the axial direction of the print object 2, and the position of the third holding portion 34 in the axial direction of the print object 2 is adjustable. In the present embodiment, the positions of the second rotator 32, the second holding portion 33, and the third holding portion 34 in the axial direction of the print object 2 are adjusted according to the length of the print object 2. In the present embodiment, the inclination of the rotating mechanism 16 with respect to the horizontal direction when viewed from the left-right direction can be adjusted. That is, the inclination of the axis of the print object 2 with respect to the horizontal direction can be adjusted. In the present embodiment, as shown in FIG. 5, the inclination of the rotating mechanism 16 is adjusted when printing is performed on the outer peripheral surface of the print object 2 having a truncated conical or conical outer shape.

The rotating mechanism 16 includes a guide rail 38 that guides the third holding portion 34 in the axial direction of the print object 2, a guide block 39 that engages with the guide rail 38 and to which the third holding portion 34 is fixed, and a pivotable frame 40 to which the guide rail 38 is fixed. The pivotable frame 40 is elongated in the axial direction of the print object 2. A lower end portion of the first holding portion 28 is fixed to the pivotable frame 40. That is, the first rotator 27 is rotatably attached to the pivotable frame 40 via the first holding portion 28.

The guide block 39 is engaged with the guide rail 38 from above. The guide block 39 is disposed below the second holding portion 33. The third holding portion 34 is fixed to the guide block 39. That is, the second rotator 32 is rotatably attached to the pivotable frame 40 via the second holding portion 33, the third holding portion 34, the guide block 39, and the guide rail 38. The guide block 39 moves in the axial direction of the print object 2 together with the third holding portion 34.

The pivotable frame 40 has a screw insertion hole (not shown) elongated in the axial direction of the print object 2. A fixing screw 46 (see FIG. 15) for fixing the third holding portion 34 to the pivotable frame 40 is inserted into the screw insertion hole. A screw hole with which fixing screw 46 is engaged is formed in third holding portion 34. When the fixing screw 46 is loosened, the second rotator 32, the second holding portion 33, and the third holding portion 34 can be moved in the axial direction of the print object 2 along the guide rail 38.

The pivotable frame 40 is pivotable with respect to a lower frame 41 constituting a bottom surface of the ultraviolet irradiation device 4. Specifically, the pivotable frame 40 is pivotable with respect to the lower frame 41 in the left-right direction. The pivotable frame 40 is pivotable about a pivot center shaft 42 disposed on the rear end side of the ultraviolet irradiation device 4. A support frame 43 is fixed to a rear end portion of the lower frame 41. A pivot center shaft 42 is attached to the support frame 43. The support frames 43 are arranged at two locations at intervals in the left-right direction. Specifically, the support frame 43 is disposed on both end sides in the left-right direction of the pivotable frame 40.

A guide frame 44 is fixed to a front end portion of the lower frame 41. The guide frame 44 is formed with a guide hole 44*a* for guiding the pivotable frame 40 in a pivoting direction of the pivotable frame 40. The guide hole 44*a* penetrates the guide frame 44 in the left-right direction. The shape of the guide hole 44*a* when viewed from the left-right direction is an arc shape with the pivot center shaft 42 as the pivot center. The guide frames 44 are arranged at two locations at intervals in the left-right direction. Specifically, the guide frame 44 is disposed on both end sides in the left-right direction of the pivotable frame 40.

A fixing screw 45 for fixing the front end portion of the pivotable frame 40 to the guide frame 44 is inserted into the guide hole 44*a*. The fixing screw 45 is a thumb screw. A screw hole with which the fixing screw 45 is engaged is formed in a front end portion of the pivotable frame 40. When the fixing screw 45 is loosened, the pivotable frame 40 can be pivoted about the pivot center shaft 42 with respect to the lower frame 41, the support frame 43, and the guide frame 44. Further, the inclination of the rotating mechanism 16 with respect to the horizontal direction is adjusted by pivoting the pivotable frame 40.

In the present embodiment, when the print object 2 having a columnar outer shape is printed, as shown in FIG. 4, the pivotable frame 40 is fixed so that the axial direction of the print object 2 coincides with the front-rear direction. That is, when the print object 2 having the columnar outer shape is printed, the axis of the print object 2 is disposed on the horizontal plane. When the print object 2 having the truncated conical or conical outer shape is printed, as illustrated in FIG. 5, the pivotable frame 40 is fixed by adjusting the inclination of the rotating mechanism 16 so that the upper end of the print object 2 is parallel to the front-rear direction.

(Configuration of Ultraviolet Irradiator and Peripheral Portion of Ultraviolet Irradiator)

Figure 7:
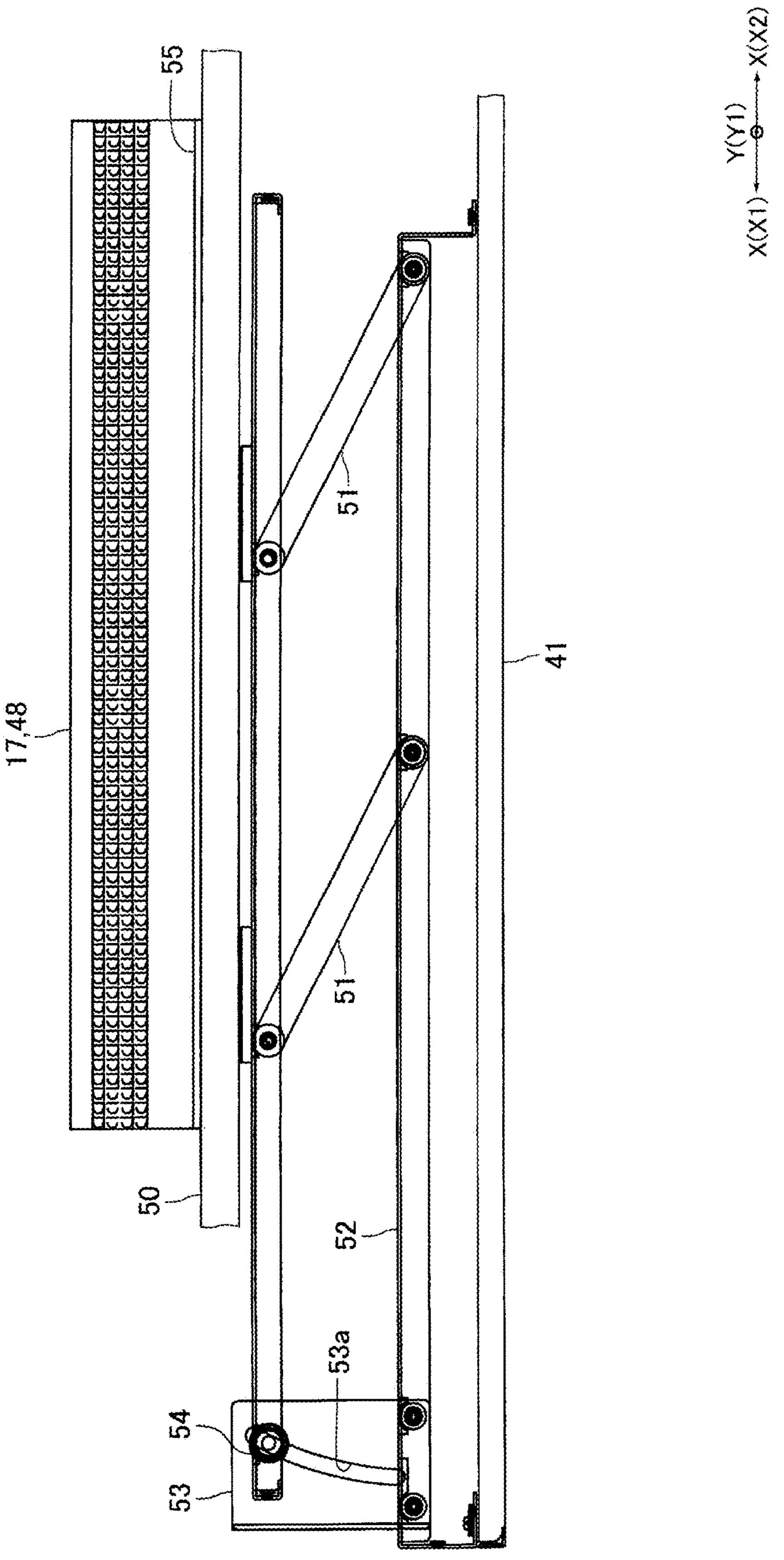
FIG. 7 is a side view for explaining a configuration of the ultraviolet irradiator shown in FIG. 3 and a peripheral portion thereof.
Figure 8:
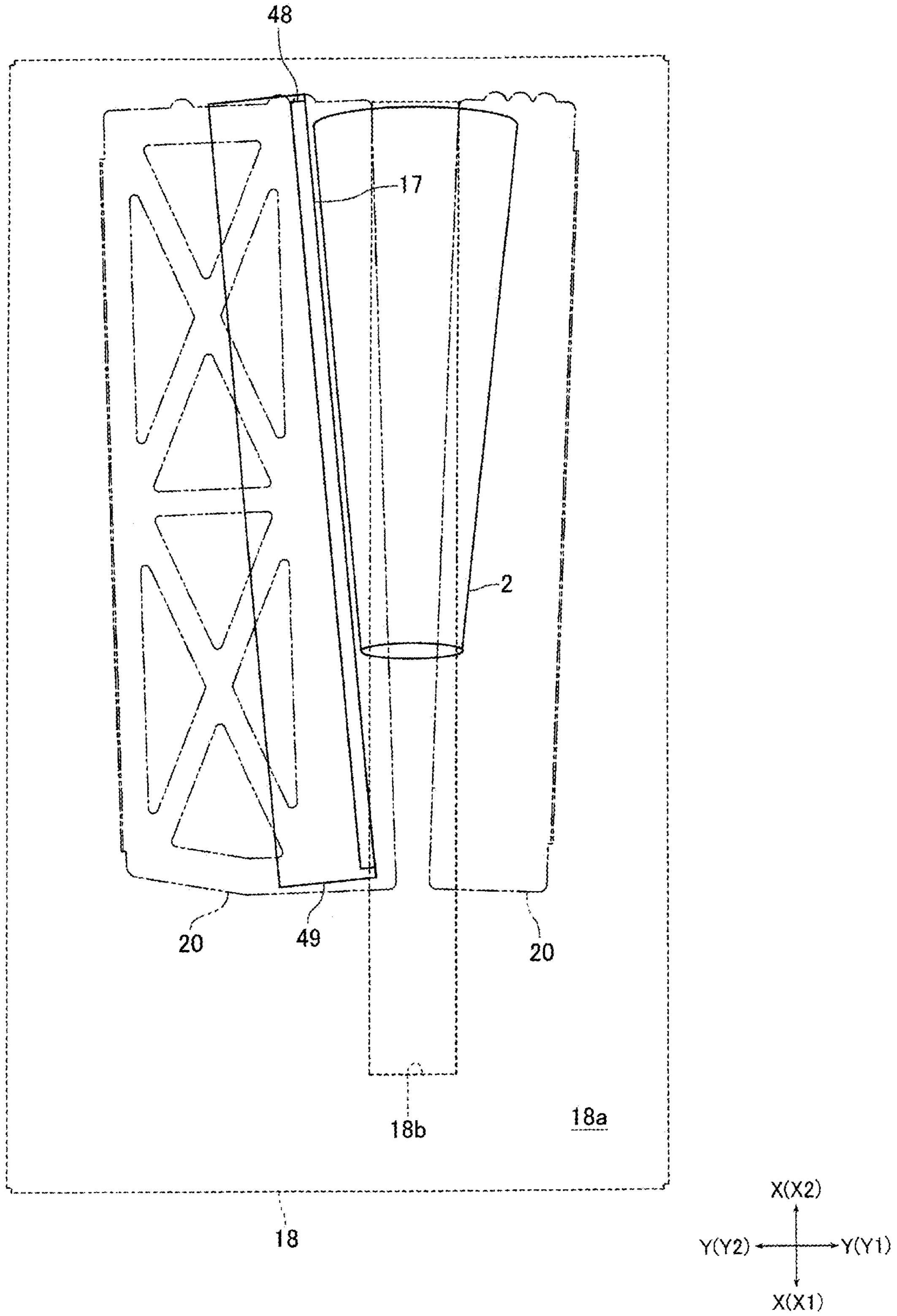
FIG. 8 is a plan view for explaining the state of an ultraviolet irradiator and the like when performing printing of a print object having a truncated conical or conical outer shape shown in FIG. 5.

FIG. 7 is a side view for explaining the configuration of the ultraviolet irradiator 17 and its peripheral portion shown in FIG. 3. FIG. 8 is a plan view for explaining the state of the ultraviolet irradiator 17 and the like when performing printing of the print object 2 having the truncated conical or conical outer shape shown in FIG. 5.

The ultraviolet irradiator 17 includes an LED substrate 48 on which a large number of LED chips that emit ultraviolet ray (ultraviolet ray) are mounted. The LED substrate 48 is formed in an elongated rectangular flat plate shape. The LED substrate 48 is disposed so that the short side direction of the LED substrate 48 formed in a rectangular shape when viewed from the left-right direction coincides with the vertical direction, and the long side direction of the LED substrate 48 coincides with the front-rear direction. As described above, the ultraviolet irradiator 17 is disposed on the left side of the print object 2. The ultraviolet irradiator 17 emits ultraviolet rays toward the right side in FIG. 3, that is, toward the print object 2. In the present embodiment, the position of the ultraviolet irradiator 17 in the vertical direction can be adjusted. Further, the position of the ultraviolet irradiator 17 in the left-right direction and the inclination of the ultraviolet irradiator 17 with respect to the axis of the print object 2 when viewed from the vertical direction can be adjusted.

The ultraviolet irradiator 17 is fixed to the holding portion 49. The holding portion 49 attached by the ultraviolet irradiator 17 is mounted on the mounting portion 50. The upper surface of the mounting portion 50 is a plane orthogonal to the vertical direction. One end portion of a pair of link members 51 parallel to each other is pivotably connected to the mounting portion 50. The other end portion of the link member 51 is pivotably connected to a holding frame 52 fixed to the lower frame 41. The holding frame 52 is disposed below the mounting portion 50.

The link member 51 is pivotable with respect to the mounting portion 50 and the holding frame 52 in the left-right direction. The pair of link members 51 is disposed at two positions spaced apart from each other in the left-right direction. Specifically, as illustrated in FIG. 3, the pair of link members 51 is disposed on both end sides of the mounting portion 50 and the holding frame 52 in the left-right direction. In the present embodiment, a parallel link mechanism is formed by the mounting portion 50, the link member 51, and the holding frame 52.

As illustrated in FIG. 7, a guide frame 53 is fixed to a front end portion of the holding frame 52. The guide frame 53 is formed with a guide hole 53*a* for guiding the mounting portion 50 in the vertical direction. The guide hole 53*a* penetrates the guide frame 53 in the left-right direction. The guide hole 53*a* is formed in an arc shape. The guide frames 53 are arranged at two locations at intervals in the left-right direction. Specifically, the guide frame 53 is disposed on both end sides of the mounting portion 50 and the holding frame 52 in the left-right direction.

A fixing screw 54 for fixing the front end portion of the mounting portion 50 to the guide frame 53 is inserted into the guide hole 53*a*. The fixing screw 54 is a thumb screw. A screw hole with which the fixing screw 54 is engaged is formed at the front end portion of the mounting portion 50. When the fixing screw 54 is loosened, the mounting portion 50 can be moved up and down with respect to the lower frame 41, the holding frame 52, and the guide frame 53. The vertical position of the ultraviolet irradiator 17 is adjusted by raising and lowering the mounting portion 50. In the present embodiment, the vertical position of the ultraviolet irradiator 17 is adjusted according to the outer shape of the print object 2 so that the optimum location on the outer peripheral surface of the print object 2 is irradiated with an ultraviolet ray.

A magnet sheet 55 which is a sheet-like permanent magnet is attached to a lower surface of the holding portion 49. The member constituting the upper surface of the mounting portion 50 is a magnetic member made of a magnetic metal material. The holding portion 49 is fixed to the upper surface of the mounting portion 50 by a magnetic adsorption force generated between the magnet sheet 55 and the upper surface of the mounting portion 50. In the present embodiment, the position of the ultraviolet irradiator 17 in the left-right direction is adjusted by moving the holding portion 49 fixed to the upper surface of the mounting portion 50 in the left-right direction by the magnetic adsorption force. Furthermore, by inclining the holding portion 49 fixed to the upper surface of the mounting portion 50 by the magnetic adsorption force in the horizontal plane, the inclination of the ultraviolet irradiator 17 with respect to the axis of the print object 2 when viewed from the vertical direction is adjusted.

In the present embodiment, when printing is performed on the print object 2 having a columnar outer shape, the ultraviolet irradiator 17 is installed so that the ultraviolet emitting surface of the ultraviolet irradiator 17 is parallel to the front-rear direction. When the print object 2 having the truncated conical or conical outer shape is printed, as shown in FIG. 8, the inclination of the ultraviolet irradiator 17 is adjusted so that the ultraviolet emitting surface of the ultraviolet irradiator 17 becomes parallel to the left end of the print object 2, and the ultraviolet irradiator 17 is installed.

(Configuration of Cover, Second Cover, Cover Position Adjustment Mechanism, and Third Cover)

Figure 9:
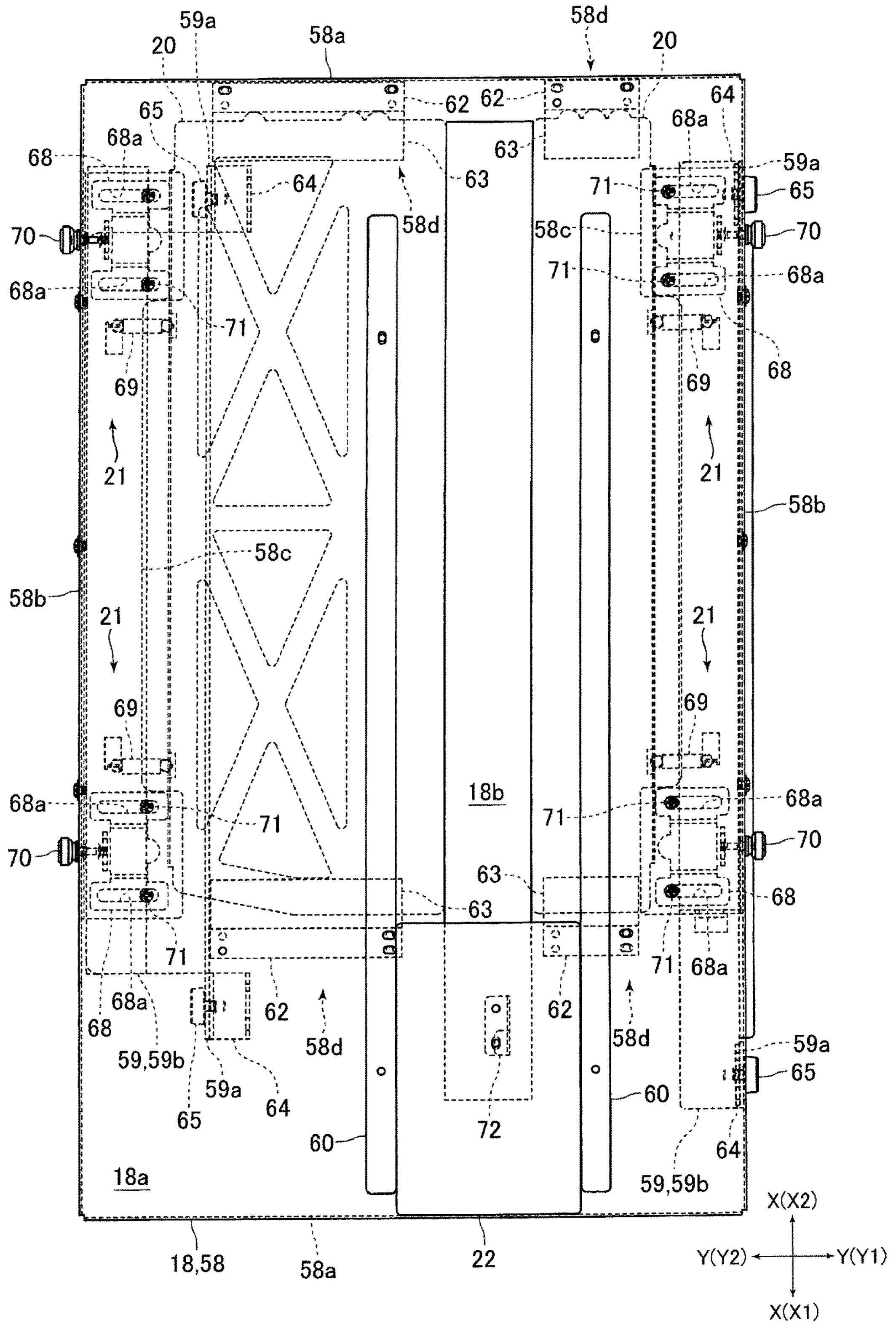
FIG. 9 is a plan view of the cover, the second cover, the cover position adjustment mechanism, the third cover, and the like illustrated in FIG. 3.
Figure 10:
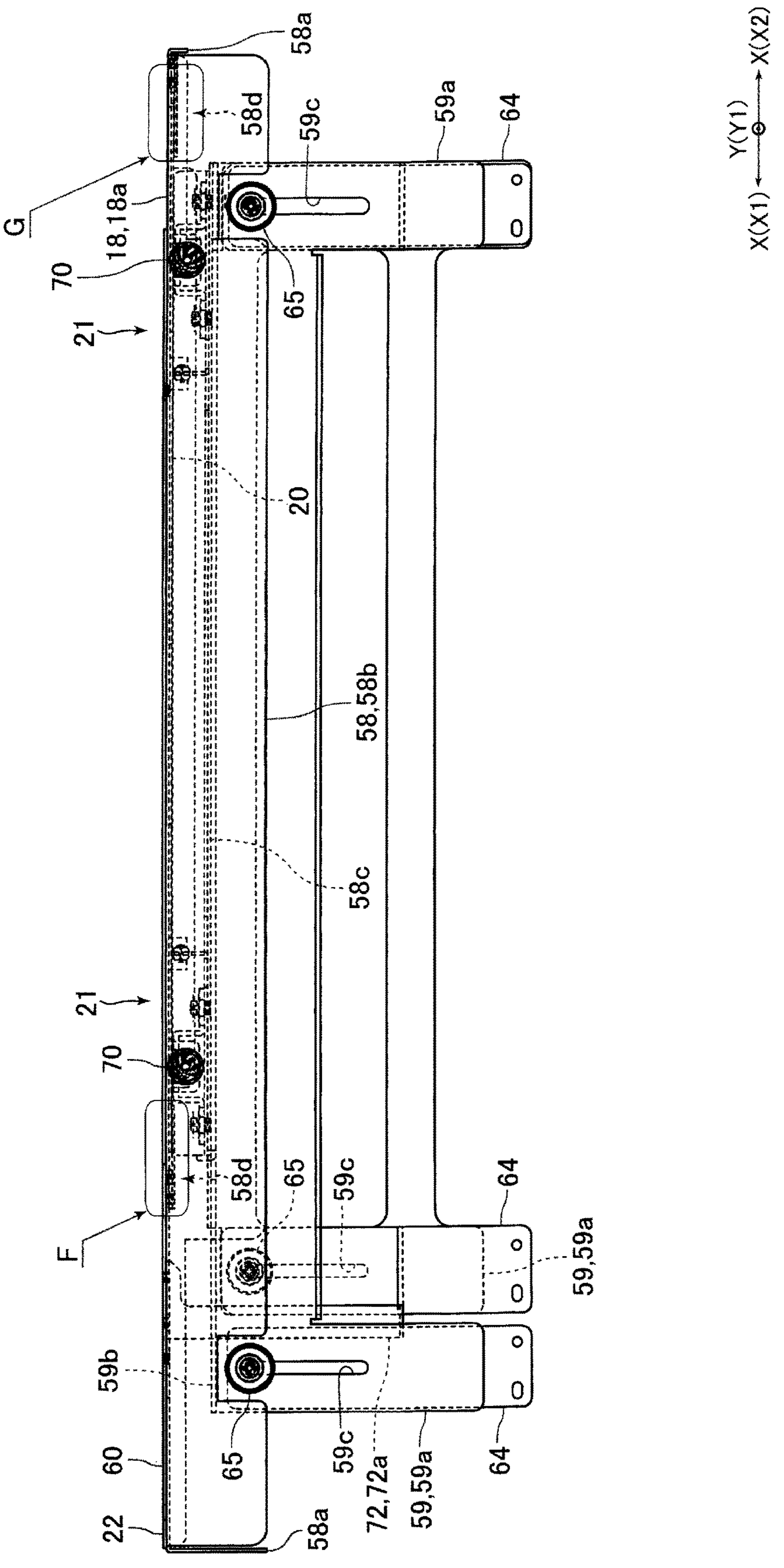
FIG. 10 is a side view of the cover, the second cover, the cover position adjustment mechanism, the third cover, and the like illustrated in FIG. 9.
Figure 11:
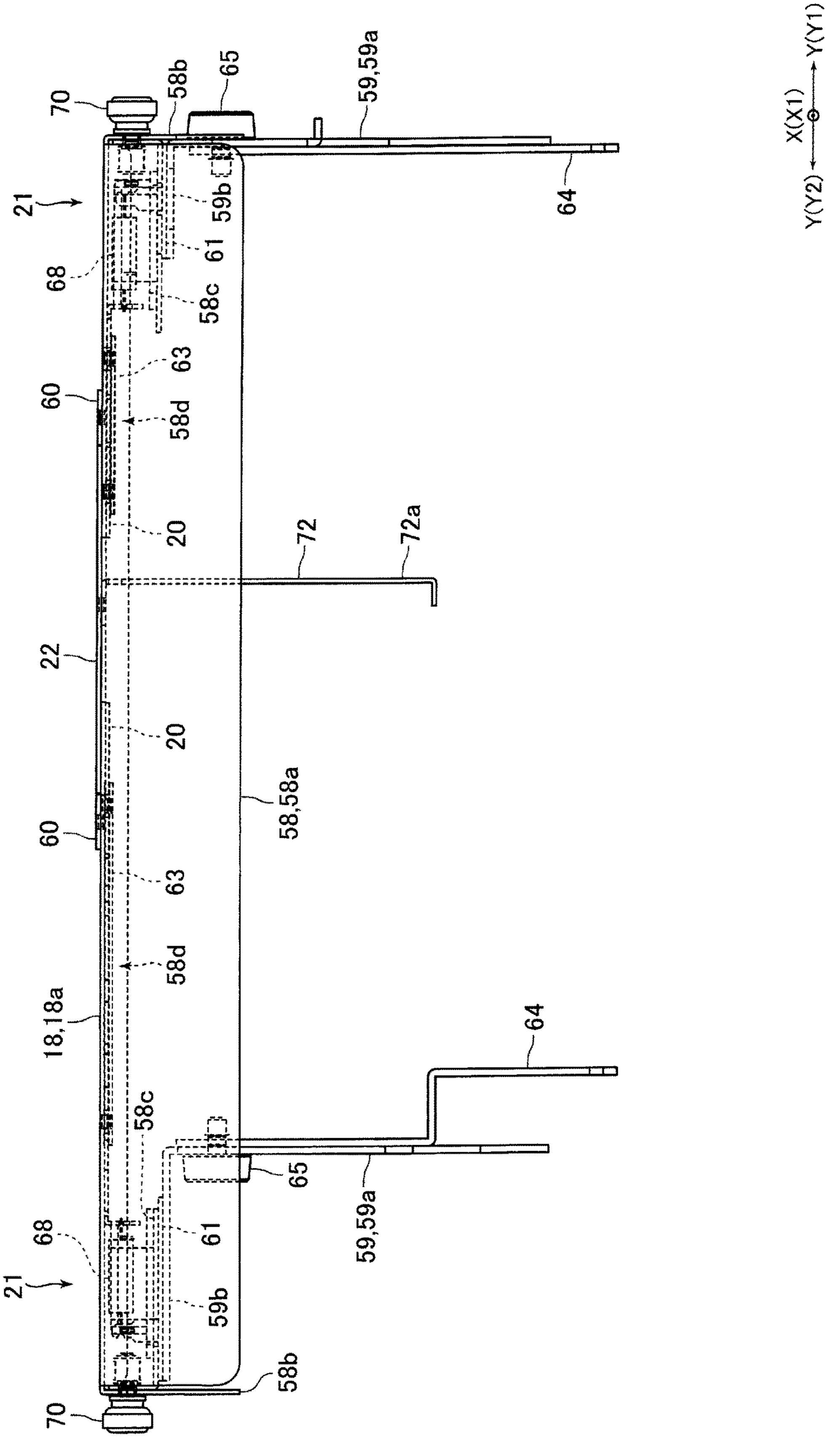
FIG. 11 is a front view of the cover, the second cover, the cover position adjustment mechanism, the third cover, and the like illustrated in FIG. 9.
Figure 12:
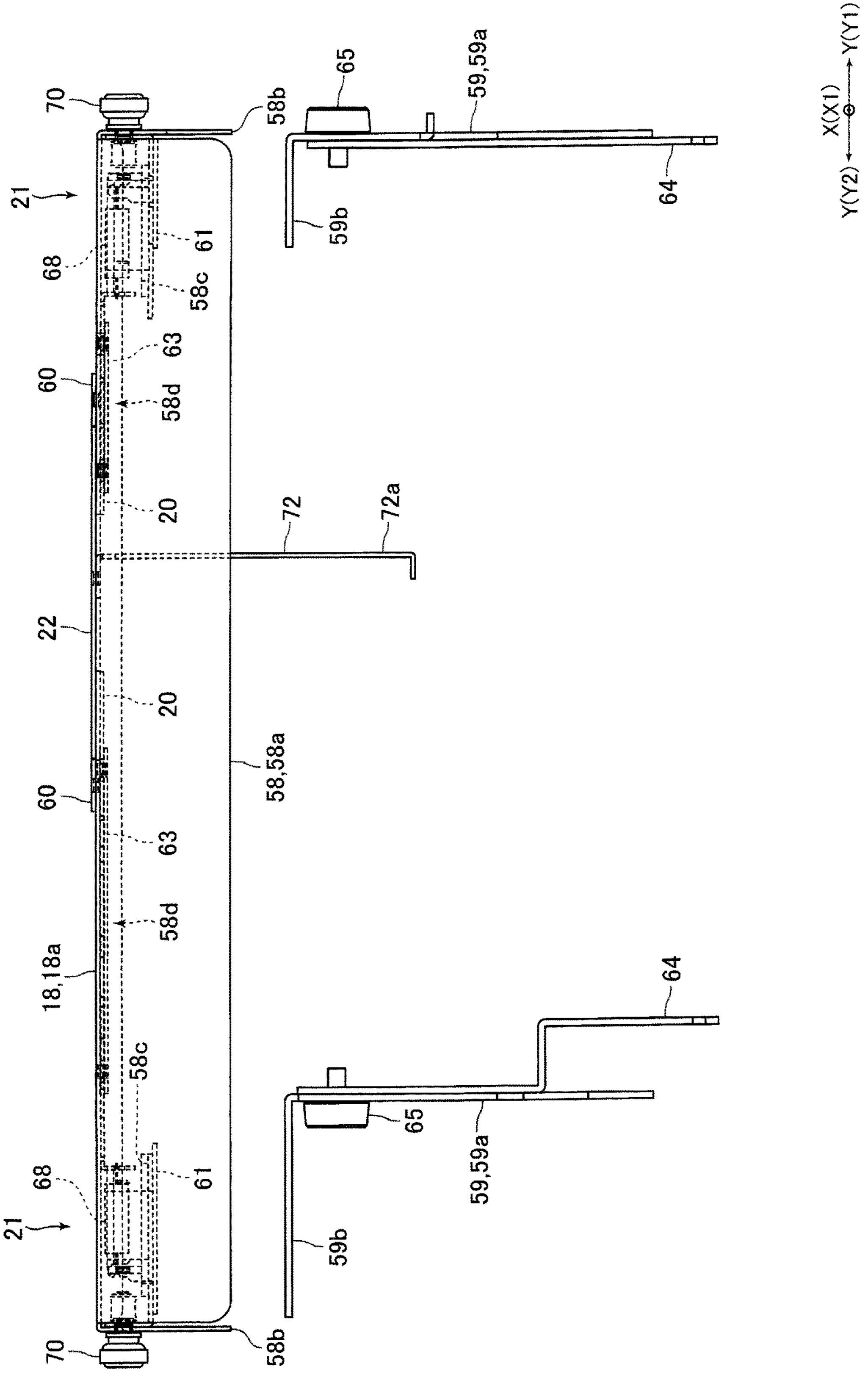
FIG. 12 is a front view illustrating a state in which the cover upper portion and the cover lower portion illustrated in FIG. 11 are separated.
Figure 13A:
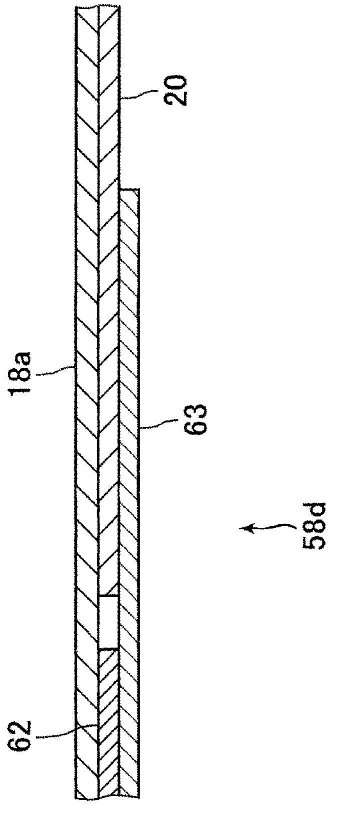
FIG. 13A is an enlarged view for explaining a configuration of portion F in FIG. 10.
Figure 13B:
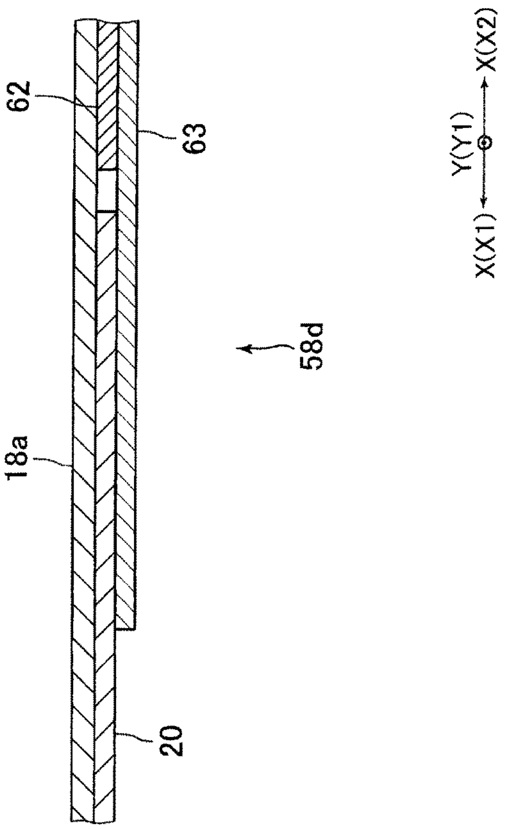
FIG. 13B is an enlarged view for explaining a configuration of portion G in FIG. 10.
Figure 14A:
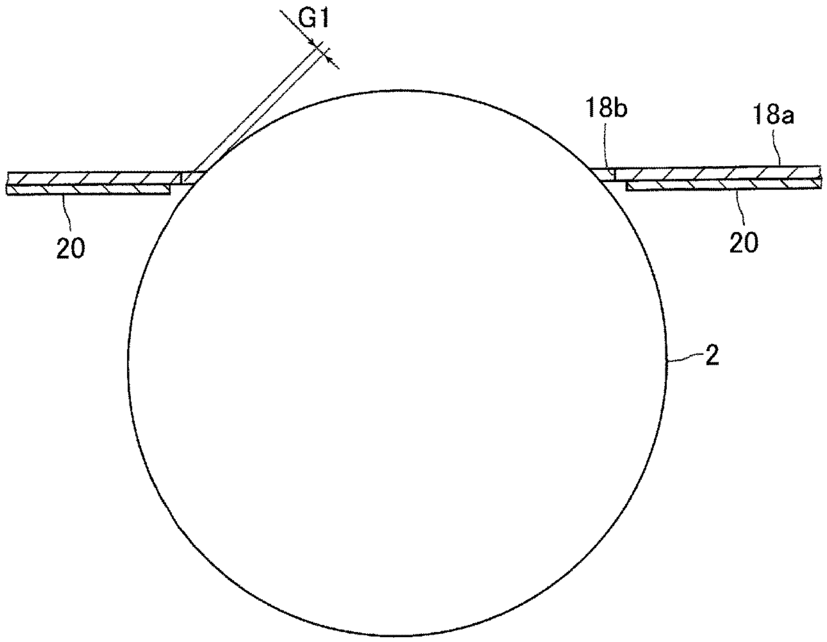
FIG. 14A and FIG. 14B are front views for explaining an arrangement relationship between the cover portion and the second cover shown in FIG. 9 and the print object.
Figure 14B:
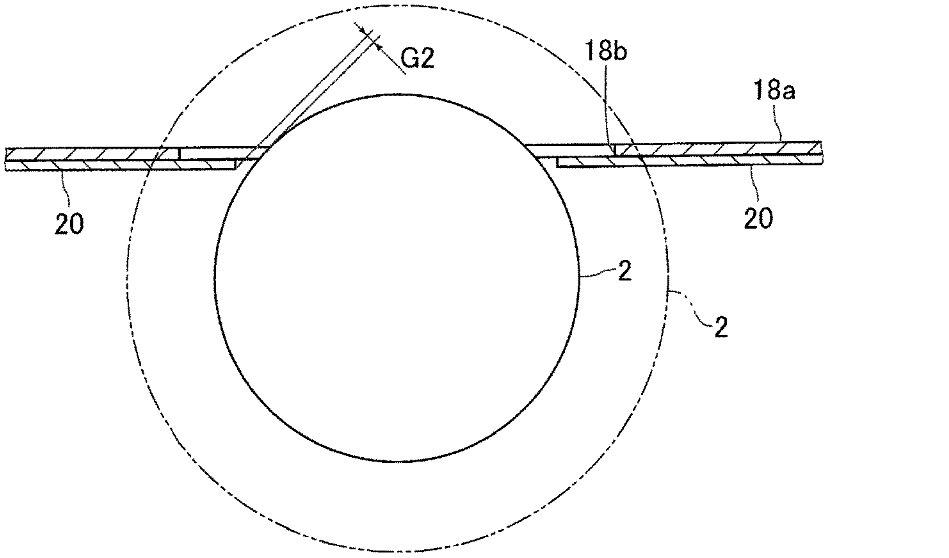

FIG. 9 is a plan view of the cover 18, the second cover 20, the cover position adjustment mechanism 21, the third cover 22, and the like illustrated in FIG. 3. FIG. 10 is a side view of the cover 18, the second cover 20, the cover position adjustment mechanism 21, the third cover 22, and the like illustrated in FIG. 9. FIG. 11 is a front view of the cover 18, the second cover 20, the cover position adjustment mechanism 21, the third cover 22, and the like illustrated in FIG. 9. FIG. 12 is a front view illustrating a state in which the cover upper portion 58 and the cover lower portion 59 illustrated in FIG. 11 are separated. FIG. 13A is an enlarged view for explaining a configuration of portion F in FIG. 10, and FIG. 13B is an enlarged view for explaining a configuration of portion G in FIG. 10. FIG. 14A and FIG. 14B are front views for explaining an arrangement relationship between the cover portion 18*a* and the second cover 20 shown in FIG. 9 and the print object 2.

The cover 18 includes a cover upper portion 58 including a cover portion 18*a* and a cover lower portion 59 to which the cover upper portion 58 is attached on an upper end side. The cover 18 of the present embodiment includes one cover upper portion 58 and two cover lower portions 59. The two cover lower portions 59 are arranged at intervals in the left-right direction. The cover lower portion 59 arranged on the right side supports the right end portion of the cover upper portion 58 from the lower side, and the cover lower portion 59 arranged on the left side supports the left end portion of the cover upper portion 58 from the lower side. In the present embodiment, the position of the cover 18 in the vertical direction can be adjusted. Specifically, the position of the cover lower portion 59 in the vertical direction can be adjusted.

The cover portion 18*a* is formed in a rectangular flat plate shape. The cover portion 18*a* is disposed so that the thickness direction of the cover portion 18*a* coincides with the vertical direction. The cover portion 18*a* is disposed so that the long side direction of the cover portion 18*a* coincides with the front-rear direction. The cover portion 18*a* constitutes the upper surface of the cover 18 and constitutes the upper surface of the cover upper portion 58.

The opening 18*b* is a through-hole penetrating the cover portion 18*a* in the vertical direction. The opening 18*b* is formed in a rectangular shape elongated in the front-rear direction. The front-rear direction length of the opening 18*b* is longer than the longest print object 2 in the print objects 2 on which printing is performed by the printing device 1. A guide plate 60 for positioning the third cover 22 in the left-right direction is fixed to the upper surface of the cover portion 18*a*. The guide plate 60 is formed in a rectangular flat plate shape elongated in the front-rear direction. The guide plates 60 are arranged at two locations at intervals in the left-right direction. The two guide plates 60 are disposed so as to sandwich the opening 18*b* in the left-right direction.

The cover upper portion 58 includes two flat plate-shaped side plate portions 58*a* constituting side surfaces of the cover upper portion 58 in the front-rear direction and two flat plate-shaped side plate portions 58*b* constituting side surfaces of the cover upper portion 58 in the left-right direction. The side plate portion 58*a* is disposed so that the thickness direction of the side plate portion 58*a* coincides with the front-rear direction, and the side plate portion 58*b* is disposed so that the thickness direction of the side plate portion 58*b* coincides with the left-right direction. The side plate portion 58*a* is connected to both ends of the cover portion 18*a* in the front-rear direction, and the side plate portion 58*b* is connected to both ends of the cover portion 18*a* in the left-right direction.

In addition, the cover upper portion 58 includes an attachment portion 58*c* to which a pressing member 68 described later constituting a part of the cover position adjustment mechanism 21 is attached, and a holding portion 58*d* that holds the second cover 20. The attachment portion 58*c* is formed in a substantially rectangular flat plate shape elongated in the front-rear direction. The attachment portion 58*c* is disposed so that the thickness direction of the attachment portion 58*c* coincides with the vertical direction. The attachment portion 58*c* is disposed below the cover portion 18*a*. The attachment portions 58*c* are disposed at two positions of a right end portion and a left end portion of the cover upper portion 58. A magnet sheet 61, which is a sheet-like permanent magnet, is attached to the lower surface of the attachment portion 58*c*. That is, the cover upper portion 58 includes the magnet sheet 61. The magnet sheet 61 of the present embodiment is an adsorbing member made of a permanent magnet.

The holding portions 58*d* are arranged at two locations in a state of being spaced apart in the left-right direction at the rear end portion of the cover upper portion 58, and are arranged at two locations in a state of being spaced apart in the left-right direction on the front side of the center of the cover upper portion 58 in the front-rear direction. The two holding portions 58*d* arranged at the rear end portion of the cover upper portion 58 are arranged on both sides of the opening 18*b* in the left-right direction. Similarly, the two holding portions 58*d* arranged on the front side of the center of the cover upper portion 58 in the front-rear direction are arranged on both sides of the opening 18*b* in the left-right direction.

The holding portion 58*d* includes a flat plate-shaped fixing plate 62 fixed to the lower surface of the cover portion 18*a* and a flat plate-shaped mounting plate 63 fixed to the lower surface of the fixing plate 62. The mounting plate 63 protrudes inward in the front-rear direction from the fixing plate 62. The upper surface of the mounting plate 63 is a plane orthogonal to the vertical direction. As illustrated in FIG. 13A and FIG. 13B, a gap is formed between the lower surface of the cover portion 18*a* and the upper surface of the mounting plate 63. Both ends of the second cover 20 in the front-rear direction are disposed in the gap.

The cover lower portion 59 is made of a magnetic material. For example, the cover lower portion 59 is made of a magnetic metal material. The cover lower portion 59 is fixed to the fixed frame 64. The lower end portion of the fixed frame 64 is fixed to the lower frame 41. The fixed frame 64 is fixed to four positions of a right front end, a right rear end, a left front end, and a left rear end of the lower frame 41. The cover lower portion 59 includes a fixed portion 59*a* fixed to the fixed frame 64 and a mounting portion 59*b* on which the attachment portion 58*c* is mounted.

The mounting portion 59*b* is formed in a rectangular flat plate shape elongated in the front-rear direction. The mounting portion 59*b* is disposed so that the thickness direction of the mounting portion 59*b* and the vertical direction coincide with each other. The mounting portion 59*b* constitutes an upper surface of the cover lower portion 59. As described above, the cover lower portion 59 is made of a magnetic material. That is, the mounting portion 59*b* is formed of a magnetic material. The cover upper portion 58 is fixed to the upper surface of the mounting portion 59*b* by a magnetic adsorption force generated between the magnet sheet 61 and the upper surface of the mounting portion 59*b*. That is, the cover upper portion 58 is attached to the cover lower portion 59 by a magnetic adsorption force generated between the magnet sheet 61 and the upper surface of the mounting portion 59*b*. The mounting portion 59*b* of the present embodiment is an adsorbing target member to be adsorbed which is made of a magnetic member and adsorbed to the magnet sheet 61 which is an adsorbing member.

In the present embodiment, the cover upper portion 58 attached to the cover lower portion 59 is positioned in the horizontal direction with respect to the cover lower portion 59 by the inner surface in the left-right direction of the side plate portion 58*b*, the end face of the mounting portion 59*b*, and the like. Therefore, when the cover upper portion 58 is attached to the cover lower portion 59, the cover upper portion 58 is automatically positioned in the horizontal direction with respect to the cover lower portion 59.

The fixed portion 59*a* is disposed at two positions of a front end portion and a rear end portion of the cover lower portion 59. As illustrated in FIG. 10, the fixed portion 59*a* is formed with a guide hole 59*c* for vertically guiding the cover lower portion 59 with respect to the fixed frame 64. The guide hole 59*c* penetrates the fixed portion 59*a* in the left-right direction. The guide hole 59*c* is formed in an elongated hole shape elongated in the vertical direction. A fixing screw 65 for fixing the cover lower portion 59 to the fixed frame 64 is inserted into the guide hole 59*c*. The fixed frame 64 is formed with a screw hole with which the fixing screw 65 is engaged.

When the fixing screw 65 is loosened, the cover lower portion 59 can be moved up and down with respect to the lower frame 41 and the fixed frame 64. The vertical position of the cover lower portion 59 is adjusted by raising and lowering the cover lower portion 59. That is, when the fixing screw 65 is loosened, the cover 18 can be moved up and down with respect to the lower frame 41 and the fixed frame 64. The vertical position of the cover 18 is adjusted by raising and lowering the cover 18.

The second cover 20 mainly includes a flat plate portion formed in a substantially rectangular flat plate shape elongated in the front-rear direction. The flat plate portion of the second cover 20 is disposed so that the thickness direction of the second cover 20 coincides with the vertical direction. The lower surface of the flat plate portion of the second cover 20 is subjected to hair raising processing. The second cover 20 is disposed below the cover portion 18*a*. As described above, both end portions of the second cover 20 in the front-rear direction are disposed in the gap between the lower surface of the cover portion 18*a* and the upper surface of the mounting plate 63. The second cover 20 is held by the cover 18. Specifically, the second cover 20 is held by the cover upper portion 58. The second cover 20 is held by the cover 18 so as to be slidable in the left-right direction.

The length of the second cover 20 in the front-rear direction is shorter than the length of the opening 18*b* in the front-rear direction. In the front-rear direction, the rear end of the second cover 20 and the rear end of the opening 18*b* are disposed at substantially the same position. One second cover 20 of the two second covers 20 is disposed on the right side of the center of the opening 18*b* in the left-right direction, and can close a part of the opening 18*b* from the right side. The other second cover 20 is disposed on the left side of the center of the opening 18*b* in the left-right direction, and can close a part of the opening 18*b* from the left side.

The cover position adjustment mechanisms 21 are disposed at two positions on the outer side in the left-right direction of the front end portions of the two second covers 20 and two positions on the outer side in the left-right direction of the rear end portions of the two second covers 20. The cover position adjustment mechanism 21 is held by the cover upper portion 58. The cover position adjustment mechanism 21 includes a pressing member 68, a tension coil spring 69, and an adjustment screw 70. The pressing member 68 contacts the second cover 20 from the outer side in the left-right direction and presses the second cover 20 inward in the left-right direction. The tension coil spring 69 is a biasing member that biases the second cover 20 outward in the left-right direction. The adjustment screw 70 is rotatably held by the cover 18 and is engaged with the pressing member 68.

The pressing member 68 is held by the cover 18 so as to be slidable in the left-right direction. The pressing member 68 is mounted on the attachment portion 58*c* of the cover upper portion 58. The pressing member 68 is disposed below the cover portion 18*a*. The pressing member 68 is disposed outer side the two second covers 20 in the left-right direction. The pressing member 68 disposed on the right side is in contact with the right end face of the second cover 20 disposed on the right side to press the second cover 20 to the left side. The pressing member 68 disposed on the left side is in contact with the left end face of the second cover 20 disposed on the left side to press the second cover 20 to the right side.

As illustrated in FIG. 9, a guide hole 68*a* for guiding the pressing member 68 in the left-right direction is formed in the pressing member 68. The guide screw 71 is inserted into the guide hole 68*a* from above. A screw hole with which the guide screw 71 is engaged is formed in the attachment portion 58*c*. The pressing member 68 is slidable in the left-right direction along the guide screw 71. Further, a screw hole with which the adjustment screw 70 is engaged is formed in the pressing member 68.

One end portion of the tension coil spring 69 is engaged with the second cover 20. The other end portion of the tension coil spring 69 is engaged with a spring engaging portion formed in the attachment portion 58*c*. The tension coil spring 69 is disposed outer side the two second covers 20 in the left-right direction. The tension coil spring 69 arranged on the right side biases the second cover 20 arranged on the right side to the right side, and the tension coil spring 69 arranged on the left side biases the second cover 20 arranged on the left side to the left side. The adjustment screw 70 is a thumb screw. The adjustment screw 70 is pivotably held by the side plate portion 58*b*. The head of the adjustment screw 70 is disposed outer side the side plate portion 58*b* in the left-right direction.

In the present embodiment, when the adjustment screw 70 is rotated, the second cover 20 slides in the left-right direction. In the present embodiment, the cover position adjustment mechanism 21 is disposed on the front end side and the rear end side of the second cover 20. Therefore, by shifting the position of the pressing member 68 arranged on the front side in the left-right direction and the position of the pressing member 68 arranged on the rear side in the left-right direction, as illustrated in FIG. 8, the inclination of the second cover 20 with respect to the front-rear direction when viewed from the vertical direction can be adjusted.

The third cover 22 is formed in a rectangular flat plate shape. As described above, the third cover 22 is mounted on the cover portion 18*a*. The third cover 22 is disposed between the two guide plates 60. The third cover 22 closes a front end-side portion of the opening 18*b*. The front end of the third cover 22 is disposed on the front side of the front end of the opening 18*b*. A detection target member 72 having a detection target portion 72*a* detected by the second detection mechanism 24 is attached to the third cover 22. The detection target member 72 is fixed to the lower surface of the third cover 22. The detection target member 72 extends downward from the lower surface of the third cover 22, and the lower end portion of the detection target member 72 is a detection target portion 72*a*.

In the present embodiment, the vertical position of the cover 18 and the left-right position of the second cover 20 are adjusted according to the outer diameter of the print object 2. Specifically, for example, when the outer diameter of the print object 2 is relatively large, as shown in FIG. 14A, the vertical position of the cover 18 and the position in the left-right direction of the second cover 20 are adjusted so that the gap G1 between the edge in the left-right direction of the opening 18*b* and the outer peripheral surface of the print object 2 has the minimum necessary size. For example, when the outer diameter of the print object 2 is relatively small, as shown in FIG. 14B, the vertical position of the cover 18 and the position in the left-right direction of the second cover 20 are adjusted. The adjustment is performed so that the gap G2 between the end face of the second cover 20 and the outer peripheral surface of the print object 2 has the minimum necessary size.

In the present embodiment, when the print object 2 having the truncated conical or conical outer shape is printed, the inclination of the second cover 20 is adjusted according to the shape of the print object 2 as illustrated in FIG. 8. Specifically, the inclination of the second cover 20 is adjusted according to the shape of the print object 2 so that the gap G2 between the end face of the second cover 20 and the outer peripheral surface of the print object 2 is constant over the entire region in the front-rear direction. The gaps G1 and G2 are, for example, 2 (mm). To adjust the left-right direction and the inclination of the second cover 20, a shim plate (for example, a shim plate of a thickness of 2 (mm)) is disposed between the end face of the second cover 20 and the outer peripheral surface of the print object 2. At the same time, the second cover 20 is moved to press the end face of the second cover 20 and the outer peripheral surface of the print object 2 against the shim plate.

In the present embodiment, the position of the third cover 22 in the front-rear direction is shifted according to the length of the print object 2. When the length of the print object 2 is relatively short and the front end portion of the opening 18*b* cannot be covered with the third cover 22, an additional cover is disposed on the front side of the third cover 22. However, a plurality of types of third covers 22 having different lengths in the front-rear direction may be prepared, and the third cover 22 covering the entire front end-side portion of the opening 18*b* may be selected and attached.

(Configurations of First Detection Mechanism and Second Detection Mechanism)

Figure 15:
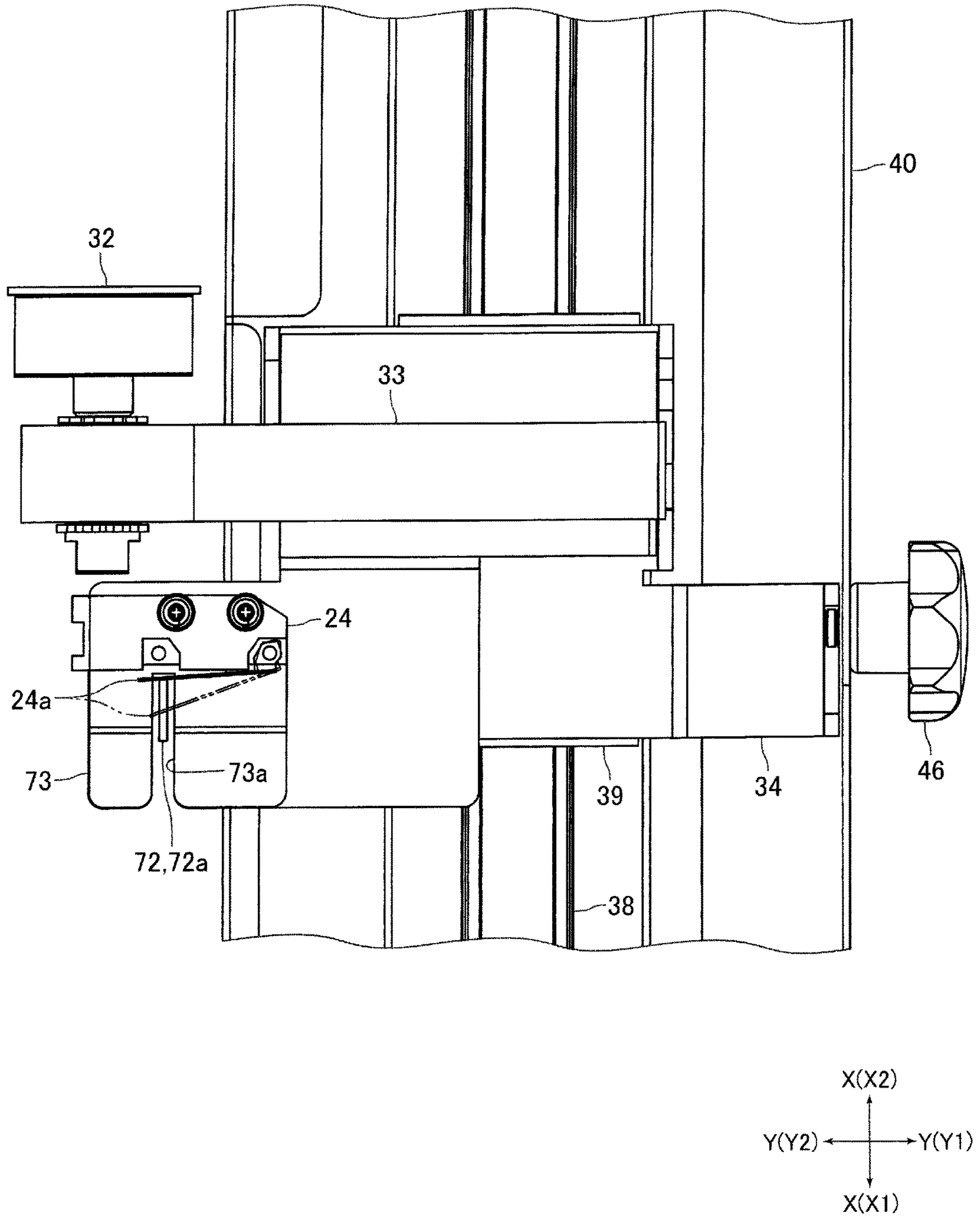
FIG. 15 is a plan view for explaining the configuration of portion E in FIG. 4.

FIG. 15 is a plan view for explaining a configuration of portion E in FIG. 4.

The first detection mechanism 23 is an interlock switch including a contact member constituting a contact portion and a lever 23*a* that pushes the contact member (see FIGS. 6A to 6C). The first detection mechanism 23 is attached to the third holding portion 34. The first detection mechanism 23 is disposed below the second holding portion 33. The lever 23*a* is disposed above the body of the first detection mechanism 23. When the print object 2 is not attached to the rotating mechanism 16, the biasing force of the compression coil spring 35 causes the second holding portion 33 to tilt toward the first holding portion 28, and the lever 23*a* is not in contact with the contact member (see FIG. 6C). Therefore, the first detection mechanism 23 is in the off state.

When the print object 2 is attached to the rotating mechanism 16 in this state, the second holding portion 33 is pivoted against the biasing force of the compression coil spring 35 to push the lever 23*a* (see FIG. 6A and FIG. 6B). When the lever 23*a* pressed by the second holding portion 33 presses the contact member, the first detection mechanism 23 is turned on, and the second holding portion 33 is detected by the first detection mechanism 23. That is, when the print object 2 is attached to the rotating mechanism 16, the second holding portion 33 is pivoted with respect to the third holding portion 34 against the biasing force of the compression coil spring 35 up to the position detected by the first detection mechanism 23. When the second holding portion 33 is detected by the first detection mechanism 23, the first detection mechanism 23 detects that the print object 2 is retained by the rotating mechanism 16.

Similarly to the first detection mechanism 23, the second detection mechanism 24 is an interlock switch including a contact member constituting a contact portion and a lever 24*a* that pushes the contact member. The second detection mechanism 24 is fixed to the fixing member 73. The fixing member 73 is fixed to the second holding portion 33. That is, the second detection mechanism 24 is attached to the second holding portion 33 via the fixing member 73. The second detection mechanism 24 is disposed on the front side of the second rotator 32. The lever 24*a* is disposed on the front side of the body of the second detection mechanism 24. As illustrated in FIG. 15, a guide groove 73*a* for guiding the detection target portion 72*a* of the detection target member 72 to the lever 24*a* is formed in the fixing member 73. The guide groove 73*a* is formed from the front end of the fixing member 73 toward the rear side.

When the third cover 22 is mounted at a predetermined position on the cover portion 18*a* with the print object 2 held by the rotating mechanism 16, the detection target portion 72*a* pushes the lever 24*a*. When the lever 24*a* pressed by the detection target portion 72*a* presses the contact member, the second detection mechanism 24 is turned on, and the detection target portion 72*a* is detected by the second detection mechanism 24. That is, when the third cover 22 is mounted at a predetermined position of the cover portion 18*a* while the print object 2 is held by the rotating mechanism 16, the detection target portion 72*a* is detected by the second detection mechanism 24. When the detection target portion 72*a* is detected by the second detection mechanism 24, the mounting of the third cover 22 on the cover portion 18*a* is detected by the second detection mechanism 24.

In the present embodiment, when the first detection mechanism 23 detects that the print object 2 is held by the rotating mechanism 16, the ultraviolet irradiator 17 can irradiate an ultraviolet ray. More specifically, when the first detection mechanism 23 detects that the print object 2 is held by the rotating mechanism 16, and the second detection mechanism 24 detects that the third cover 22 is mounted on the cover portion 18*a*, the ultraviolet irradiator 17 can irradiate an ultraviolet ray.

Main Effects of Present Embodiment

As described above, in the present embodiment, the ultraviolet irradiator 17 is disposed on the side of the print object 2, and irradiates the ultraviolet ray from the side of the print object 2 toward the outer peripheral surface of the print object 2 to which the landed ink is attached at the upper end portion of the print object 2. Specifically, after the ink landed on the print object 2 at the upper end portion of the print object 2, the ultraviolet irradiator 17 irradiates the portion where the ink landed on the outer peripheral surface of the print object 2 with an ultraviolet ray before the print object 2 rotates by 180°. Due to this, in the present embodiment, compared to the case where the ultraviolet irradiator is arranged below the print object as in the printing device described in Patent Literature 1 described above, the ultraviolet ray can be irradiated more quickly to the ink that landed on the outer peripheral surface of the print object 2.

In the present embodiment, the ultraviolet irradiator 17 is covered from above by the cover portion 18*a*. Thus, in the present embodiment, even when the ultraviolet irradiator 17 arranged on the side of the print object 2 irradiates the ultraviolet ray from the side of the print object 2, the nozzle surface (lower surface) of the inkjet head 3 arranged above the print object 2 can be suppressed from being irradiated with the ultraviolet ray by the cover portion 18*a*. Therefore, in the present embodiment, even if the ultraviolet irradiator 17 is arranged on the side of the print object 2, clogging of the nozzles of the inkjet head 3 can be suppressed.

In the present embodiment, the vertical position of the cover 18 can be adjusted, and the position in the left-right direction of the second cover 20 can be adjusted. Furthermore, in the present embodiment, the vertical position of the cover 18 and the position in the left-right direction of the second cover 20 are adjusted according to the outer diameter of the print object 2 so that the gap G1 between the edge in the left-right direction of the opening 18*b* and the outer peripheral surface of the print object 2 and the gap G2 between the end face of the second cover 20 and the outer peripheral surface of the print object 2 have the minimum necessary size. Thus, in the present embodiment, even when the ultraviolet irradiator 17 is disposed on the side of the print object 2 and the outer diameter of the print object 2 is changed, the ultraviolet ray irradiation to the nozzle surface of the inkjet head 3 can be suppressed by the cover portion 18*a* and the second cover 20.

In the present embodiment, the cover position adjustment mechanism 21 includes a pressing member 68 that comes into contact with the second cover 20 from the outer side in the left-right direction and pushes the second cover 20 inward in the left-right direction, a tension coil spring 69 that biases the second cover 20 outward in the left-right direction, and an adjustment screw 70 rotatably held by the cover 18 and engaged with the pressing member 68. When the adjustment screw 70 is rotated, the second cover 20 slides in the left-right direction. Therefore, in the present embodiment, the position of the second cover 20 in the left-right direction can be adjusted by a simple operation such as rotating the adjustment screw 70.

In the present embodiment, the cover upper portion 58 is attached to the cover lower portion 59 by a magnetic adsorption force generated between the magnet sheet 61 and the upper surface of the mounting portion 59*b*. Therefore, in the present embodiment, the cover upper portion 58 including the cover portion 18*a* can be easily removed from the cover lower portion 59. Therefore, in the present embodiment, when the print object 2 after printing is detached from the rotating mechanism 16 and the print object 2 before printing is attached to the rotating mechanism 16 (that is, when replacing the print object 2), the cover upper portion 58 can be easily attached and detached, and as a result, the replacement operation of the print object 2 can be easily performed.

In the present embodiment, since the cover upper portion 58 holds the second cover 20 and the cover position adjustment mechanism 21, it is possible to maintain the arrangement relationship between the cover portion 18*a* and the second cover 20 after the cover upper portion 58 once removed is attached to the cover lower portion 59. In addition, in the present embodiment, since the attachment portion 58*c* of the cover upper portion 58 is mounted on the mounting portion 59*b* of the cover lower portion 59, it is possible to maintain the vertical positions of the cover portion 18*a* and the second cover 20 after the cover upper portion 58 once removed is attached to the cover lower portion 59. Furthermore, in the present embodiment, when the cover upper portion 58 is attached to the cover lower portion 59, the cover upper portion 58 is automatically positioned in the horizontal direction with respect to the cover lower portion 59.

Therefore, in the present embodiment, even if the cover upper portion 58 is attached and detached, the variation in the relative position between the second cover 20 and the print object 2, the position of which is adjusted in the left-right direction according to the outer diameter of the print object 2, can be suppressed, and the variation in the relative position between the cover 18 and the print object 2, the position of which is adjusted in the vertical direction according to the outer diameter of the print object 2, can be suppressed. As a result, in the present embodiment, when the print object 2 having the same outer diameter is continuously printed, it is possible to omit the trouble of readjusting the position of the second cover 20 in the left-right direction after attaching and detaching the cover upper portion 58, and it is possible to omit the trouble of readjusting the position of the cover 18 in the vertical direction.

In the present embodiment, the third cover 22 closes the front end-side portion of the opening 18*b*. Due to this, in the present embodiment, by arranging the third cover 22 at an appropriate position according to the length of the print object 2, even if the length of the print object 2 printed by the printing device 1 changes, the ultraviolet ray having passed through the front end-side portion of the opening 18*b* can be suppressed from being irradiated to the nozzle surface of the inkjet head 3.

In the present embodiment, the position in the vertical direction of the ultraviolet irradiator 17 is adjustable, and the position in the vertical direction of the ultraviolet irradiator 17 is adjusted according to the outer shape of the print object 2 so that the optimum location on the outer peripheral surface of the print object 2 is irradiated with the ultraviolet ray. Thus, in the present embodiment, even when the outer shape of the print object 2 to be printed by the printing device 1 changes, the ultraviolet irradiator 17 can be arranged at a more appropriate position for curing the ink attached to the print object 2.

In the present embodiment, the inclination of the rotating mechanism 16 with respect to the horizontal direction when viewed from the left-right direction is adjustable, and the inclination of the rotating mechanism 16 is adjusted so that the upper end of the print object 2 becomes parallel to the front-rear direction when printing is performed on the print object 2 having an outer shape such as a truncated conical shape or a conical shape. In the present embodiment, therefore, the distance between the outer peripheral surface of the print object 2 and the nozzle surface of the inkjet head 3 may be kept constant in the entire region in the axial direction of the print object 2 even when the print object 2 having a truncated conical or conical outer shape is used. Therefore, in the present embodiment, appropriate printing can be performed on the print object 2.

In the present embodiment, the inclination of the ultraviolet irradiator 17 with respect to the axis of the print object 2 when viewed from the vertical direction can be adjusted, and the inclination of the ultraviolet irradiator 17 is adjusted so that the ultraviolet emission surface of the ultraviolet irradiator 17 becomes parallel to the left end of the print object 2 when performing printing of the print object 2 having a truncated conical or conical outer shape. Thus, in the present embodiment, even if the outer shape of the print object 2 is truncated conical or conical, the distance between the outer peripheral surface of the print object 2 and the ultraviolet irradiator 17 can be made constant in the entire region in the axial direction of the print object 2. Therefore, in the present embodiment, the ink attached to the outer peripheral surface of the print object 2 can be appropriately cured.

In the present embodiment, when the first detection mechanism 23 detects that the print object 2 is held by the rotating mechanism 16, the ultraviolet irradiator 17 can irradiate an ultraviolet ray. That is, in the present embodiment, the ultraviolet irradiator 17 does not irradiate the ultraviolet ray unless the print object 2 is held by the rotating mechanism 16. Therefore, in the present embodiment, it is possible to prevent the irradiation of the ultraviolet ray by the ultraviolet irradiator 17 from being performed in a state in which the operator of the printing device 1 is in contact with the ultraviolet irradiator 17. Therefore, in the present embodiment, the safety of the ultraviolet irradiation device 4 can be enhanced.

In the present embodiment, when the second detection mechanism 24 detects that the third cover 22 is mounted on the cover portion 18*a*, the ultraviolet irradiator 17 can irradiate an ultraviolet ray, and thus the ultraviolet irradiator 17 does not irradiate the ultraviolet ray unless the cover 18 and the third cover 22 are attached. Therefore, in the present embodiment, it is possible to effectively prevent the irradiation of the ultraviolet ray by the ultraviolet irradiator 17 from being performed in a state in which the operator of the printing device 1 is in contact with the ultraviolet irradiator 17, and as a result, the safety of the ultraviolet irradiation device 4 can be further enhanced.

In particular, in the present embodiment, when the first detection mechanism 23 detects that the print object 2 is held by the rotating mechanism 16, and the second detection mechanism 24 detects that the third cover 22 is mounted on the cover portion 18*a*, the ultraviolet irradiator 17 can irradiate an ultraviolet ray. Thus, it becomes possible to more effectively prevent the irradiation of the ultraviolet ray by the ultraviolet irradiator 17 from being performed in a state in which the operator of the printing device 1 is in contact with the ultraviolet irradiator 17. Therefore, in the present embodiment, the safety of the ultraviolet irradiation device 4 can be further enhanced.

In the present embodiment, the second detection mechanism 24 is attached to the second holding portion 33 whose position is adjusted in the axial direction of the print object 2 according to the length of the print object 2. Therefore, in the present embodiment, for example, even when the third cover 22 is moved according to the length of the print object 2, the mounting of the third cover 22 at an appropriate position of the cover portion 18*a* can be detected by the second detection mechanism 24.

Modification Example of Peripheral Portion of Rotating Mechanism

Figure 16A:
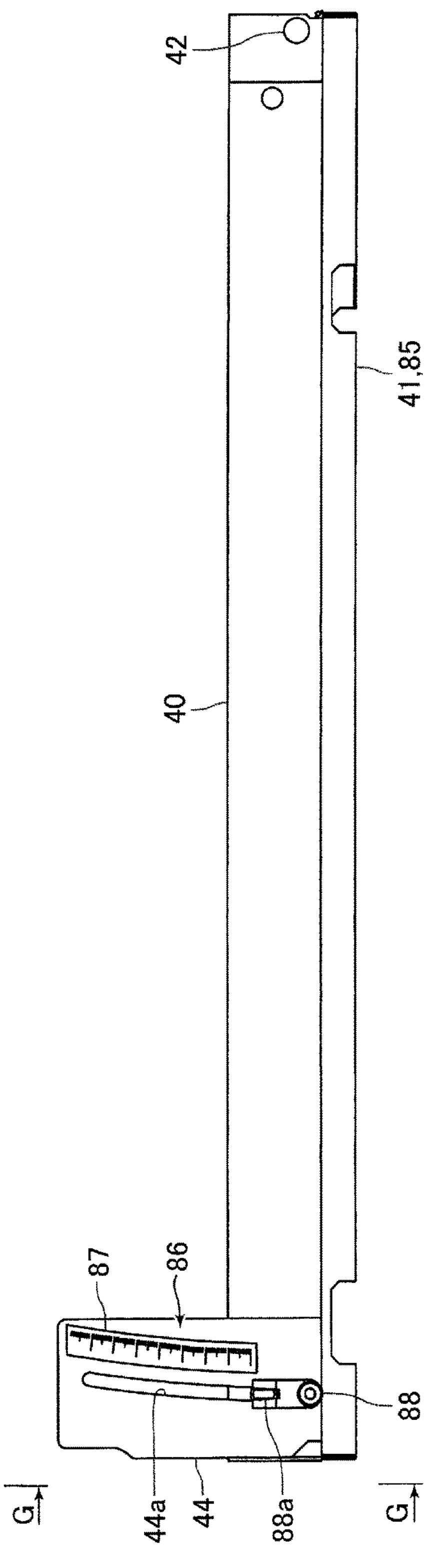
FIG. 16A and FIG. 16B are side views for explaining a configuration of a peripheral portion of a rotating mechanism according to another embodiment of this invention.
Figure 16B:
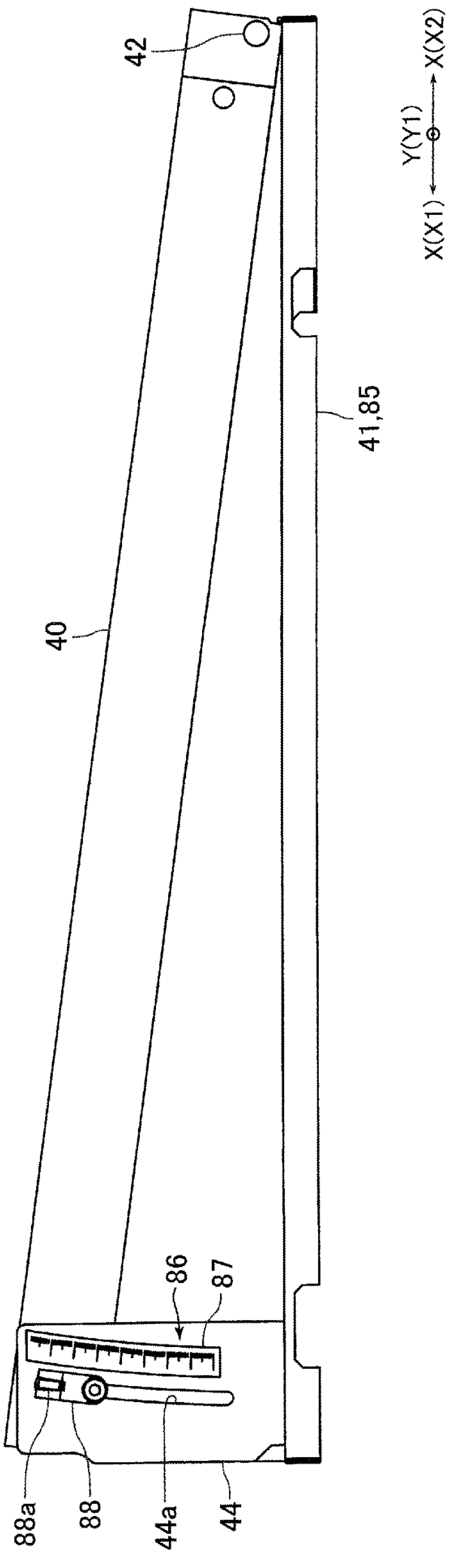
Figure 17:
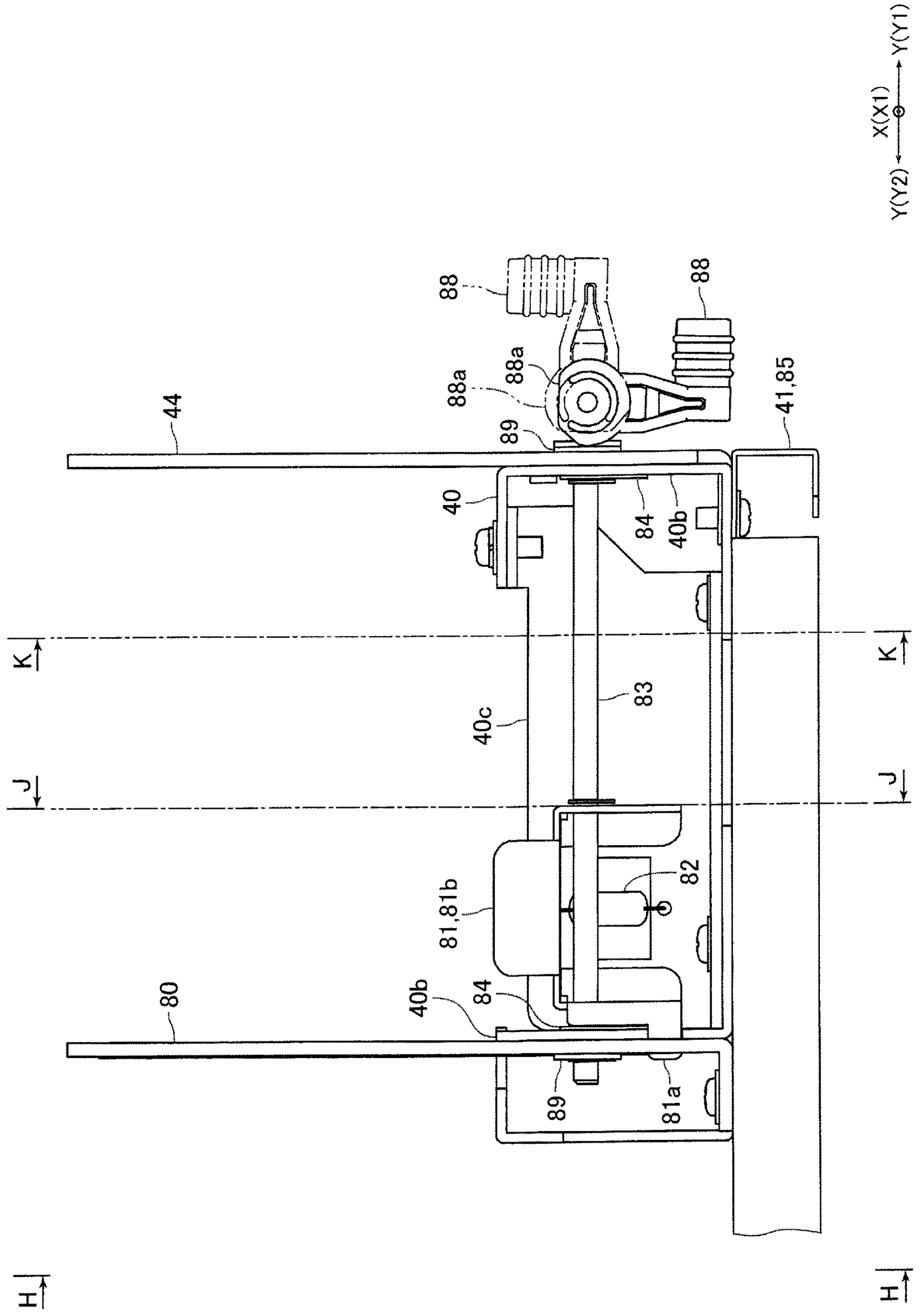
FIG. 17 is a view for explaining a configuration of a peripheral portion of the rotating mechanism from a G-G direction in FIG. 16A.
Figure 18:
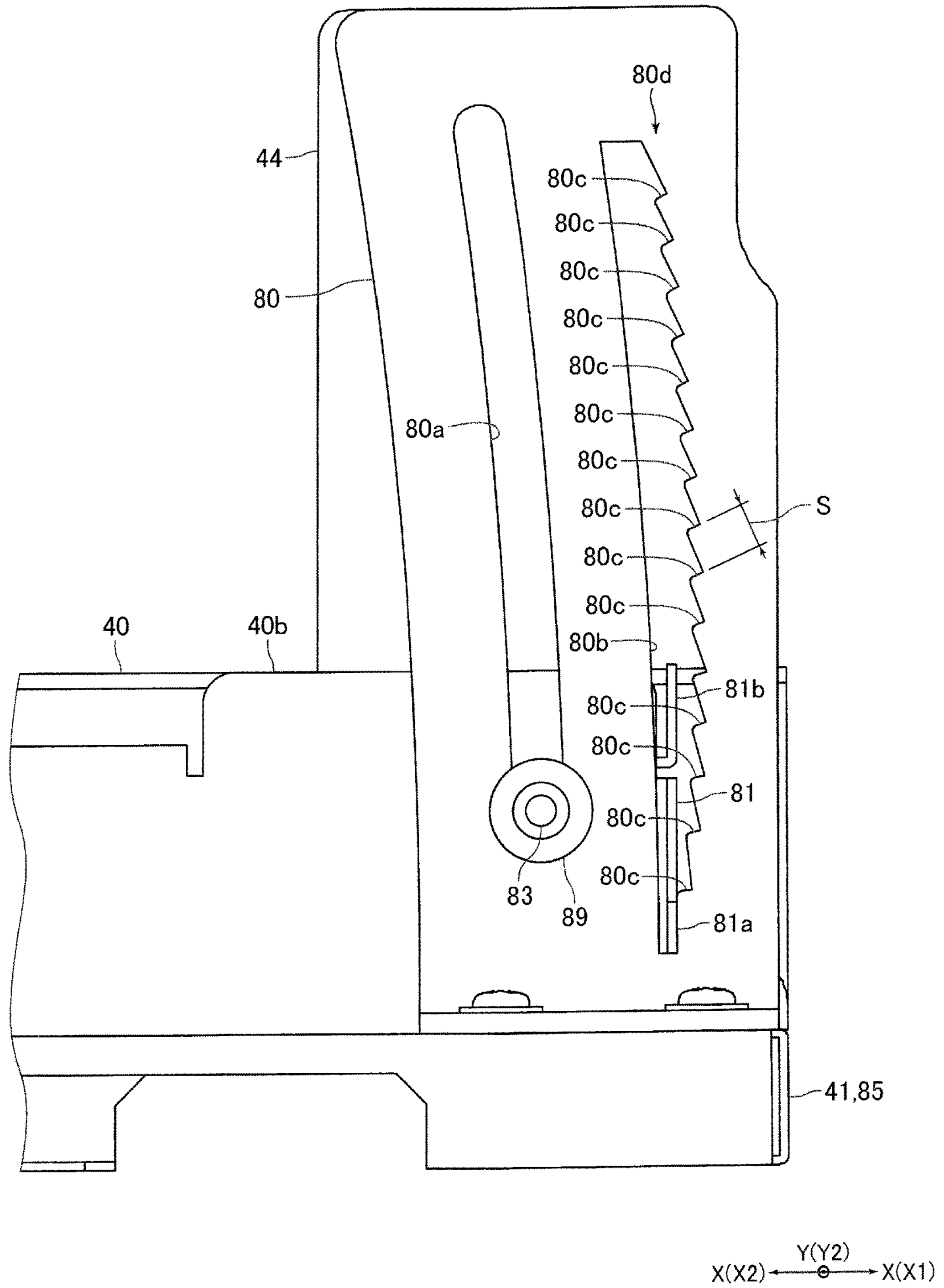
FIG. 18 is a side view illustrating the support frame, the engaging member, and the like from the H-H direction in FIG. 17.
Figure 19A:
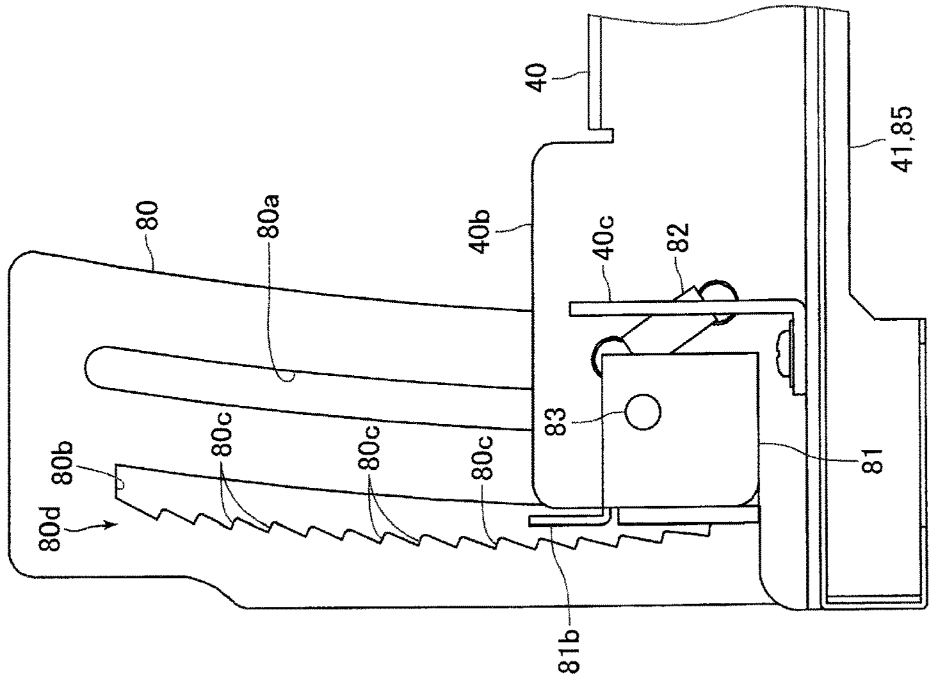
FIG. 19A and FIG. 19B are views for explaining a configuration of a J-J cross-section in FIG. 17.
Figure 19B:
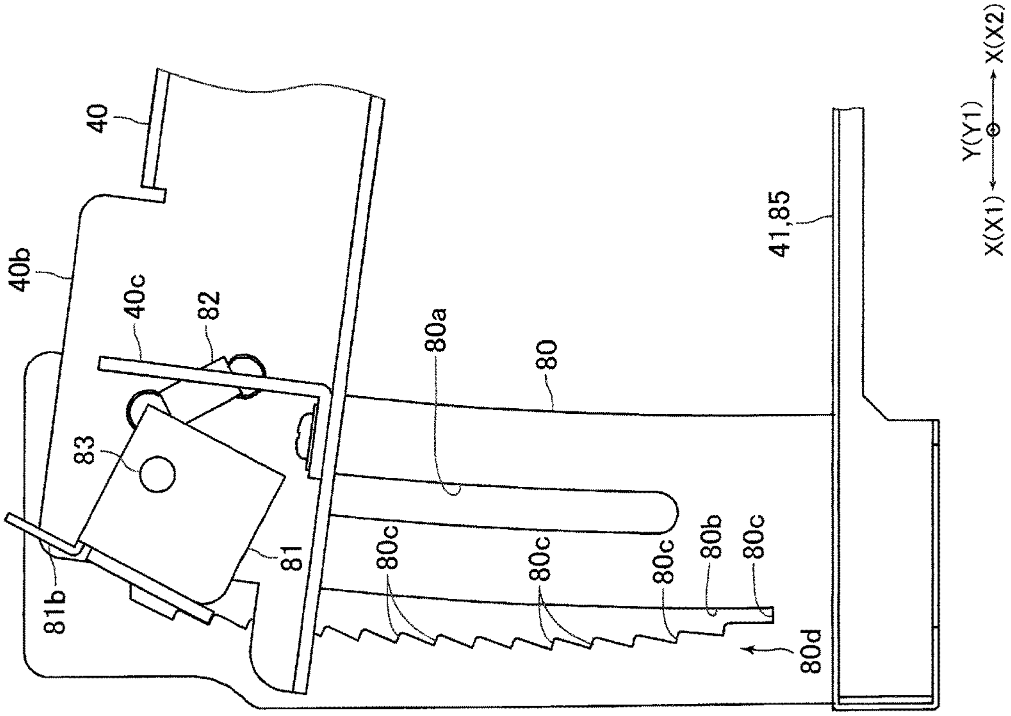
Figure 20B:
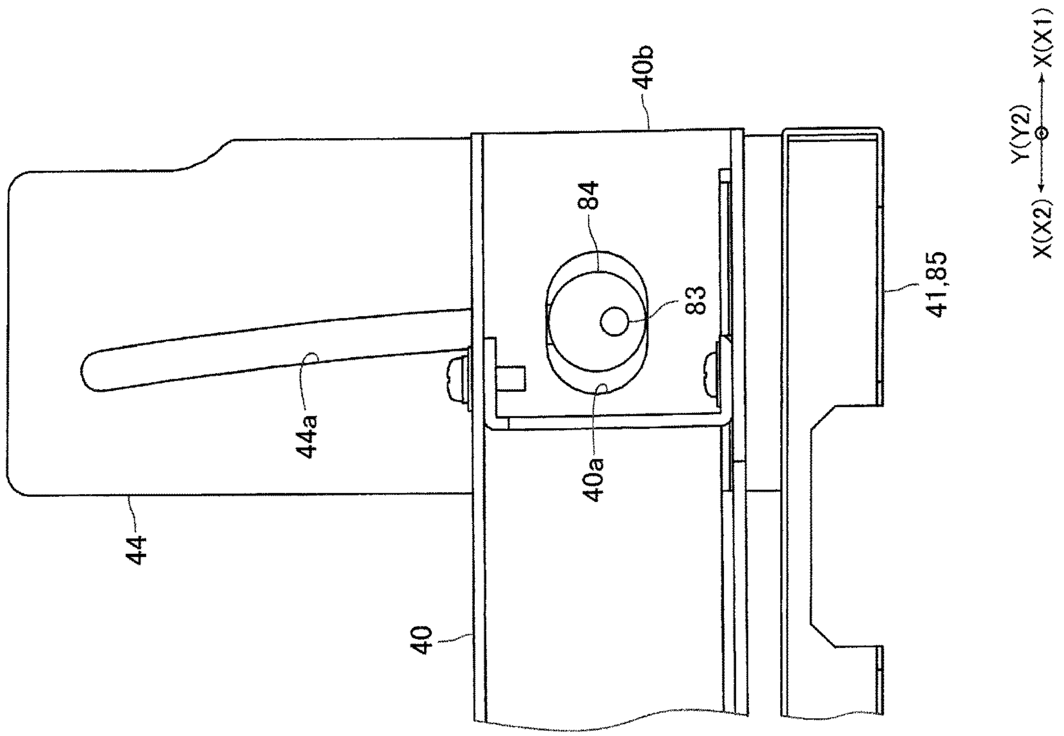
FIG. 20A and FIG. 20B are views for explaining a configuration of a K-K cross-section in FIG. 17.
Figure 20A:
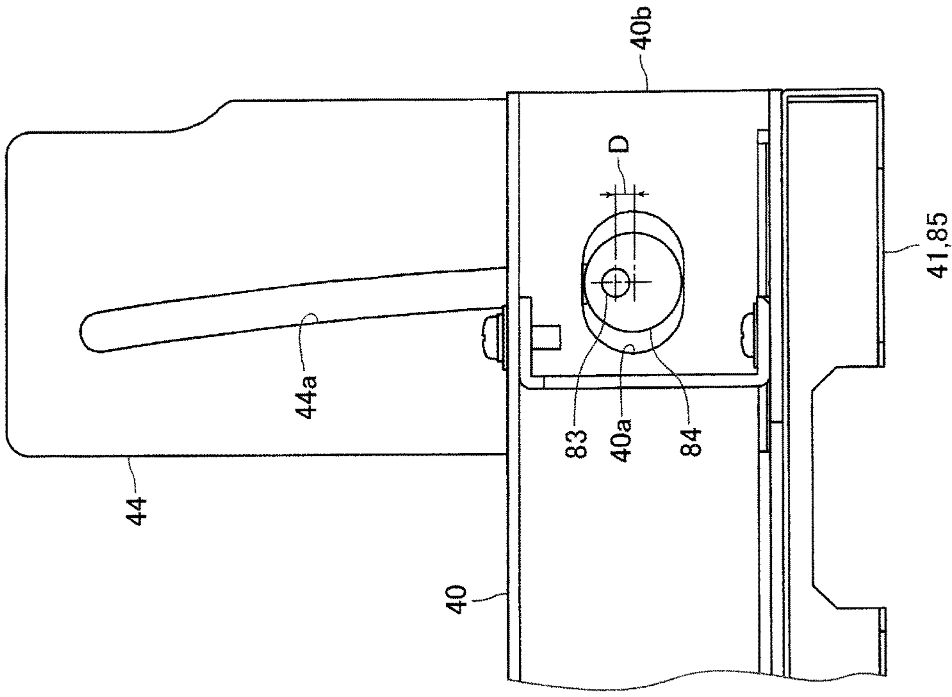

FIG. 16A and FIG. 16B are side views for explaining a configuration of a peripheral portion of the rotating mechanism 16 according to another embodiment of this invention. FIG. 17 is a diagram for explaining a configuration of a peripheral portion of the rotating mechanism 16 from the G-G direction in FIG. 16A. FIG. 18 is a side view illustrating the support frame 80, the engaging member 81, and the like from the H-H direction in FIG. 17. FIG. 19A and FIG. 19B are views for explaining a configuration of a J-J cross-section of FIG. 17. FIG. 20A and FIG. 20B are diagrams for explaining a configuration of a K-K cross-section of FIG. 17. Note that, in FIGS. 16A to 20B, the same reference numerals are given to the same configurations as those in the above-described embodiment.

In the embodiment described above, the two guide frames 44 are fixed to the front end portion of the lower frame 41 at intervals in the left-right direction. However, in this modified example, the support frame 80 is fixed to the front end portion of the lower frame 41 instead of one guide frame 44 of the two guide frames 44. In this modified example, the ultraviolet irradiation device 4 includes an engaging member 81, a tension coil spring 82, a pivot shaft 83, and an eccentric cam 84. The engaging member 81 is held by the rotating mechanism 16 so as to be pivotable in the left-right direction (specifically, it is held by the pivotable frame 40). The tension coil spring 82 as the second biasing member biases the engaging member 81 to one side in the pivoting direction of the engaging member 81 with respect to the rotating mechanism 16. The pivot shaft 83 serves as a pivot center of the engaging member 81 with respect to the pivotable frame 40. The eccentric cam 84 is fixed to the pivot shaft 83.

As described above, the pivotable frame 40 is pivotable with respect to the lower frame 41 in the left-right direction. The support frame 43 is fixed to the rear end portion of the lower frame 41. A pivot center shaft 42 serving as a pivot center of the pivotable frame 40 is attached to the support frame 43. That is, the pivotable frame 40 is connected to the support frame 43 so that the pivotable frame 40 can pivot in the left-right direction. In this modification, the lower frame 41 and the support frame 43 constitute a base frame 85. The rotating mechanism 16 is pivotably connected to a rear end that is one end in the front-rear direction of the base frame 85. The rotating mechanism 16 sets the left-right direction as an axial direction of pivoting. A rear end portion of the pivotable frame 40 is pivotably connected to a rear end portion of the base frame 85. In FIG. 16A and FIG. 16B, the support frame 43 is not illustrated.

The support frame 80 is fixed to a front end portion of the lower frame 41. That is, the support frame 80 is fixed to the front end portion that is the other end portion in the front-rear direction of the base frame 85. The guide frame 44 is disposed on the right side of the pivotable frame 40, and the support frame 80 is disposed on the left side of the pivotable frame 40. A guide hole 80*a* corresponding to the guide hole 44*a* of the guide frame 44 is formed in the support frame 80. A vertically long through-hole 80*b* penetrating the support frame 80 in the left-right direction is formed in the support frame 80. The through-hole 80*b* is formed on the front side of the guide hole 80*a*.

The front side surface of the through-hole 80*b* is a step portion 80*d* having a stepped shape in which a plurality of stepped surfaces 80*c* arranged in the vertical direction is formed. That is, the support frame 80 includes the step portion 80*d* having a stepped shape. The plurality of stepped surfaces 80*c* are arranged on an arc having the pivot center shaft 42 as the center of curvature when viewed from the left-right direction. The plurality of stepped surfaces 80*c* face upward. The step S (see FIG. 18) between the stepped surfaces 80*c* adjacent in the vertical direction is constant. Specifically, the step S is constant in the circumferential direction around the pivot center shaft 42.

A scale plate 87 on which a scale 86 indicating an angle of the pivotable frame 40 with respect to the front-rear direction when viewed from the left-right direction is printed is fixed to the guide frame 44 or the support frame 80. That is, the scale plate 87 is fixed to the guide frame 44 or the support frame 80. A scale 86 indicating an angle of the rotating mechanism 16 with respect to the horizontal direction when viewed from the left-right direction is marked on the scale plate 87.

The pivot shaft 83 is disposed so that the axial direction of the pivot shaft 83 coincides with the left-right direction. The eccentric cam 84 is an eccentric disc cam formed in a disc shape. The eccentric cams 84 are fixed to both ends of the pivot shaft 83, and the two eccentric cams 84 are pivotable together with the pivot shaft 83. The center of the eccentric cam 84 is shifted from the axis of the pivot shaft 83. An amount of eccentricity D (see FIG. 20A), which is a distance between the center of the eccentric cam 84 and the axis of the pivot shaft 83, is equal to a half of the step S between the stepped surfaces 80*c* adjacent in the vertical direction.

A cam arrangement hole 40*a* in which the eccentric cam 84 is disposed is formed in the pivotable frame 40 (see FIG. 20A and FIG. 20B). Specifically, a cam arrangement hole 40*a* is formed in a front end portion of a side surface portion 40*b* constituting a side surface of the pivotable frame 40 in the left-right direction. The cam arrangement hole 40*a* is formed in an elongated hole shape. The eccentric cam 84 is pivotably held by the side surface portion 40*b*. That is, the pivot shaft 83 to which the eccentric cam 84 is fixed is pivotably held by the pivotable frame 40 via the eccentric cam 84. Specifically, both end portions of the pivot shaft 83 are pivotably held by the front end portion of the pivotable frame 40 via the eccentric cam 84. The pivot shaft 83 and the eccentric cam 84 are pivotable with respect to the pivotable frame 40 in the left-right direction.

Both ends of the pivot shaft 83 protrude outward in the left-right direction from the pivotable frame 40. A right end portion of the pivot shaft 83 is inserted into the guide hole 44*a* of the guide frame 44, and a left end portion of the pivot shaft 83 is inserted into the guide hole 80*a* of the support frame 80. A right end of the pivot shaft 83 projects rightward from the guide frame 44, and a left end of the pivot shaft 83 projects leftward from the support frame 80. A clamp lever 88 with an eccentric cam is attached to a right end portion of the pivot shaft 83 protruding to the right side of the guide frame 44.

The engaging member 81 is disposed between the two side surface portions 40*b* in the left-right direction. Further, the engaging member 81 is disposed so as to be adjacent to the right side of the side surface portion 40*b* disposed on the left side. An insertion hole through which the pivot shaft 83 is inserted is formed in the engaging member 81. The engaging member 81 is pivotably held by a front end portion of the pivotable frame 40 via a pivot shaft 83 and an eccentric cam 84. The pivot shaft 83 is pivotable with respect to the engaging member 81. The engaging member 81 includes a mounting portion 81*a* mounted on the stepped surface 80*c* (see FIGS. 17 and 18). The mounting portion 81*a* is disposed at the lower front end portion of the engaging member 81, and is disposed on the front side and the lower side of the pivot shaft 83. The mounting portion 81*a* is disposed at the left end portion of the engaging member 81.

One end side of the tension coil spring 82 is engaged with the rear upper end portion of the engaging member 81. The other end side of the tension coil spring 82 is engaged with a spring engaging portion 40*c* disposed at the front end portion of the pivotable frame 40. The spring engaging portion 40*c* is disposed behind the engaging member 81. The tension coil spring 82 biases the engaging member 81 in the clockwise direction (the clockwise direction in FIG. 19A and FIG. 19B) around the pivot shaft 83 when viewed from the right side. The mounting portion 81*a* disposed at the lower front end portion of the engaging member 81 is disposed behind the step portion 80*d*. The tension coil spring 82 biases the engaging member 81 in a direction in which the mounting portion 81*a* moves toward the step portion 80*d*.

The mounting portion 81*a* is mounted on the stepped surface 80*c* by the weight of the rotating mechanism 16. Further, the engaging member 81 is biased in a direction in which the mounting portion 81*a* is directed toward the step portion 80*d*. Therefore, when the pivotable frame 40 is pivoted with respect to the base frame 85 so that the front end portion of the pivotable frame 40 rises, the mounting portion 81*a* is automatically mounted on the stepped surface 80*c* according to the angle of the pivotable frame 40 with respect to the horizontal direction.

The engaging member 81 is pivoted against the biasing force of the tension coil spring 82. That is, the engaging member 81 is pivoted in the counterclockwise direction when viewed from the right side so that the mounting portion 81*a* is separated from the step portion 80*d*. As a result, the mounting portion 81*a* is detached from the stepped surface 80*c*. Therefore, when the engaging member 81 is pivoted against the biasing force of the tension coil spring 82, the pivotable frame 40 can be pivoted with respect to the base frame 85 so that the front end portion of the pivotable frame 40 is lowered. A finger hooking portion 81*b* for rotating the engaging member 81 against the biasing force of the tension coil spring 82 is formed at the front upper end portion of the engaging member 81.

In this modified example, when the eccentric cam 88*a* of the clamp lever 88 is disposed at the position indicated by the two-dot chain line in FIG. 17, the pivotable frame 40 can be pivoted with respect to the base frame 85. On the other hand, the clamp lever 88 is pivoted in the front-rear direction so that the eccentric cam 88*a* is disposed at a position indicated by a solid line in FIG. 17. As a result, the front end portion of the pivotable frame 40 is fixed to the guide frame 44 and the support frame 80. That is, the pivotable frame 40 cannot be pivoted with respect to the base frame 85.

On the left side of the support frame 80, the pivot shaft 83 is inserted into the washer 89, and the washer 89 is fixed to the pivot shaft 83. On the right side of the guide frame 44 and the left side of the clamp lever 88, the pivot shaft 83 is inserted into the washer 89, and the washer 89 is movable in the left-right direction with respect to the pivot shaft 83. Therefore, when the clamp lever 88 is pivoted so that the eccentric cam 88*a* is disposed at a position indicated by a solid line in FIG. 17, the guide frame 44, the support frame 80, and the pivotable frame 40 are sandwiched between two washers 89. As a result, the front end portion of the pivotable frame 40 is fixed to the guide frame 44 and the support frame 80.

In this modified example, the eccentric cam 88*a* of the clamp lever 88 is moved to a position indicated by a two-dot chain line in FIG. 17 to pivot the pivotable frame 40 with respect to the base frame 85. As a result, the inclination of the rotating mechanism 16 with respect to the horizontal direction is adjusted. When adjusting the inclination of the rotating mechanism 16 with respect to the horizontal direction, first, the operator of the printing device 1 manually pivots the pivotable frame 40. The operator pivots the pivotable frame 40 with respect to the base frame 85 so that the front end portion of the pivotable frame 40 rises. When the pivotable frame 40 is pivoted in this manner, the mounting portion 81*a* is automatically mounted on the stepped surface 80*c* according to the angle of the pivotable frame 40 with respect to the horizontal direction. In this modification, the inclination of the rotating mechanism 16 with respect to the horizontal direction can be changed, for example, at a pitch of 0.5° by using the plurality of stepped surfaces 80*c*.

Thereafter, the operator pivots the clamp lever 88 in the left-right direction to pivot the eccentric cam 84. The eccentric cam 84 is pivoted with respect to the pivotable frame 40 and the engaging member 81 about the pivot shaft 83 as a pivot center. Therefore, when the eccentric cam 84 is pivoted, the front end portion of the pivotable frame 40 moves up and down with respect to the engaging member 81. That is, the pivotable frame 40 is pivoted with respect to the base frame 85. When the eccentric cam 84 is pivoted in this manner, the front end portion of the pivotable frame 40 moves up and down with respect to the engaging member 81, and the pivotable frame 40 is pivoted with respect to the base frame 85. Therefore, in this modification, it is possible to finely adjust the inclination of the rotating mechanism 16 with respect to the horizontal direction using the eccentric cam 84.

In this modification, the amount of eccentricity D, which is the distance between the center of the eccentric cam 84 and the axis of the pivot shaft 83, is equal to half of the step S between the stepped surfaces 80*c* adjacent in the vertical direction. Therefore, even when the inclination of the rotating mechanism 16 with respect to the horizontal direction is adjusted using the step portion 80*d* of the support frame 80 and the engaging member 81, the inclination of the rotating mechanism 16 with respect to the horizontal direction can be continuously adjusted.

The amount of eccentricity D may not be equal to half of the step S. The ultraviolet irradiation device 4 may not include the eccentric cam 84. The front end portion of the pivotable frame 40 may be moved up and down using a screw member to pivot the pivotable frame 40 with respect to the base frame 85. In this case, the operator may manually rotate the screw member, or the ultraviolet irradiation device 4 may include a motor that rotates the screw member.

Modification Example of Peripheral Portion of Ultraviolet Irradiator

Figure 21:
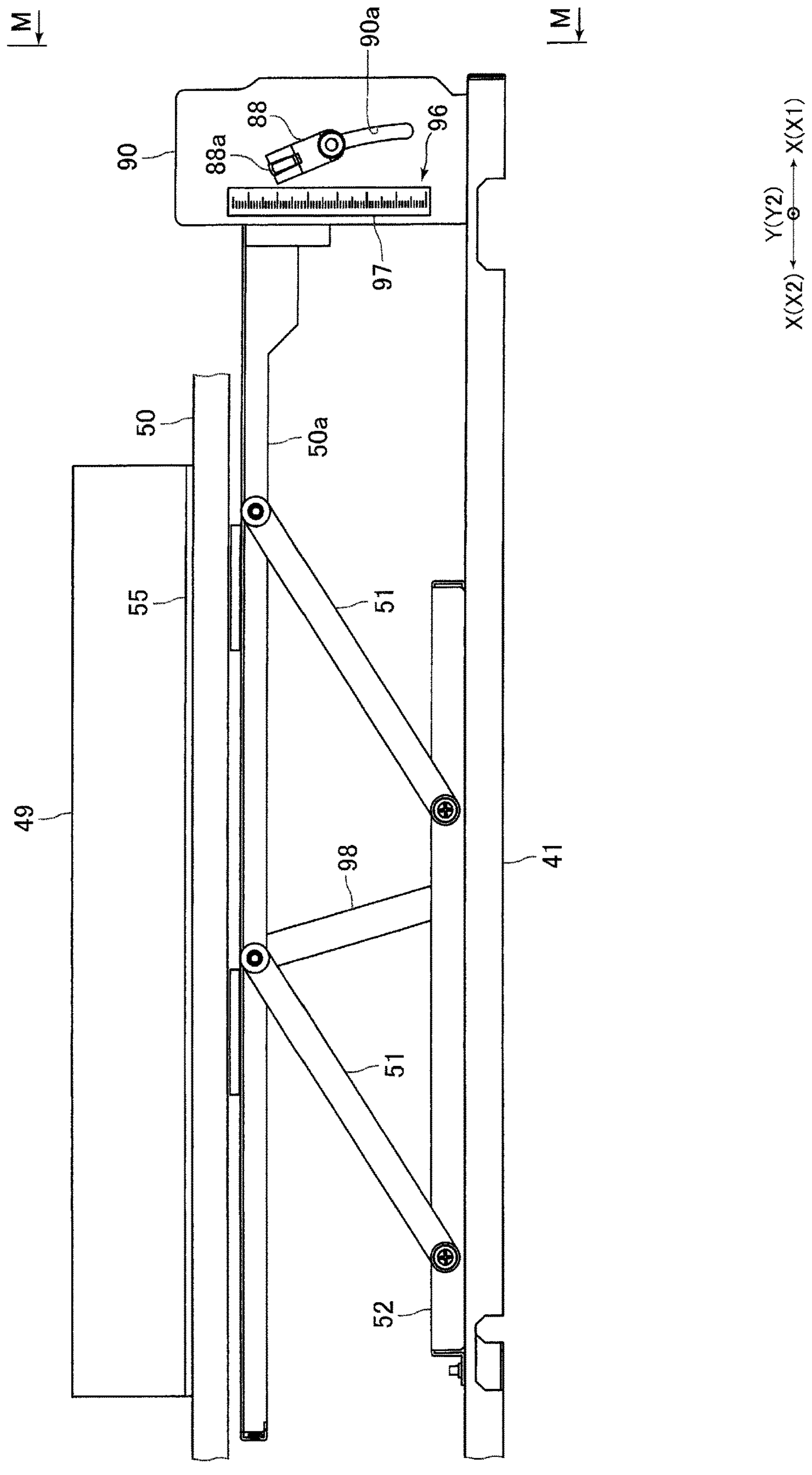
FIG. 21 is a side view for explaining a configuration of a peripheral portion of an ultraviolet irradiator according to another embodiment of this invention.
Figure 22:
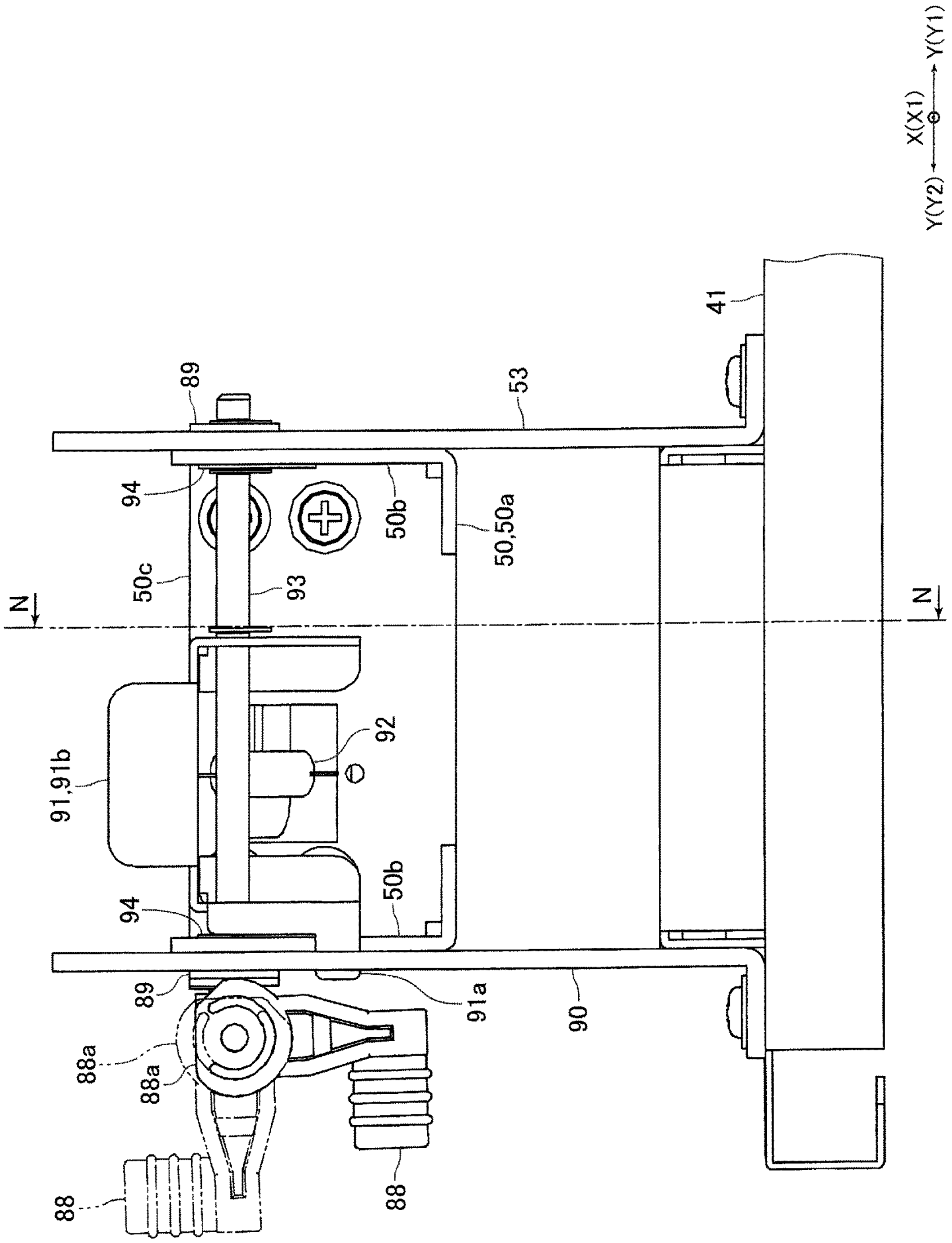
FIG. 22 is a view for explaining a configuration of a peripheral portion of the ultraviolet irradiator from an M-M direction in FIG. 21.
Figure 23:
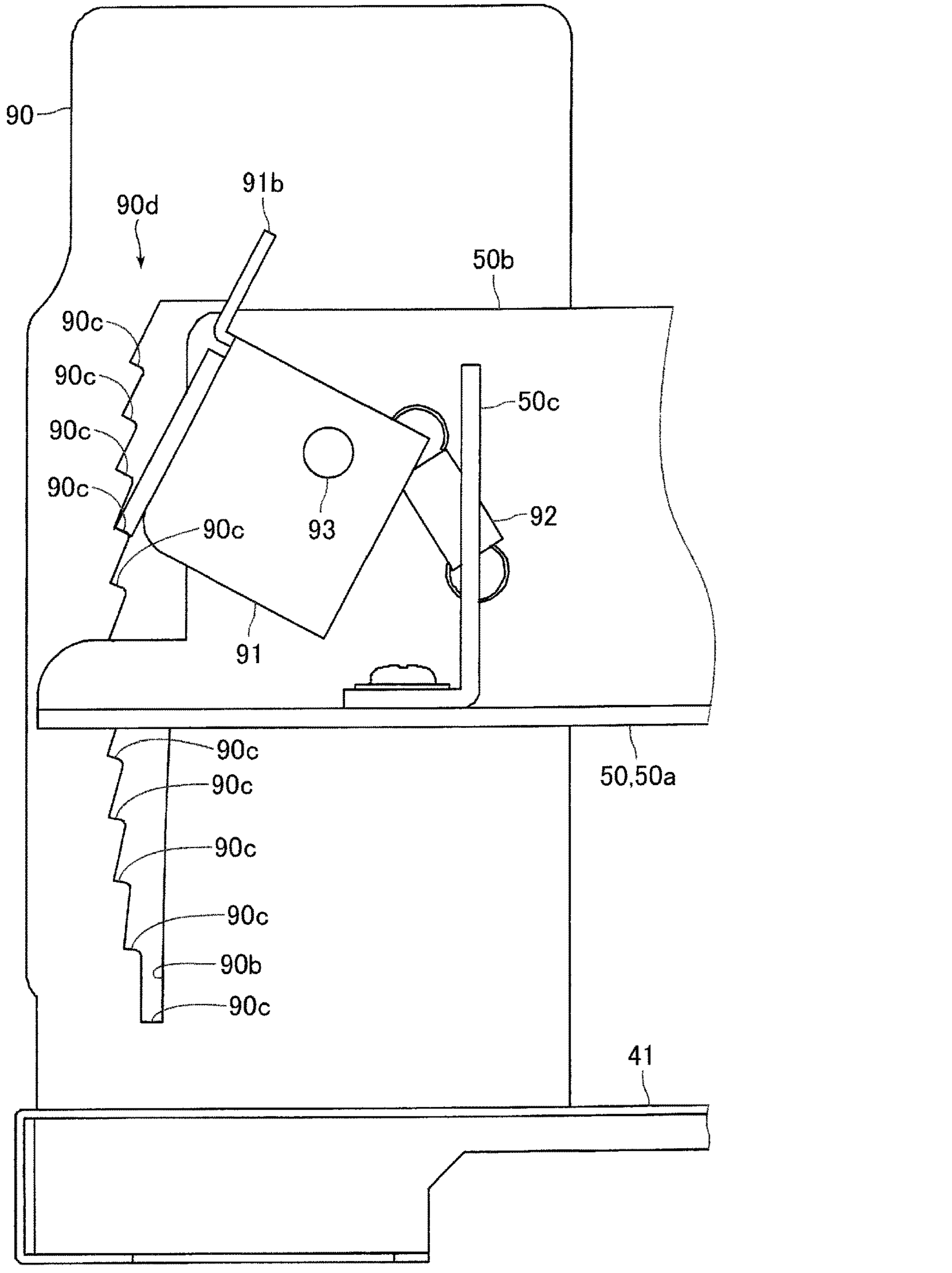
FIG. 23 is a view for explaining a configuration of an N-N cross-section of FIG. 22.

FIG. 21 is a side view for explaining a configuration of a peripheral portion of an ultraviolet irradiator 17 according to another embodiment of this invention. FIG. 22 is a view for explaining the configuration of the peripheral portion of the ultraviolet irradiator 17 from the M-M direction of FIG. 21. FIG. 23 is a diagram for explaining a configuration of an N-N cross-section of FIG. 22. Note that, in FIGS. 21 to 23, the same reference numerals are given to the same configurations as those in the above-described embodiment.

In the embodiment described above, the two guide frames 53 are arranged on the front end side of the lower frame 41 in a state of being spaced apart in the left-right direction. In this modified example, instead of one guide frame 53 of the two guide frames 53, a support frame 90 formed substantially similarly to the support frame 80 is disposed on the front end side of the lower frame 41. In this modified example, the ultraviolet irradiation device 4 includes an engaging member 91, a tension coil spring 92, a pivot shaft 93, and an eccentric cam 94. The engaging member 91 is held by the mounting portion 50 so as to be pivotable in the left-right direction. The tension coil spring 92 biases the engaging member 91 to one side in the pivoting direction of the engaging member 91 with respect to the mounting portion 50. The pivot shaft 93 serves as a pivot center of the engaging member 91 with respect to the mounting portion 50. The eccentric cam 94 is fixed to the pivot shaft 93.

The mounting portion 50 includes a link connecting portion 50*a* to which one end portion of the link member 51 is connected. As illustrated in FIG. 21, a compression coil spring 98 that biases the mounting portion 50 in a direction in which the ultraviolet irradiator 17 is lifted is disposed between the link connecting portion 50*a* and the holding frame 52. The upper end portion of the compression coil spring 98 is engaged with the link connecting portion 50*a* in the vicinity of the connecting portion between the link member 51 and the link connecting portion 50*a* arranged on the rear side. The compression coil spring 98 biases the link connecting portion 50*a* to one side in the circumferential direction around the pivot center of the link member 51 with respect to the holding frame 52. The compression coil spring 98 functions as an assist spring.

The support frame 90 is fixed to a front end portion of the lower frame 41. The guide frame 53 is disposed on the right side of the link connecting portion 50*a*, and the support frame 90 is disposed on the left side of the link connecting portion 50*a*. A guide hole 90*a* corresponding to the guide hole 53*a* of the guide frame 53 is formed in the support frame 90. A vertically long through-hole 90*b* penetrating the support frame 90 in the left-right direction is formed in the support frame 90. The through-hole 90*b* is formed on the front side of the guide hole 90*a*. In FIG. 21, the through-hole 90*b* is not illustrated, and in FIG. 23, the guide hole 90*a* is not illustrated.

Similarly to the support frame 80, the front side surface of the through-hole 90*b* is a step portion 90*d* having a stepped shape in which a plurality of stepped surfaces 90*c* arranged in the vertical direction is formed. The step between the stepped surfaces 90*c* adjacent in the vertical direction is constant. A scale plate 97 is fixed to the guide frame 53 or the support frame 90. A scale 96 indicating the height of the ultraviolet irradiator 17 is marked on the scale plate 97.

The pivot shaft 93 is disposed so that the axial direction of the pivot shaft 93 coincides with the left-right direction. The eccentric cam 94 is an eccentric disc cam formed in a disc shape. The eccentric cams 94 are fixed to both ends of the pivot shaft 93, and the two eccentric cams 94 are pivotable together with the pivot shaft 93. The center of the eccentric cam 94 is shifted from the axis of the pivot shaft 93. The amount of eccentricity, which is the distance between the center of the eccentric cam 94 and the axis of the pivot shaft 93, is equal to half of the step between the stepped surfaces 90*c* adjacent in the vertical direction.

A cam arrangement hole in which the eccentric cam 94 is arranged is formed in a front end portion of a side surface portion 50*b* constituting a side surface of the link connecting portion 50*a* in the left-right direction. The eccentric cam 94 is pivotably held by the side surface portion 50*b*. That is, the pivot shaft 93 to which the eccentric cam 94 is fixed is pivotably held by the mounting portion 50 via the eccentric cam 94. Specifically, both ends of the pivot shaft 93 are pivotably held by the front end portion of the mounting portion 50 via the eccentric cam 94. The pivot shaft 93 and the eccentric cam 94 are pivotable with respect to the mounting portion 50 in the left-right direction.

Both ends of the pivot shaft 93 protrude outward in the left-right direction from the link connecting portion 50*a*. A right end portion of the pivot shaft 93 is inserted into the guide hole 53*a* of the guide frame 53, and a left end portion of the pivot shaft 93 is inserted into the guide hole 90*a* of the support frame 90. A right end of the pivot shaft 93 projects rightward from the guide frame 53, and a left end of the pivot shaft 93 projects leftward from the support frame 90. A clamp lever 88 is attached to a left end portion of the pivot shaft 93 protruding to the left side of the support frame 90.

The engaging member 91 is disposed between the two side surface portions 50*b* in the left-right direction. Further, the engaging member 91 is disposed so as to be adjacent to the right side of the side surface portion 50*b* disposed on the left side. An insertion hole through which the pivot shaft 93 is inserted is formed in the engaging member 91. The engaging member 91 is pivotably held at the front end portion of the link connecting portion 50*a* via the pivot shaft 93 and the eccentric cam 94. The pivot shaft 93 is pivotable with respect to the engaging member 91. The engaging member 91 includes a mounting portion 91*a* mounted on the stepped surface 90*c* (see FIG. 22). The mounting portion 91*a* is disposed at the lower front end portion of the engaging member 91, and is disposed on the front side and the lower side of the pivot shaft 93. The mounting portion 91*a* is disposed at the left end portion of the engaging member 91.

One end side of the tension coil spring 92 is engaged with the rear upper end portion of the engaging member 91. The other end side of the tension coil spring 92 is engaged with a spring engaging portion 50*c* disposed at the front end portion of the link connecting portion 50*a*. The spring engaging portion 50*c* is disposed behind the engaging member 91. The tension coil spring 92 biases the engaging member 91 in the clockwise direction (the clockwise direction in FIG. 23) around the pivot shaft 93 when viewed from the right side. The mounting portion 91*a* disposed at the lower front end portion of the engaging member 91 is disposed behind the step portion 90*d*. The tension coil spring 92 biases the engaging member 91 in a direction in which the mounting portion 91*a* moves toward the step portion 90*d*.

The mounting portion 91*a* is mounted on the stepped surface 90*c* by the weight of the ultraviolet irradiator 17 and the like. Further, the engaging member 91 is biased in a direction in which the mounting portion 91*a* is directed toward the step portion 90*d*. Thus, when the ultraviolet irradiator 17 is lifted together with the mounting portion 50, the mounting portion 91*a* is automatically mounted on the stepped surface 90*c* corresponding to the height of the ultraviolet irradiator 17. When the engaging member 91 is pivoted against the biasing force of the tension coil spring 92 (that is, when the engaging member 91 is pivoted in the counterclockwise direction when viewed from the right side so that the mounting portion 91*a* is separated from the step portion 90*d*), the mounting portion 91*a* is detached from the stepped surface 90*c*. Thus, the ultraviolet irradiator 17 can be lowered together with the mounting portion 50. A finger hooking portion 91*b* for rotating the engaging member 91 against the biasing force of the tension coil spring 92 is formed at the front upper end portion of the engaging member 91.

In this modified example, when the eccentric cam 88*a* of the clamp lever 88 is disposed at the position indicated by the two-dot chain line in FIG. 22, the ultraviolet irradiator 17 can be moved up and down together with the mounting portion 50. On the other hand, the clamp lever 88 is pivoted in the front-rear direction so that the eccentric cam 88*a* is disposed at a position indicated by a solid line in FIG. 22. As a result, the front end portion of the link connecting portion 50*a* is fixed to the guide frame 53 and the support frame 90, and the ultraviolet irradiator 17 cannot be moved up and down together with the mounting portion 50.

On the right side of the guide frame 53, the pivot shaft 93 is inserted into the washer 89, and the washer 89 is fixed to the pivot shaft 93. On the left side of the support frame 90 and the right side of the clamp lever 88, the pivot shaft 93 is inserted into the washer 89, and the washer 89 is movable in the left-right direction with respect to the pivot shaft 93. Therefore, when the clamp lever 88 is pivoted so that the eccentric cam 88*a* is disposed at a position indicated by a solid line in FIG. 22, the guide frame 53, the support frame 90, and the link connecting portion 50*a* are sandwiched between two washers 89. The front end portion of the link connecting portion 50*a* is fixed to the guide frame 53 and the support frame 90.

In this modified example, the eccentric cam 88*a* of the clamp lever 88 is moved to a position indicated by a two-dot chain line in FIG. 22 to adjust the height (position in the vertical direction) of the ultraviolet irradiator 17. When adjusting the height of the ultraviolet irradiator 17, first, the operator of the printing device 1 manually lifts the link connecting portion 50*a*. When the operator lifts the link connecting portion 50*a*, the mounting portion 91*a* is automatically mounted on the stepped surface 90*c* corresponding to the height of the link connecting portion 50*a*.

Thereafter, the operator pivots the clamp lever 88 in the left-right direction to pivot the eccentric cam 94. The eccentric cam 94 is pivoted with respect to the link connecting portion 50*a* and the engaging member 91 about the pivot shaft 93. Therefore, when the eccentric cam 94 is pivoted, the link connecting portion 50*a* moves up and down with respect to the engaging member 91. When the eccentric cam 94 is pivoted in this manner, the link connecting portion 50*a* moves up and down with respect to the engaging member 91. In this modified example, the height of the ultraviolet irradiator 17 can be finely adjusted using the eccentric cam 94.

The link connecting portion 50*a* may be moved up and down using a screw member. In this case, the operator may manually rotate the screw member, or the ultraviolet irradiation device 4 may include a motor that rotates the screw member.

Figure 24:
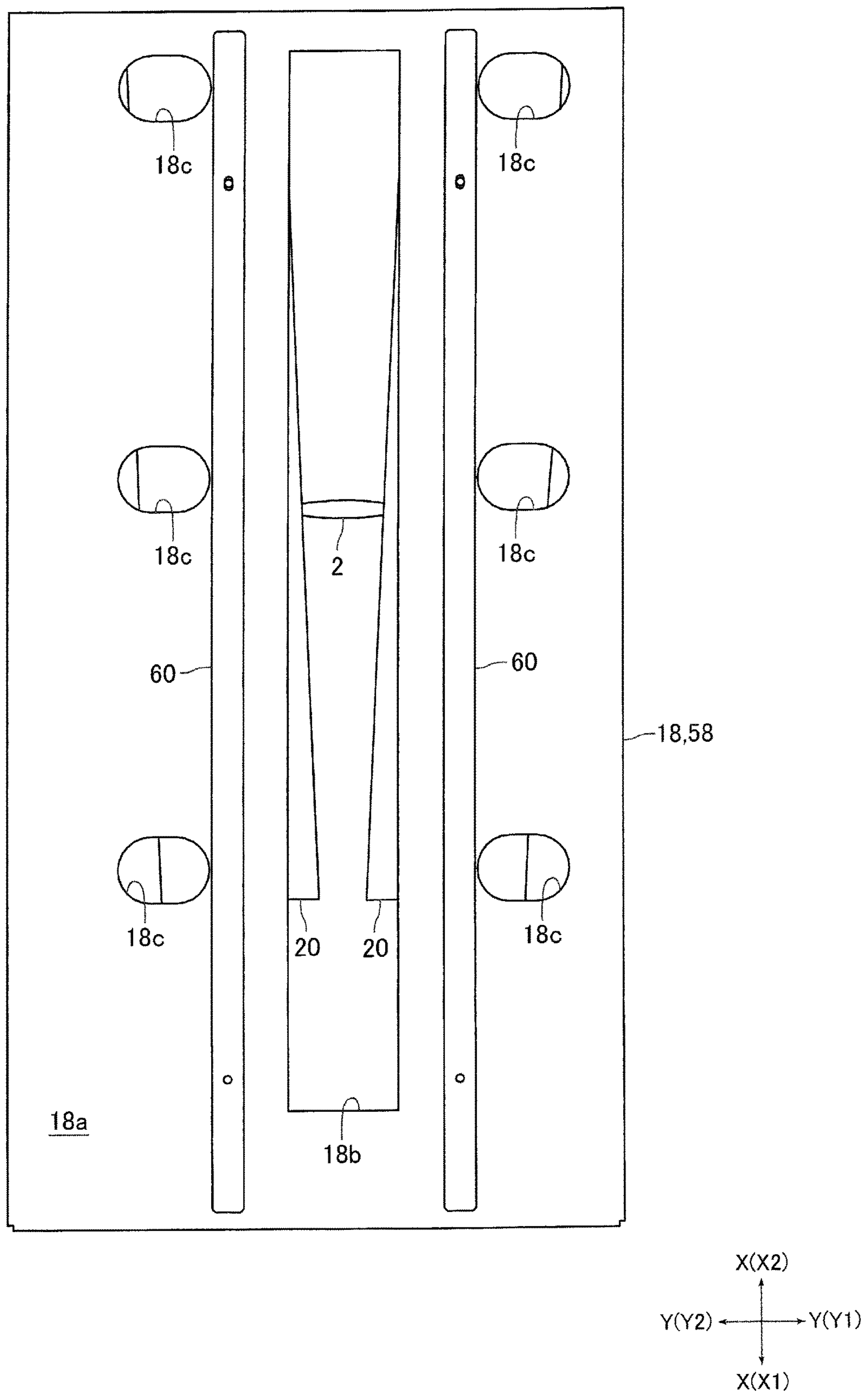
FIG. 24 is a plan view for explaining a configuration of a cover portion according to another embodiment of this invention.
Figure 25:
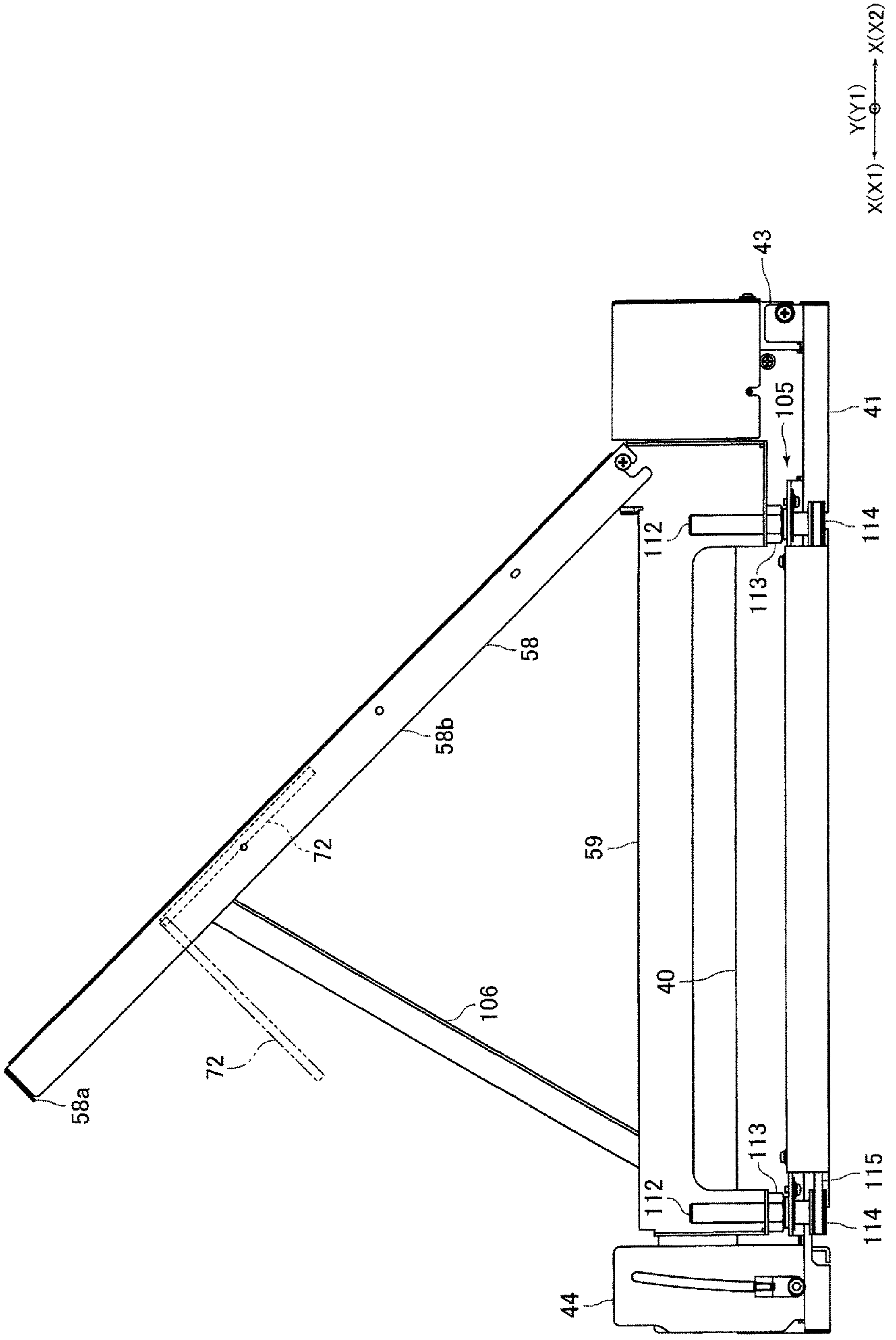
FIG. 25 is a side view for explaining a configuration of a cover according to another embodiment of this invention.
Figure 26A:
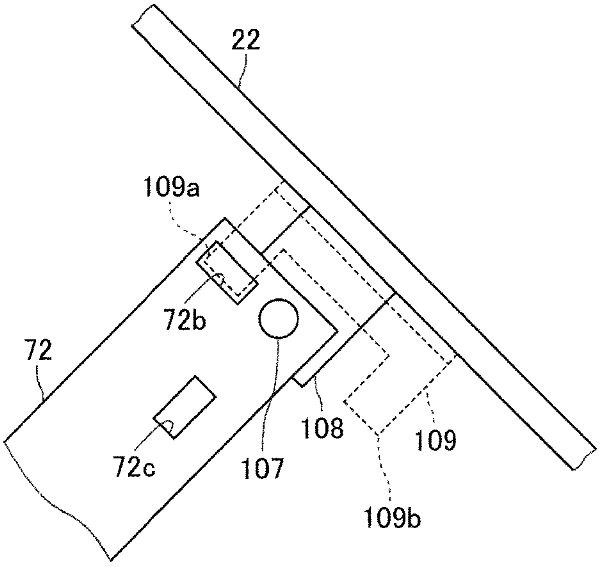
FIG. 26A and FIG. 26B are enlarged side views for explaining a configuration of a third cover according to another embodiment of this invention.
Figure 26B:
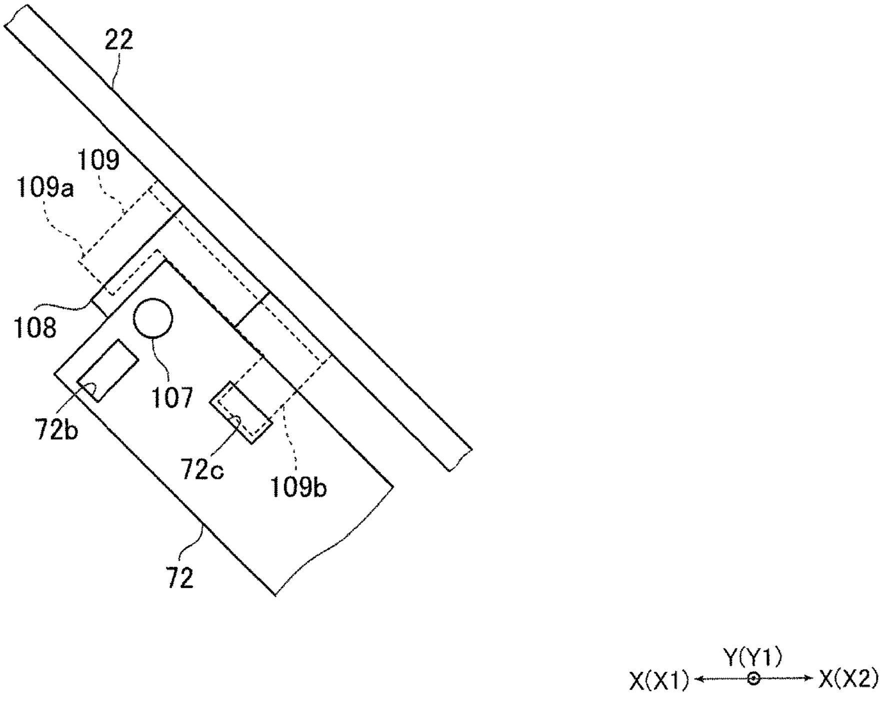
Figure 27:
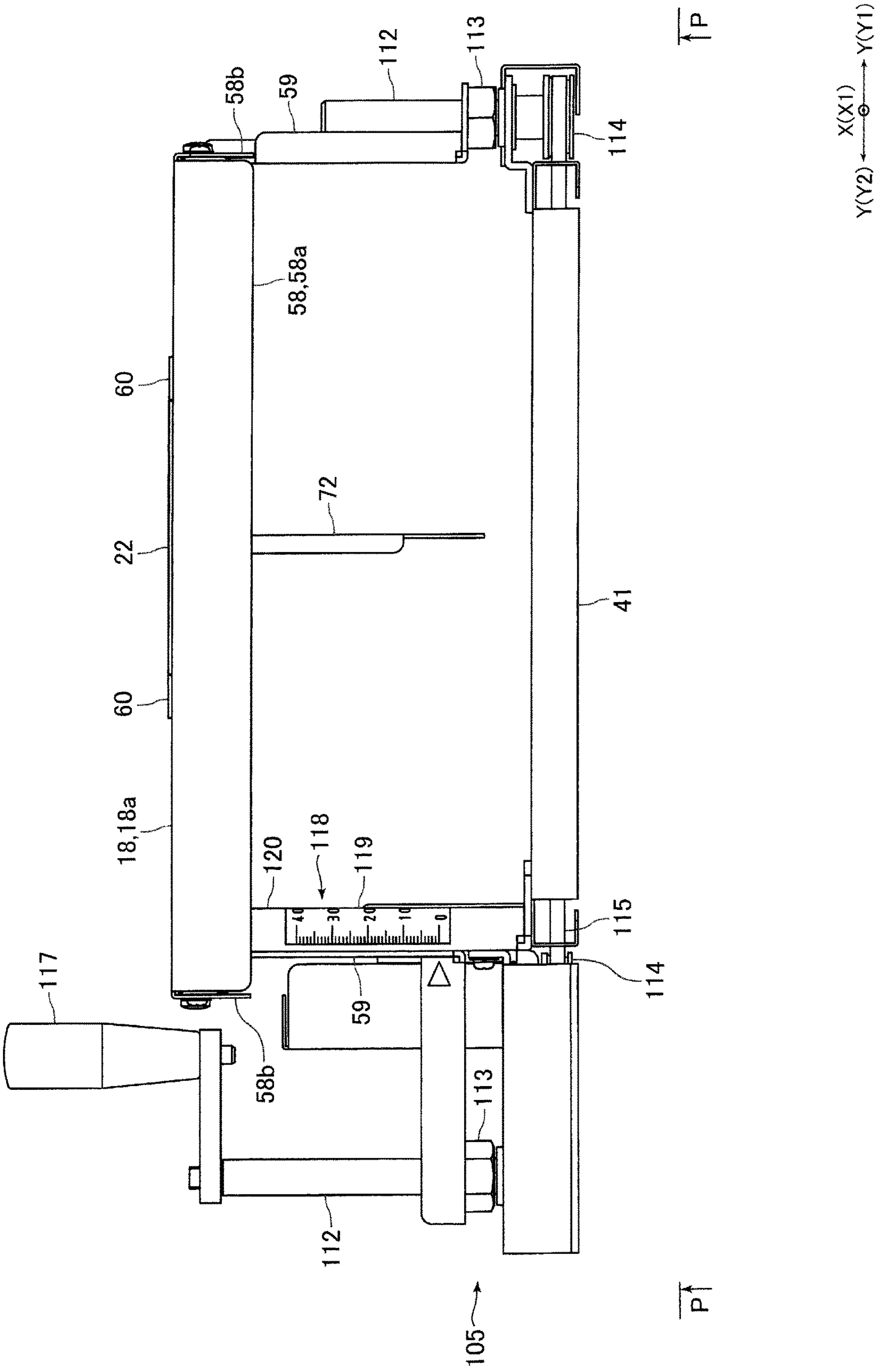
FIG. 27 is a front view for explaining a configuration of an ultraviolet irradiation device according to another embodiment of this invention.
Figure 28:
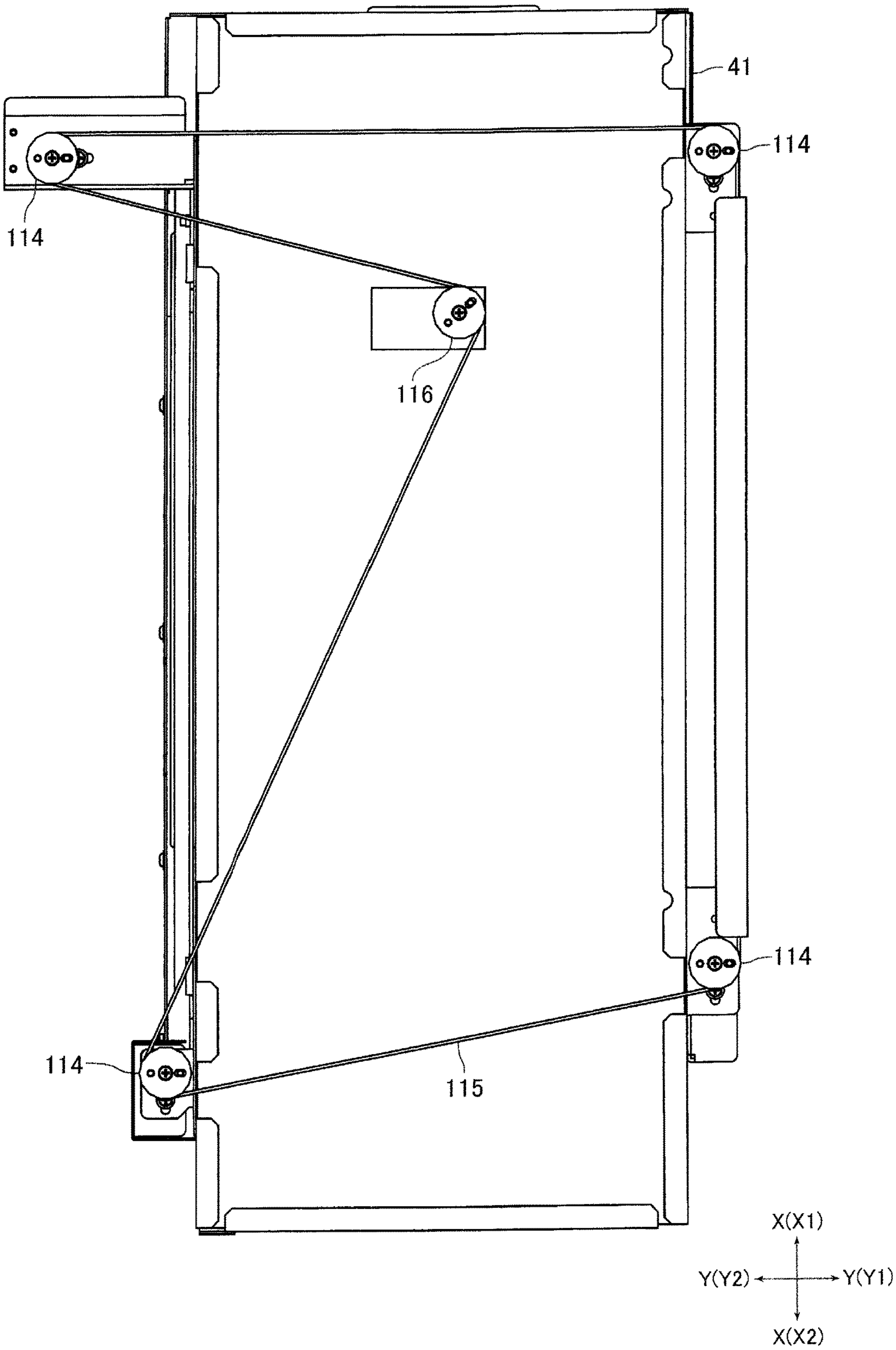
FIG. 28 is a bottom view showing the configuration of a part of the ultraviolet irradiation device from the P-P direction of FIG. 27.

Modification Example of Cover and Modification Example of Peripheral Portion of Cover FIG. 24 is a plan view for explaining a configuration of a cover portion 18*a* according to another embodiment of this invention. FIG. 25 is a side view for explaining a configuration of a cover 18 according to another embodiment of this invention. FIG. 26A and FIG. 26B are enlarged side views for explaining a configuration of a third cover 22 according to another embodiment of this invention. FIG. 27 is a front view for explaining a configuration of an ultraviolet irradiation device 4 according to another embodiment of this invention. FIG. 28 is a bottom view showing the configuration of a part of the ultraviolet irradiation device 4 from the P-P direction of FIG. 27. Note that, in FIGS. 24 to 28, the same reference numerals are given to the same configurations as those in the above-described embodiment.

In the embodiment described above, the ultraviolet irradiation device 4 includes the cover position adjustment mechanism 21, but in this modification, the ultraviolet irradiation device 4 does not include the cover position adjustment mechanism 21. In this modification, the operator directly touches the upper surface of the second cover 20, and a plurality of through-holes 20 for adjusting the position and inclination of the second cover 18*c* in the left-right direction are formed in the cover portion 18*a* (see FIG. 24). The through-hole 18*c* is formed on both sides of the opening 18*b* in the left-right direction. The through-holes 18*c* are formed at, for example, three locations on both sides of the opening 18*b* in the left-right direction.

In the embodiment described above, the cover upper portion 58 is removed from the cover lower portion 59 when the print object 2 is replaced. In this modified example, the cover upper portion 58 can be pivoted with respect to the cover lower portion 59 (see FIG. 25). As a result, the cover upper portion 58 opens with respect to the cover lower portion 59 to a position where the print object 2 can be replaced when replacing the print object 2. Further, in this modification, when the cover upper portion 58 is opened in a state in which the third cover 22 is mounted on the cover portion 18*a*, the detection target member 72 attached to the third cover 22 can be folded (see a broken line and a two-dot chain line in FIG. 25). Furthermore, in this modification, the ultraviolet irradiation device 4 includes a cover lift mechanism 105 that lifts and lowers the cover lower portion 59 with respect to the lower frame 41 (see FIG. 27).

In this modification, as illustrated in FIG. 25, the rear end portion of the cover upper portion 58 is pivotably connected to the rear upper end portion of the cover lower portion 59. The cover upper portion 58 is pivotable with respect to the cover lower portion 59 in the left-right direction. In this modified example, when replacing the print object 2, the operator opens the cover upper portion 58 by pivoting the cover upper portion 58 with respect to the cover lower portion 59 to a position where the print object 2 can be replaced. A support member 106 for supporting the cover upper portion 58 in the opened state from below is attached to the cover lower portion 59. One end portion of the support member 106 is pivotably attached to a front upper end portion of the cover lower portion 59. The other end portion of the support member 106 can be engaged with the cover upper portion 58 from below. The support member 106 can be accommodated inside the cover lower portion 59.

In this modification, the detection target member 72 is pivotable with respect to the third cover 22 in the left-right direction. As illustrated in FIG. 26A and FIG. 26B, the detection target member 72 is pivotable with respect to the third cover 22 about a pivot center shaft 107 disposed below the third cover 22. A shaft holding member 108 to which the pivot center shaft 107 is attached is fixed to the lower surface of the third cover 22. The detection target member 72 is pivotable with respect to the third cover 22 between the detectable position and the housing position. The detectable position is a position indicated by a two-dot chain line in FIG. 25, and is a position where the detection target member 72 extends downward from the cover upper portion 58. The housing position is a position indicated by a broken line in FIG. 25, and is a position where the detection target member 72 is housed inside the cover upper portion 58.

A leaf spring 109 for holding the detection target member 72 is fixed to the lower surface of the third cover 22. The leaf spring 109 includes a first engaging portion 109*a* for holding the detection target member 72 at the detectable position and a second engaging portion 109*b* for holding the detection target member 72 at the accommodated position. In the detection target member 72, a first engagement hole 72*b* with which the first engaging portion 109*a* is engaged and a second engagement hole 72*c* with which the second engaging portion 109*b* is engaged are formed. When the print object 2 is printed, the detection target member 72 is disposed at the detectable position (see FIG. 26A). When replacing the print object 2 and opening the cover upper portion 58, the operator pivots the detection target member 72 from the detectable position to the accommodated position (see FIG. 26B). Thus, the detection target member 72 does not interfere with the replacement operation of the print object 2.

The cover lift mechanism 105 includes a screw member 112 and a nut member 113. The screw member 112 is held by the lower frame 41 so as to be rotatable in the vertical direction. The nut member 113 is screwed to the screw member 112 and fixed to the cover lower portion 59. The screw member 112 and the nut member 113 are arranged in the vicinity of each of the four corners of the ultraviolet irradiation device 4. That is, the cover lift mechanism 105 includes four screw members 112 and four nut members 113. The nut member 113 is fixed to the lower end of the cover lower portion 59.

A pulley 114 is fixed to a lower end portion of the screw member 112. As illustrated in FIG. 28, a belt 115 is stretched around the four pulleys 114. The cover lift mechanism 105 includes an idle pulley 116 for adjusting the tension of the belt 115. A lever 117 for rotating the screw member 112 is detachably attached to an upper end portion of one screw member 112 of the four screw members 112.

In this modified example, when adjusting the height of the cover lower portion 59 to adjust the height of the cover 18, the operator attaches the lever 117 to one screw member 112 and rotates the lever 117. When the lever 117 is rotated, the four screw members 112 rotate together, and the cover lower portion 59 moves up and down with respect to the lower frame 41. When the cover lower portion 59 moves up and down, the four screw members 112 rotate synchronously, so that the horizontal state of the cover portion 18*a* is maintained. When the adjustment of the height of the cover 18 is completed, the lever 117 is removed.

The ultraviolet irradiation device 4 includes a scale plate 119 on which a scale 118 indicating the height of the cover 18 is printed. The scale plate 119 is fixed to a fixing member 120 fixed to the lower frame 41. The cover lift mechanism 105 may include a motor that rotates the screw member 112.

Modification Example of Rotating Mechanism

Figure 29:
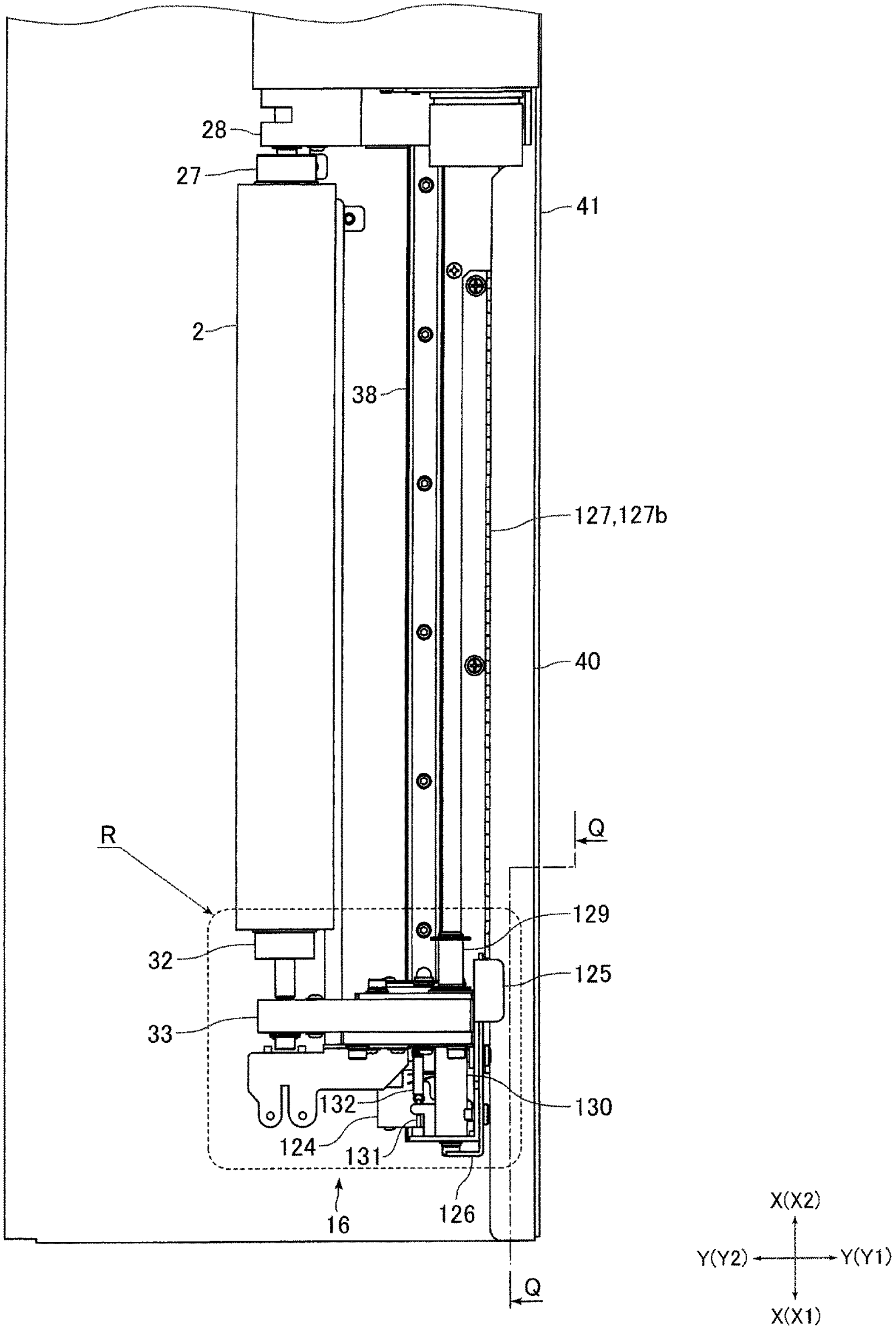
FIG. 29 is a plan view for explaining a configuration of a rotating mechanism according to another embodiment of this invention.
Figure 30:
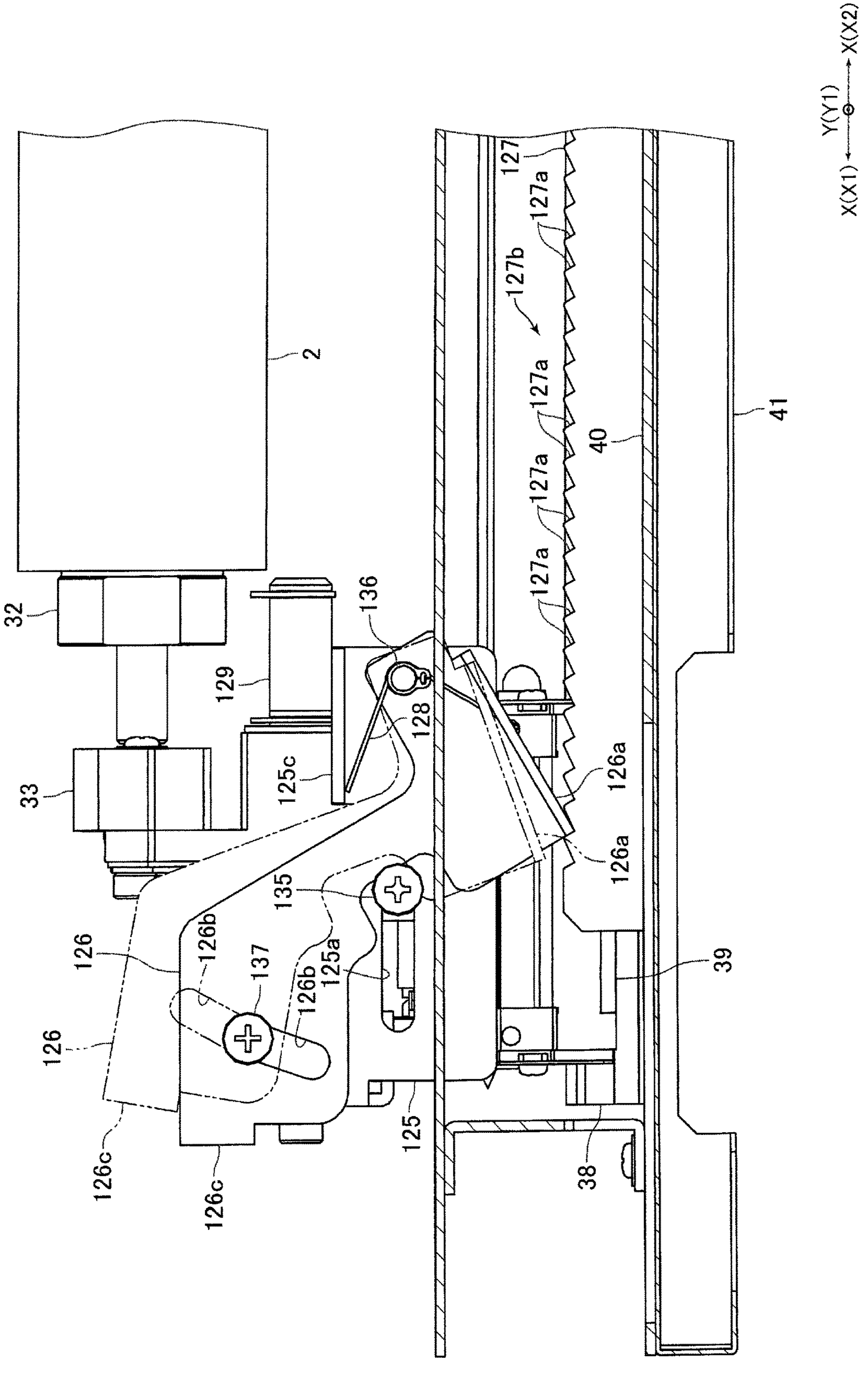
FIG. 30 is a cross-sectional view taken along line Q-Q in FIG. 29.
Figure 31:
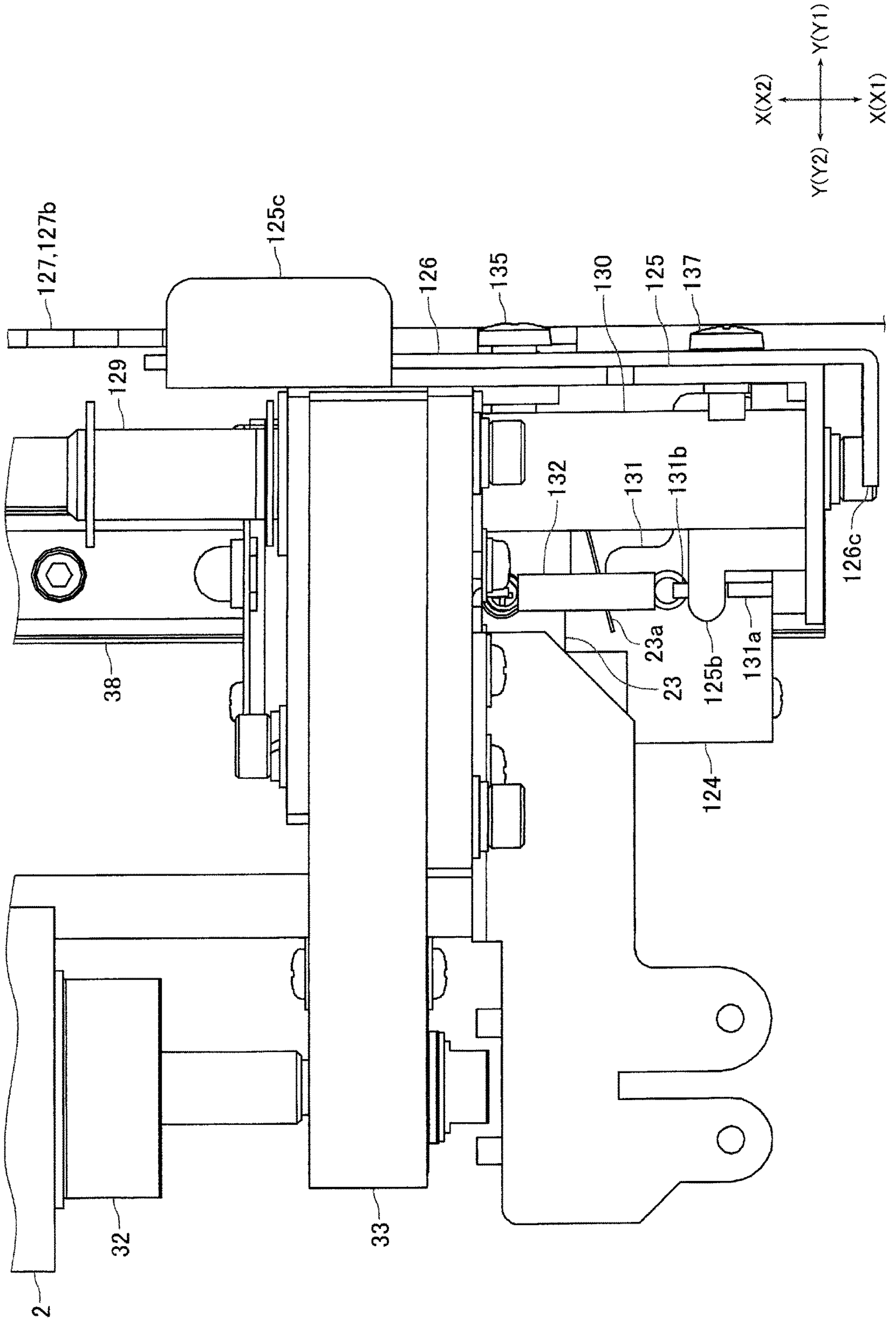
FIG. 31 is an enlarged plan view for explaining a configuration of portion R in FIG. 29.
Figure 32:
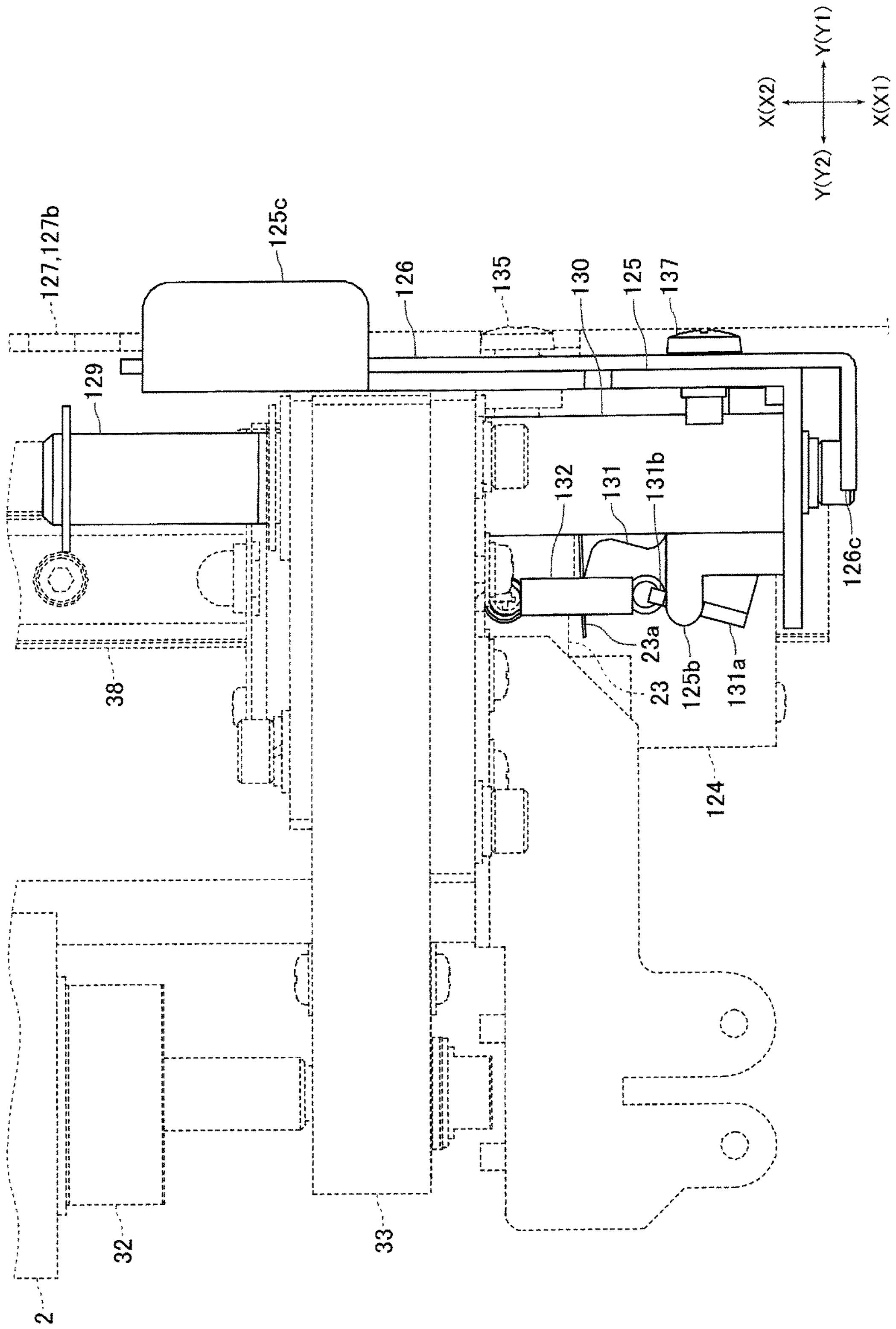
FIG. 32 is an enlarged plan view for explaining a configuration of portion R in FIG. 29.

FIG. 29 is a plan view for explaining a configuration of a rotating mechanism 16 according to another embodiment of this invention. FIG. 30 is a cross-sectional view taken along line Q-Q in FIG. 29. FIGS. 31 and 32 are enlarged plan views for explaining a configuration of portion R in FIG. 29. Note that, in FIGS. 29 to 32, the same reference numerals are given to the same configurations as those in the above-described embodiment.

In the embodiment described above, the rotating mechanism 16 includes the third holding portion 34 and the compression coil spring 35. The rotating mechanism 16 of this modification does not include the third holding portion 34 and the compression coil spring 35. In this modified example, the second holding portion 33 is fixed to guide block 39. In this modification, the rotating mechanism 16 includes a fixing member 124, a slide member 125, an engaging member 126, and a restricting member 127. The fixing member 124 is fixed to the guide block 39. The slide member 125 is held by the fixing member 124 so as to be movable in the front-rear direction with respect to the fixing member 124. The engaging member 126 is held by the slide member 125 so as to be pivotable about the left-right direction as the axial direction with respect to the slide member 125. The restricting member 127 restricts the forward movement of the slide member 125 and the engaging member 126.

The rotating mechanism 16 includes a torsion coil spring 128 (see FIG. 30), a fixed shaft 129, a compression coil spring 130, a pivotable member 131, and a tension coil spring 132. The torsion coil spring 128 biases the engaging member 126 to one side in the pivoting direction of the engaging member 126 with respect to the slide member 125. The fixed shaft 129 is fixed to the slide member 125. The fixed shaft 129 is inserted into the compression coil spring 130. The pivotable member 131 is held by the fixing member 124 so as to be pivotable with respect to the fixing member 124 in the vertical direction. The tension coil spring 132 biases the pivotable member 131 to one side in the pivoting direction of the pivotable member 131 with respect to the fixing member 124.

A guide hole 125*a* is formed in the slide member 125 (see FIG. 30). The guide hole 125*a* guides the slide member 125 in the front-rear direction with respect to the fixing member 124. The guide hole 125*a* also restricts a moving range of the slide member 125 in the front-rear direction with respect to the fixing member 124. The guide hole 125*a* is an elongated hole that is long in the front-rear direction. A guide screw 135 fixed to the fixing member 124 is inserted into the guide hole 125*a*. The slide member 125 includes a pivot restricting portion 125*b* and a spring engaging portion 125*c*. The pivot restricting portion 125*b* restricts the pivoting of the pivotable member 131 to one side in the pivoting direction with respect to the fixing member 124. One end portion of the torsion coil spring 128 is in contact with the spring engaging portion 125*c*.

The fixed shaft 129 is disposed so that the axial direction of the fixed shaft 129 coincides with the front-rear direction. The front end of the fixed shaft 129 is fixed to the slide member 125. A through-hole through which the fixed shaft 129 is inserted is formed in the second holding portion 33. As described above, the fixed shaft 129 is inserted through the inner peripheral side of the compression coil spring 130. The front end of the compression coil spring 130 is in contact with the slide member 125. The rear end of the compression coil spring 130 is in contact with the second holding portion 33. The compression coil spring 130 biases the second holding portion 33 rearward with respect to the slide member 125. That is, the compression coil spring 130 biases the second rotator 32, the second holding portion 33, the guide block 39, and the fixing member 124 rearward with respect to the slide member 125.

The restricting member 127 is formed in an elongated shape elongated in the front-rear direction. The restricting member 127 is fixed to the pivotable frame 40. The restricting member 127 includes a restricting portion 127*b* having a saw blade shape (see FIG. 30). The restricting portion 127*b* is formed with a plurality of restricting surfaces 127*a* arranged in the front-rear direction. The restricting portion 127*b* is formed on an upper end face of the restricting member 127. The restricting surface 127*a* is an inclined surface that is inclined upward toward the front side. A pitch (pitch in the front-rear direction) of the plurality of restricting surfaces 127*a* is constant.

The engaging member 126 is pivotable with respect to the slide member 125 about a pivot center shaft 136 (see FIG. 30) fixed to the rear end portion of the slide member 125. The pivot center shaft 136 is disposed so that the axial direction of the pivot center shaft 136 coincides with the left-right direction. The pivot center shaft 136 is disposed below the spring engaging portion 125*c*. An insertion hole through which the pivot center shaft 136 is inserted is formed at a rear end portion of the engaging member 126. The engaging member 126 includes an engaging portion 126*a* that engages with the restricting surface 127*a* (see FIG. 30). The engaging portion 126*a* is disposed at the lower end portion of the engaging member 126. When the print object 2 is appropriately attached to the rotating mechanism 16, the front end face of the engaging portion 126*a* is in contact with the restricting surface 127*a* at a predetermined contact pressure.

A guide hole 126*b* is formed in the engaging member 126 (see FIG. 30). The guide hole 126*b* guides the engaging member 126 in the pivoting direction of the engaging member 126 with respect to the slide member 125. The guide hole 126*b* also restricts a pivoting range of the engaging member 126 with respect to the slide member 125. The guide hole 126*b* is disposed on the front side of the pivot center shaft 136. The guide hole 126*b* is disposed above the pivot center shaft 136. The shape of the guide hole 126*b* when viewed from the left-right direction is formed in an arc shape with the axis of the pivot center shaft 136 as the center of curvature. A guide screw 137 fixed to the slide member 125 is inserted into the guide hole 126*b*.

The pivot center shaft 136 is inserted through the torsion coil spring 128. One end portion of the torsion coil spring 128 is in contact with the spring engaging portion 125*c* of the slide member 125. The other end portion of the torsion coil spring 128 is in contact with the engaging member 126. The torsion coil spring 128 biases the engaging member 126 in a counterclockwise direction (counterclockwise direction in FIG. 30) around the pivot center shaft 136 when viewed from the right side. The engaging portion 126*a* disposed at the lower end portion of the engaging member 126 is disposed above the restricting portion 127*b*. The torsion coil spring 128 biases the engaging member 126 in a direction in which the engaging portion 126*a* moves toward the restricting portion 127*b*.

The engaging member 126 is pivoted against the biasing force of the torsion coil spring 128. That is, the engaging member 126 is pivoted in the clockwise direction when viewed from the right side so that the engaging portion 126*a* is separated from the restricting portion 127*b*. As a result, the engaging portion 126*a* is disengaged from the restricting surface 127*a* as indicated by a two-dot chain line in FIG. 30. Therefore, when the engaging member 126 is pivoted against the biasing force of the torsion coil spring 128, the slide member 125 and the engaging member 126 can be moved to the front side. A finger hooking portion 126*c* is formed at a front upper end portion of the engaging member 126. The finger hooking portion 126*c* pivots the engaging member 126 against the biasing force of the torsion coil spring 128.

In this modified example, when the print object 2 is correctly attached to the rotating mechanism 16, the slide member 125 and the engaging member 126 are restricted from moving forward by the restricting surface 127*a* and the engaging portion 126*a* in contact with the restricting surface 127*a*. When the print object 2 is correctly attached to the rotating mechanism 16, the compression coil spring 130 is contracted by a predetermined amount (for example, about 5 (mm)). The biasing force of the compression coil spring 130 biases the second rotator 32, the second holding portion 33, the guide block 39, and the fixing member 124 rearward with respect to the slide member 125. Thus, when the print object 2 is correctly attached to the rotating mechanism 16, the front end face of the print object 2 comes into contact with the second rotator 32 at a predetermined contact pressure. The rear end face of the print object 2 is in contact with the first rotator 27 at a predetermined contact pressure.

The pivotable member 131 is pivotable with respect to the fixing member 124 about a pivot center shaft fixed to the front end portion of the fixing member 124. The pivot center shaft is disposed so that the axial direction of the pivot center shaft coincides with the vertical direction. The pivotable member 131 includes a restricted portion 131*a* disposed on the front side of the pivot restricting portion 125*b* and a spring engaging portion 131*b* with which the front end portion of the tension coil spring 132 is engaged. The restricted portion 131*a* is disposed at the left front end portion of the pivotable member 131. The spring engaging portion 131*b* is disposed behind the restricted portion 131*a*.

The first detection mechanism 23 is disposed behind the pivotable member 131. The first detection mechanism 23 is attached to the fixing member 124 so that the lever 23*a* is disposed on the front side of the body of the first detection mechanism 23. A rear end portion of the pivotable member 131 can be brought into contact with the lever 23*a* from the front side. The rear end portion of the tension coil spring 132 is engaged with the second holding portion 33. As described above, the front end portion of the tension coil spring 132 is engaged with the spring engaging portion 131*b* of the pivotable member 131. The tension coil spring 132 biases the pivotable member 131 in a clockwise direction (clockwise direction in FIGS. 31 and 32) around the pivot center of the pivotable member 131 when viewed from above. The pivoting of the pivotable member 131 in the clockwise direction in FIGS. 31 and 32 is restricted by the pivot restricting portion 125*b* disposed behind the restricted portion 131*a*.

In this modified example, when the print object 2 is attached to the rotating mechanism 16, the print object 2 is disposed between the first rotator 27 and the second rotator 32. Thereafter, the slide member 125 and the engaging member 126 are moved to the rear side until the compression coil spring 130 contracts by a predetermined amount. When the slide member 125 and the engaging member 126 move to the rear side, the second rotator 32, the second holding portion 33, the guide block 39, and the fixing member 124 are also pushed by the compression coil spring 130 to move to the rear side. When the slide member 125 and the engaging member 126 are moved backward until the compression coil spring 130 contracts by a predetermined amount, the front end face of the print object 2 comes into contact with the second rotator 32 at a predetermined contact pressure. Furthermore, the rear end face of the print object 2 comes into contact with the first rotator 27 at a predetermined contact pressure, and the print object 2 is correctly set on the rotating mechanism 16.

When the print object 2 is correctly attached to the rotating mechanism 16, the compression coil spring 130 is contracted by a predetermined amount. The slide member 125 moves to the rear side relative to the second holding portion 33, and moves to the rear side of the pivot restricting portion 125*b*. At this time, as illustrated in FIG. 32, the pivotable member 131 is pivoted in the clockwise direction in FIG. 32, and the rear end portion of the pivotable member 131 pushes the lever 23*a* backward. Specifically, the rear end portion of the pivotable member 131 pushes the lever 23*a* rearward until the lever 23*a* pushes the contact member of the first detection mechanism 23. Therefore, the first detection mechanism 23 detects that the print object 2 is correctly attached to the rotating mechanism 16.

When the print object 2 is removed from the rotating mechanism 16, the engaging member 126 is pivoted against the biasing force of the torsion coil spring 128. The slide member 125 and the engaging member 126 are moved forward from between the first rotator 27 and the second rotator 32 to a position where the print object 2 is removable.

OTHER EMBODIMENTS

The above-described embodiment is an example of a preferred embodiment of this invention, but is not limited thereto, and various modifications can be made without changing the gist of this invention.

In the embodiment described above, the cover upper portion 58 and the cover lower portion 59 are formed separately, and the cover upper portion 58 and the cover lower portion 59 can be separated. The cover upper portion 58 and the cover lower portion 59 may be integrally formed. In the embodiment described above, the second cover 20 may be disposed on the upper side of the cover 18. Furthermore, in the embodiment described above, the second detection mechanism 24 may be attached to the pivotable frame 40, for example.

In the embodiment described above, the first detection mechanism 23 may be an optical sensor. Similarly, the second detection mechanism 24 may be an optical sensor. In the embodiment described above, the third biasing member that biases the second holding portion 33 with respect to the third holding portion 34 may be a spring member other than the compression coil spring 35. The biasing member that biases the second cover 20 outward in the left-right direction may be a spring member other than the tension coil spring 69.

In the embodiment described above, the magnet sheet 61 may be attached to the upper surface of the mounting portion 59*b*. That is, the cover lower portion 59 may include the magnet sheet 61. In this case, the cover upper portion 58 is made of a magnetic material, and the attachment portion 58*c* is an adsorbing target member. In addition, the magnet sheet 61 may be attached to the lower surface of the attachment portion 58*c*, and the magnet sheet may be attached to the upper surface of the mounting portion 59*b*. In this case, the magnet sheet attached to the upper surface of the mounting portion 59*b* serves as an adsorbing target member.

In the embodiment described above, when only the print object 2 having a certain outer diameter is printed by the printing device 1, the position of the cover 18 in the vertical direction may not be adjustable. When the printing device 1 prints only the print object 2 having a certain outer diameter, the ultraviolet irradiation device 4 may not include the second cover 20 and the cover position adjustment mechanism 21. When only the printing of the print object 2 having a constant outer diameter is performed by the printing device 1, the position of the ultraviolet irradiator 17 in the vertical direction may not be adjustable.

In the embodiment described above, when the printing device 1 prints only the print object 2 having a certain length, the ultraviolet irradiation device 4 may not include the third cover 22. Furthermore, in the embodiment described above, when printing is performed only on the print object 2 having a columnar outer shape, the inclination of the rotating mechanism 16 with respect to the horizontal direction when viewed from the left-right direction may not be adjustable. When printing is performed only on the print object 2 having a columnar outer shape, the inclination of the ultraviolet irradiator 17 with respect to the axis of the print object 2 when viewed from the vertical direction may not be adjustable.

In the embodiment described above, the ultraviolet irradiation device 4 may be mounted on the table 5 so that the front-rear direction (X direction) coincides with the main scanning direction (that is, the left-right direction and the sub-scanning direction are made to coincide with each other). In the embodiment described above, the printing device 1 may include a Y bar drive mechanism that moves the Y bar 8 in the sub-scanning direction instead of the stage drive mechanism 12. In the embodiment described above, the ultraviolet irradiator 17 may be disposed below the print object 2.

The invention claimed is:

1. An ultraviolet irradiation device used in a printing device configured to perform printing using an ultraviolet-curable ink on an outer peripheral surface of a print object that is a three-dimensional object, the ultraviolet irradiation device comprising:

a rotating mechanism, configured to hold the print object and rotate the print object about an axis of the print object, wherein the rotating mechanism includes a motor;

an ultraviolet irradiator, configured to irradiate the outer peripheral surface of the print object with an ultraviolet ray, wherein the ultraviolet irradiator is disposed on a side of the print object, and irradiates the outer peripheral surface of the print object with the ultraviolet ray from the side of the print object;

a cover, having: an opening through which an upper end portion of the print object is disposed, and a cover portion that covers the ultraviolet irradiator from above;

two second covers, configured to close respective portions of the opening from opposite sides in a left-right direction; and a cover position adjustment mechanism, configured to adjust positions of the two second covers in the left-right direction, wherein the two second covers are held so as to be movable in the left-right direction, and positions of the two second covers are adjustable.

2. The ultraviolet irradiation device as set forth in claim 1, wherein a position of the cover in a vertical direction is adjustable.

3. The ultraviolet irradiation device as set forth in claim 1, wherein a direction orthogonal to the axis of the print object when viewed from a vertical direction is set as the left-right direction, one of the two second covers is capable of closing a part of the opening from one side in the left-right direction, and the other second cover is capable of closing a part of the opening from the other side in the left-right direction.

4. The ultraviolet irradiation device as set forth in claim 3, wherein each of the second covers is held by the cover so as to be slidable in the left-right direction, the cover position adjustment mechanism includes:

a pressing member that is held by the cover so as to be slidable in the left-right direction, contacts with each of the second covers from an outer side in the left-right direction, and presses each of the second covers inward in the left-right direction;

a biasing member that biases each of the second covers outward in the left-right direction, wherein the biasing member is a tension coil spring or a spring member; and an adjustment screw that is rotatably held by the cover and engages with the pressing member, when the adjustment screw is rotated, each of the second covers slides in the left-right direction.

5. The ultraviolet irradiation device as set forth in claim 4, wherein the cover includes:

a cover upper portion including the cover portion; and a cover lower portion to which the cover upper portion is attached on an upper end side, the cover upper portion holds each of the second covers and the cover position adjustment mechanism, any one of the cover upper portion and the cover lower portion includes an adsorbing member made of a permanent magnet, the other of the cover upper portion and the cover lower portion includes an adsorbing target member that is made of a permanent magnet or a magnetic member and is adsorbed by the adsorbing member, and the cover upper portion is attached to the cover lower portion by a magnetic adsorption force generated between the adsorbing member and the adsorbing target member.

6. The ultraviolet irradiation device as set forth in claim 5, wherein a vertical position of the cover lower portion is adjustable.

7. The ultraviolet irradiation device as set forth in claim 1, wherein a direction of the axis of the print object when viewed from a vertical direction is set as a front-rear direction, the ultraviolet irradiation device further comprises a third cover that closes a part of the opening in the front-rear direction, and the third cover is mounted on the cover portion.

8. The ultraviolet irradiation device as set forth in claim 1, wherein a vertical position of the ultraviolet irradiator is adjustable.

9. The ultraviolet irradiation device as set forth in claim 1, wherein a direction orthogonal to the axis of the print object when viewed from a vertical direction is set as the left-right direction, an inclination of the rotating mechanism with respect to a horizontal direction when viewed from the left-right direction is adjustable.

10. The ultraviolet irradiation device as set forth in claim 1, further comprising:

a support frame, having a step portion having a stepped shape in which a plurality of stepped surfaces arranged in a vertical direction is formed;

an engaging member, having a mounting portion mounted on the stepped surfaces and held by the rotating mechanism so as to be pivotable in the left-right direction;

a pivotable frame, to which the rotating mechanism is rotatably attached;

a pivot shaft, pivotably held by the pivotable frame and serving as a pivot center of the engaging member with respect to the pivotable frame; and an eccentric cam, fixed to the pivot shaft, wherein the pivot shaft is pivotable with respect to the engaging member, a cam arrangement hole in which the eccentric cam is arranged is formed in the pivotable frame, and when the eccentric cam is pivoted with respect to the pivotable frame, the other end portion in the front-rear direction of the pivotable frame moves up and down with respect to the engaging member.

11. The ultraviolet irradiation device as set forth in claim 10, wherein the eccentric cam is an eccentric disc cam formed in a disc shape, and an amount of eccentricity, which is a distance between a center of the eccentric cam and an axis of the pivot shaft, is equal to a half of a step between the stepped surfaces adjacent in the vertical direction.

12. The ultraviolet irradiation device as set forth in claim 1, wherein an inclination of the ultraviolet irradiator with respect to the axis of the print object when viewed in a vertical direction is adjustable.

13. The ultraviolet irradiation device as set forth in claim 1, further comprising:

a first detection mechanism, configured to detect that the print object is held by the rotating mechanism, wherein the first detection mechanism is a first interlock switch or a first optical sensor, wherein irradiation of the ultraviolet ray by the ultraviolet irradiator is enabled when the first detection mechanism detects that the print object is held by the rotating mechanism.

14. The ultraviolet irradiation device as set forth in claim 13, wherein a direction orthogonal to the axis of the print object when viewed from a vertical direction is set as the left-right direction, the rotating mechanism includes:

a first rotator that holds one end of the print object;

a first holding portion that rotatably holds the first rotator;

the motor that rotates the first rotator;

a power transmission mechanism that connects the first rotator and the motor, wherein the power transmission mechanism includes a belt and a pulley, or the power transmission mechanism is configured by a gear train;

a second rotator that holds the other end of the print object;

a second holding portion that rotatably holds the second rotator;

a third holding portion that pivotably holds the second holding portion, so that the second holding portion is pivotable in the left-right direction; and a third biasing member that biases the second holding portion with respect to the third holding portion in a direction in which the second holding portion tilts toward the first holding portion, wherein the third biasing member is the compression coil spring or a spring member, wherein the first detection mechanism is attached to the third holding portion, when the print object is attached to the rotating mechanism, the second holding portion is pivoted with respect to the third holding portion against a biasing force of the third biasing member to a position detected by the first detection mechanism.

15. The ultraviolet irradiation device as set forth in claim 1, further comprising:

a third cover, configured to close a part of the opening in a front-rear direction.

16. The ultraviolet irradiation device as set forth in claim 1, wherein an inclination of the rotating mechanism with respect to a horizontal direction is adjustable.

17. The ultraviolet irradiation device as set forth in claim 1, wherein the rotating mechanism includes:

a first rotator, configured to hold one end of the print object;

a second rotator, configured to hold the other end of the print object; and the motor, configured to rotate at least one of the first rotator and the second rotator.

18. A printing device comprising:

the ultraviolet irradiation device as set forth in claim 1;

a table on which the ultraviolet irradiation device is mounted; and an inkjet head that is disposed above the print object and ejects the ultraviolet-curable ink toward the outer peripheral surface of the print object.

19. An ultraviolet irradiation device used in a printing device for performing printing using an ultraviolet-curable ink on an outer peripheral surface of a print object that is a three-dimensional object, the ultraviolet irradiation device comprising:

a rotating mechanism, configured to hold the print object and rotate the print object about an axis of the print object, wherein the rotating mechanism includes a motor;

an ultraviolet irradiator, configured to irradiate the outer peripheral surface of the print object to which the ultraviolet-curable ink is attached with an ultraviolet ray; and a first detection mechanism, configured to detect that the print object is held by the rotating mechanism, wherein the first detection mechanism is a first interlock switch or a first optical sensor, wherein the ultraviolet-curable ink ejected from above the print object lands on the outer peripheral surface of the print object, and the ultraviolet irradiator is disposed on a side of the print object, and irradiates the outer peripheral surface of the print object with the ultraviolet ray from the side of the print object, wherein irradiation of the ultraviolet ray by the ultraviolet irradiator is enabled when the first detection mechanism detects that the print object is held by the rotating mechanism, wherein a direction of the axis of the print object when viewed from a vertical direction is set as a front-rear direction, the ultraviolet irradiation device further comprises:

a cover having an opening in which an upper end portion of the print object is disposed and having a cover portion that covers the ultraviolet irradiator from above;

a third cover mounted on the cover portion and closing a part of the opening in the front-rear direction; and a second detection mechanism configured to detect that the third cover is mounted on the cover portion, wherein the second detection mechanism is a second interlock switch or a second optical sensor, when the second detection mechanism detects that the third cover is mounted on the cover portion, irradiation of the ultraviolet ray by the ultraviolet irradiator is enabled.

* * * * *